(12) United States Patent
Zhang et al.

(10) Patent No.: US 12,529,966 B2
(45) Date of Patent: Jan. 20, 2026

(54) MACHINE LEARNING BASED IMAGE GENERATION FOR MODEL BASE ALIGNMENTS

(71) Applicant: ASML NETHERLANDS B.V., Veldhoven (NL)

(72) Inventors: Qiang Zhang, Campbell, CA (US); Yunbo Guo, San Jose, CA (US); Yu Cao, Saratoga, CA (US); Jen-Shiang Wang, Sunnyvale, CA (US); Yen-Wen Lu, Saratoga, CA (US); Danwu Chen, Guangdong (CN); Pengcheng Yang, Guangdong (CN); Haoyi Liang, San Jose, CA (US); Zhichao Chen, San Jose, CA (US); Lingling Pu, San Jose, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 486 days.

(21) Appl. No.: 17/772,529

(22) PCT Filed: Oct. 1, 2020

(86) PCT No.: PCT/EP2020/077611
§ 371 (c)(1),
(2) Date: Apr. 28, 2022

(87) PCT Pub. No.: WO2021/083608
PCT Pub. Date: May 6, 2021

(65) Prior Publication Data
US 2022/0404712 A1 Dec. 22, 2022

Related U.S. Application Data

(60) Provisional application No. 63/009,036, filed on Apr. 13, 2020, provisional application No. 62/929,605, filed on Nov. 1, 2019.

(51) Int. Cl.
*G03F 7/00* (2006.01)
*G06T 7/32* (2017.01)
(Continued)

(52) U.S. Cl.
CPC .......... *G03F 7/705* (2013.01); *G03F 7/70616* (2013.01); *G06T 7/32* (2017.01);
(Continued)

(58) Field of Classification Search
None
See application file for complete search history.

(56) References Cited

U.S. PATENT DOCUMENTS 5,229,872 A 7/1993 Mumola
6,046,792 A 4/2000 Van der Werf et al.
(Continued)

FOREIGN PATENT DOCUMENTS

TW 201828335 8/2018
TW 201901291 1/2019
(Continued)

OTHER PUBLICATIONS

Office Action issued in corresponding Korean Patent Application No. 10-2022-7014900, dated Mar. 18, 2024.
(Continued)

*Primary Examiner* — Benny Q Tieu
(74) *Attorney, Agent, or Firm* — Pillsbury Winthrop Shaw Pittman, LLP

(57) ABSTRACT

A method for training a machine learning model to generate a predicted measured image, the method including obtaining (a) an input target image associated with a reference design pattern, and (b) a reference measured image associated with a specified design pattern printed on a substrate, wherein the input target image and the reference measured image are non-aligned images; and training, by a hardware computer
(Continued)

system and using the input target image, the machine learning model to generate a predicted measured image.

20 Claims, 36 Drawing Sheets

(51) Int. Cl.
  *G06T 7/33* (2017.01)
  *G06V 10/774* (2022.01)
  *G06V 10/82* (2022.01)

(52) U.S. Cl.
  CPC ............ *G06T 7/337* (2017.01); *G06V 10/774* (2022.01); *G06V 10/82* (2022.01); *G06T 2207/10061* (2013.01); *G06T 2207/20081* (2013.01); *G06T 2207/20084* (2013.01)

(56) References Cited

U.S. PATENT DOCUMENTS

| | | | |
|---|---|---|---|
| 7,409,653 B2* | 8/2008 | Sengupta | G06V 10/24 |
| | | | 716/111 |
| 7,587,704 B2 | 9/2009 | Ye et al. | |
| 7,791,732 B2 | 9/2010 | Den Boef et al. | |
| 11,067,901 B2 | 7/2021 | Middlebrooks et al. | |
| 11,790,631 B2* | 10/2023 | Yao | G06V 10/82 |
| | | | 382/157 |
| 2002/0199164 A1 | 12/2002 | Sengupta et al. | |
| 2006/0066855 A1 | 3/2006 | Boef et al. | |
| 2007/0031745 A1 | 2/2007 | Ye et al. | |
| 2007/0050749 A1 | 3/2007 | Ye et al. | |
| 2008/0301620 A1 | 12/2008 | Ye et al. | |
| 2008/0309897 A1 | 12/2008 | Wong et al. | |
| 2009/0157360 A1 | 6/2009 | Ye et al. | |
| 2010/0162197 A1 | 6/2010 | Ye et al. | |
| 2010/0180251 A1 | 7/2010 | Ye et al. | |
| 2012/0087568 A1* | 4/2012 | Stellari | G06T 7/30 |
| | | | 382/294 |
| 2016/0154922 A1* | 6/2016 | Kuncha | G03F 7/70441 |
| | | | 716/53 |
| 2017/0350974 A1* | 12/2017 | Korchev | G01S 7/412 |
| 2018/0157933 A1 | 6/2018 | Brauer et al. | |
| 2018/0293721 A1* | 10/2018 | Gupta | G06N 3/045 |
| 2018/0350110 A1* | 12/2018 | Cho | G06F 7/08 |
| 2019/0026881 A1* | 1/2019 | Sato | G06T 7/90 |
| 2020/0380362 A1* | 12/2020 | Cao | G06N 3/08 |
| 2021/0208507 A1 | 7/2021 | Wang et al. | |

FOREIGN PATENT DOCUMENTS

| | | | | |
|---|---|---|---|---|
| TW | 201903391 | | 1/2019 | |
| WO | WO-2018121988 A1 * | | 7/2018 | ......... G03F 7/70666 |
| WO | 2018208871 | | 11/2018 | |
| WO | 2019162346 | | 8/2019 | |
| WO | 2019233711 | | 12/2019 | |
| WO | 2020035285 | | 2/2020 | |
| WO | 2020200993 | | 10/2020 | |

OTHER PUBLICATIONS

International Search Report and Written Opinion issued in corresponding PCT Patent Application No. PCT/EP2020/077611, dated Feb. 26, 2021.
Taiwanese Office Action issued in corresponding Taiwanese Patent Application No. 109137381, dated Dec. 30, 2021.
Office Action issued in corresponding Chinese Patent Application No. 202080075537.8, dated Dec. 5, 2024.

* cited by examiner

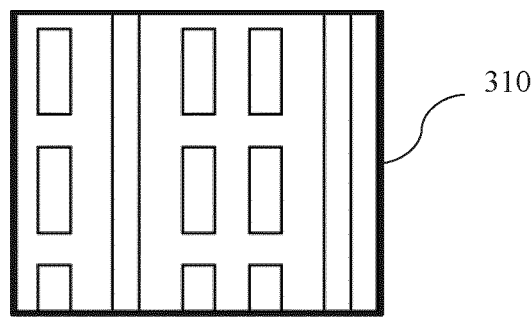
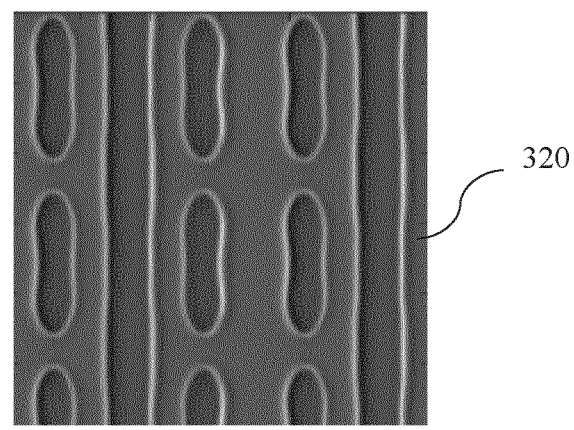
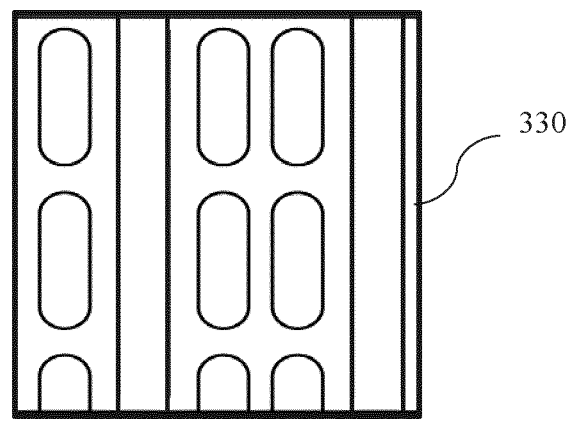
Fig. 3

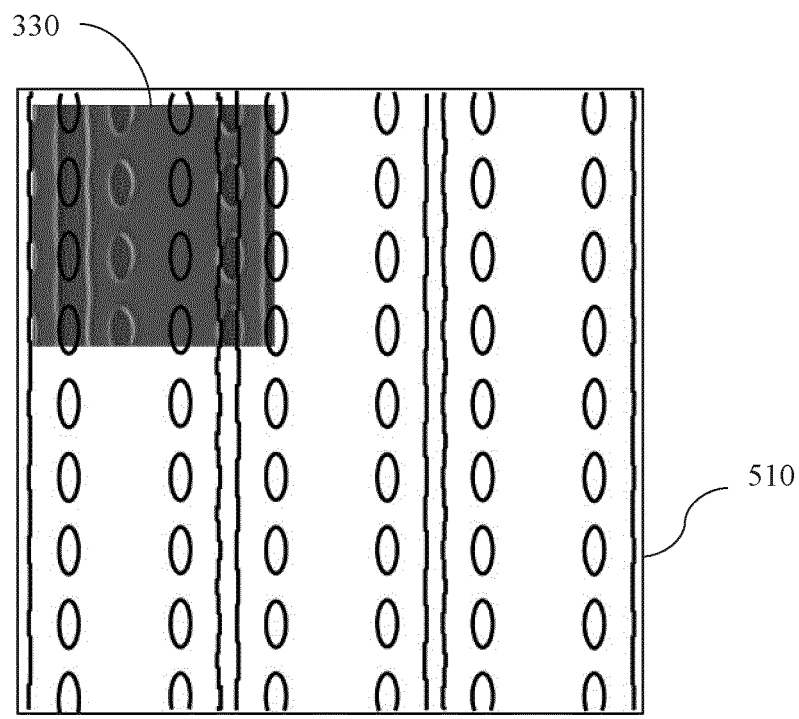
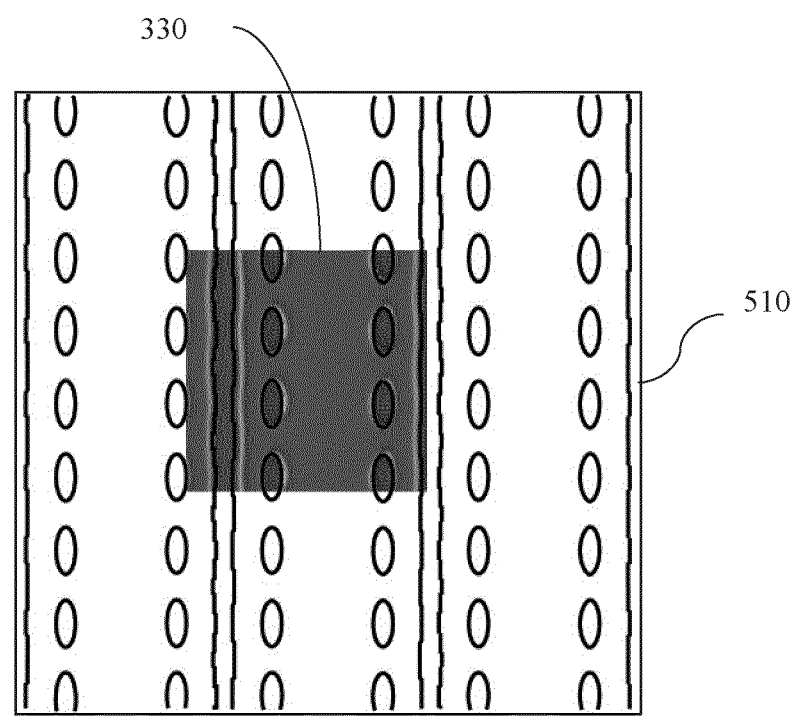
Fig. 4

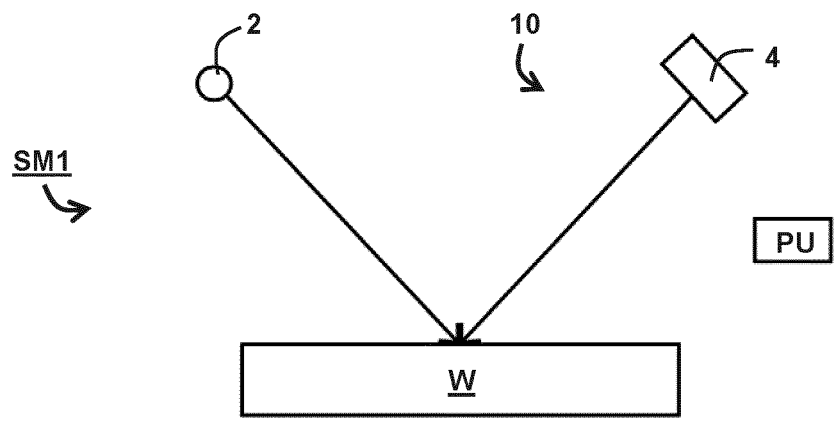
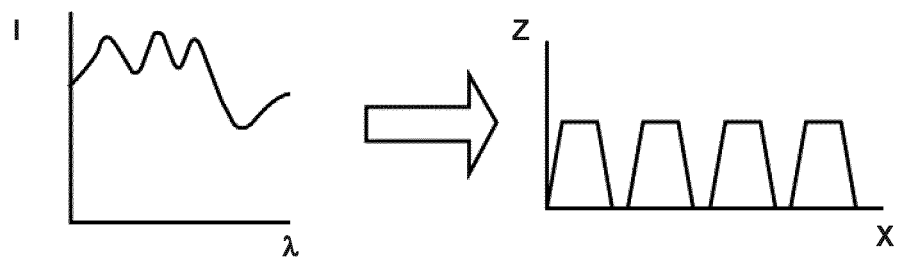
Fig. 25

MACHINE LEARNING BASED IMAGE GENERATION FOR MODEL BASE ALIGNMENTS

CROSS-REFERENCE TO RELATED APPLICATIONS

This application is the U.S. national phase entry of PCT Patent Application No. PCT/EP2020/077611 which was filed on Oct. 1, 2020, which claims the benefit of priority of U.S. Provisional Application No. 62/929,605 which was filed on Nov. 1, 2019 and U.S. Provisional Application No. 63/009,036 which was filed on Apr. 13, 2020 which are incorporated herein in their entireties by reference.

TECHNICAL FIELD

The description herein relates generally to metrology as used with process models for lithographic processes, and more particularly, apparatuses, methods, and computer program products for using machine learning for generating images for enabling image alignment.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices can be found in, for example, U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involve processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law." At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-k1 lithography, according to the resolution formula $CD=k_1\times\lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET).

The term "projection optics," as used herein, should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

A method for training a machine learning model to generate a predicted measured image includes obtaining (a) an input target image associated with a reference design pattern, and (b) a reference measured image associated with a specified design pattern printed on a substrate, wherein the input target image and the reference measured image are non-aligned images; and training, by a hardware computer system and using the input target image, the machine learning model to generate a predicted measured image.

In some embodiments, training the machine learning model is an iterative process, wherein an iteration includes: generating, via executing a first generator model of the machine learning model, the predicted measured image from the input target image; determining, via a first discriminator model of the machine learning model, whether the predicted measured image and the reference measured image are real or fake, wherein the first discriminator model determines a first image to be real if the first image satisfies a first threshold related to a specified measured image associated with a specified design pattern printed on a substrate, and wherein the first discriminator model determines the first image to be fake if the first image does not satisfy the first threshold; generating, via executing a second generator model of the machine learning model, a predicted target image from the reference measured image; and determining, via a second discriminator model of the machine learning model, whether the predicted target image and the input target image are real or fake, wherein the second discriminator model determines a second image to be real if the second image satisfies a second threshold related to the input design pattern, and wherein the second discriminator model determines the second image to be fake if the second image does not satisfy the second threshold.

In some embodiments, the iteration includes: computing a first discriminator function associated with the first discriminator model as a function of: (i) a first probability that the predicted measured image is determined as real, and (ii) a second probability that the reference measured image is determined as fake; computing a first generator function associated with the first generator model as a function of: (iii) the first probability that the predicted measured image is determined by the first discriminator model as real, and (iv) a first metric that is indicative of a difference between the input target image and a cyclic target image; adjusting first parameters of the first discriminator model to minimize the first discriminator function; and adjusting second parameters of the first generator model to minimize the first generator function.

In some embodiments, computing the first generator function includes: generating, via executing the second generator model, the cyclic target image from the predicted measured image to compute the first metric.

In some embodiments, the iteration includes: computing a second discriminator function associated with the second discriminator model as a function of: (i) a first probability that the predicted target image is determined as real, and (ii) a second probability that the input target image is determined as fake; computing a second generator function associated with the second generator model as a function of: (iii) the first probability that the predicted target image is determined by the second discriminator model as real, and (iv) a second metric that is indicative of a difference between the reference measured image and a cyclic measured image; adjusting first parameters of the second discriminator model to minimize the second discriminator function; and adjusting second parameters of the second generator model to minimize the second generator function.

In some embodiments, computing the second generator function includes: generating, via executing the first generator model, the cyclic measured image from the predicted target image to compute the second metric.

In some embodiments, the training includes training the machine learning model such that a cost function associated with the input target image, the predicted measured image and/or the reference measured image is minimized, wherein the cost function is a function of at least one of the first discriminator function, the first generator function, the second discriminator function, or the second generator function.

In some embodiments, the first discriminator function includes a log-likelihood term that determines the first probability that the predicted measured image is real and a log-likelihood term that determines the second probability that the reference measured image is fake.

In some embodiments, the first generator function includes a log-likelihood term that determines the first probability that the predicted measured image is real.

In some embodiments, the second discriminator function includes a log-likelihood term that determines the first probability that the predicted target image is real and a log-likelihood term that determines the second probability that the input target image is fake.

In some embodiments, the second generator function includes a log-likelihood term that determines the first probability that the predicted target image is real.

In some embodiments, the method further includes: receiving, by the machine learning model, a target image associated with a design pattern on a substrate; and generating, by the machine learning model and using the target image, a first predicted measured image.

In some embodiments, the method further includes: obtaining, from an image capture device, a measured image associated with the design pattern; and determining an offset between the measured image and the first predicted measured image.

In some embodiments, the method further includes: aligning the measured image with the target image by aligning the measured image with the first predicted measured image based on the offset.

In some embodiments, the offset is determined based on a cross correlation of the measured image and the first predicted measured image.

In some embodiments, the offset is determined as coordinates of the first predicted measured image where a match function indicating a match between the measured image and the first predicted measured image is the highest or exceeds a specified threshold.

In some embodiments, receiving the target image includes obtaining the target image from Graphic Database Systems (GDS) polygons associated with the design pattern.

In some embodiments, the method further includes: receiving, by the machine learning model, a measured image associated with a design pattern on a substrate; and generating, by the machine learning model and using the measured image, a first predicted target image.

In some embodiments, the method further includes: obtaining a target image associated with the design pattern; and determining an offset between the target image and the first predicted target image.

In some embodiments, the method further includes: aligning the target image with the measured image by aligning the target image with the first predicted target image based on the offset.

In some embodiments, the method further includes: receiving, by the machine learning model, (a) a target image associated with a design pattern on a first substrate, (b) a measured image associated with a design pattern on a second substrate; and generating, by the machine learning model, a first predicted measured image using the target image, and (b) a first predicted target image using the measured image.

In some embodiments, the method further includes: obtaining (a) a second measured image associated with the design pattern, and (b) a second target image associated with the design pattern; and determining (a) a first offset between the second measured image and the first predicted measured image, and (b) a second offset between the second target image and the first predicted target image.

In some embodiments, the method further includes: aligning (a) the second measured image with the first predicted measured image based on the first offset, and (b) the second target image with the first predicted target image based on the second offset.

In some embodiments, the reference design pattern is associated with a pattern to be printed on a substrate, and wherein the input target image is rendered from reference design pattern.

In some embodiments, the reference measured image is obtained from an image capture device and corresponds to the specified design pattern printed on the substrate.

In some embodiments, the method includes obtaining the input target image and the reference measured image in which a match of one or more characteristics of the input target image with one or more characteristics of the reference measured image is below a specified threshold.

In a related aspect, a method for training a machine learning model includes: obtaining an input target image associated with a reference design pattern, and a reference measured image associated with a specified design pattern printed on a substrate; and training, by a hardware computer system, the machine learning model to generate the predicted measured image, wherein the training includes: training a first module of the machine learning model to generate a predicted measured image from the input target image such that a first metric that is determined as a function of the input target image and the predicted measured image is reduced, and training a second module of the machine learning model to generate a predicted target image from the reference measured image such that a second metric that is determined as a function of the reference measured image and the predicted target image is reduced.

In some embodiments, training the machine learning model is an iterative process, wherein an iteration includes: (a) training the first module by: generating, via executing a first generator model of the first module, the predicted measured image using the input target image, and determining, via a first discriminator model of the first module, whether the predicted measured image and the reference measured image are real or fake, wherein the first discriminator model determines a first image to be real if the first image satisfies a first threshold related to a specified measured image associated with a specified design pattern printed on a substrate, and wherein the first discriminator model determines the first image to be fake if the first image does not satisfy the first threshold; and (b) training the second module by: generating, via executing a second generator model of the second module, a predicted target image using the reference measured image, and determining, via a second discriminator model of the machine learning model, whether the predicted target image and the input target image are real or fake, wherein the second discriminator model determines a second image to be real if the second image satisfies a second threshold related to the input design pattern, and wherein the second discriminator model determines the second image to be fake if the second image does not satisfy the second threshold.

In some embodiments, the iteration includes: computing a first discriminator function associated with the first discriminator model as a function of: (i) a first probability that the predicted measured image is determined as real, and (ii) a second probability that the reference measured image is determined as fake; computing a first generator function associated with the first generator model as a function of: (i) the first probability that the predicted measured image is determined by the first discriminator model as real, and (iii) the first metric; adjusting first parameters of the first discriminator model to minimize the first discriminator function; and adjusting second parameters of the first generator model to minimize the first generator function.

In some embodiments, computing the first generator function includes: generating, via executing the second generator model, a cyclic target image from the predicted measured image, and computing the first metric as a difference between the input target image and the cyclic target image.

In some embodiments, the iteration includes: computing a second discriminator function associated with the second discriminator model as a function of: (i) a first probability that the predicted target image is determined as real, and (ii) a second probability that the input target image is determined as fake; computing a second generator function associated with the second generator model as a function of: (iii) the first probability that the predicted target image is determined by the second discriminator model as real, and (iv) the second metric; adjusting first parameters of the second discriminator model to minimize the second discriminator function; and adjusting second parameters of the second generator model to minimize the second generator function.

In some embodiments, computing the second generator function includes: generating, via executing the first generator model, a cyclic measured image from the predicted target image, and computing the second metric as a difference between the reference measured image and the cyclic measured image.

In some embodiments, the input target image and the reference measured image are non-aligned with respect to one another.

In some embodiments, the method further includes: receiving, by the machine learning model, a target image associated with a design pattern on a substrate; and generating, by the machine learning model and using the target image, a first predicted measured image.

In some embodiments, the method further includes: obtaining, from an image capture device, a measured image associated with the design pattern; and determining an offset between the measured image and the first predicted measured image.

In some embodiments, the method further includes: aligning the measured image with the target image by aligning the measured image with the first predicted measured image based on the offset.

In a related aspect, a method for training a machine learning model to generate a predicted measured image includes: obtaining an input target image associated with a reference design pattern and a reference measured image associated with a specified design pattern printed on a substrate, wherein the reference measured image and the input target image are non-aligned images; and training, by a hardware computer system and using the input target image, the machine learning model to generate a predicted measured image such that a cost function associated with input target image, the predicted measured image and the reference measured image is reduced.

In some embodiments, training the machine learning model is an iterative process, wherein an iteration includes: generating, via executing a first generator model of the machine learning model, the predicted measured image from the input target image; determining, via a first discriminator model of the machine learning model, whether the predicted measured image and the reference measured image are real or fake, wherein the first discriminator model determines a first image to be real if the first image satisfies a first threshold related to a specified measured image associated with a specified design pattern printed on a substrate, and wherein the first discriminator model determines the first image to be fake if the first image does not satisfy the first threshold; generating, via executing a second generator model of the machine learning model, a predicted target image from the reference measured image; and determining, via a second discriminator model of the machine learning model, whether the predicted target image and the input target image are real or fake, wherein the second discriminator model determines a second image to be real if the second image satisfies a second threshold related to the input design pattern, and wherein the second discriminator model determines the second image to be fake if the second image does not satisfy the second threshold.

In some embodiments, the iteration includes: computing a first discriminator function associated with the first discriminator model as a function of: (i) a first probability that the predicted measured image is determined as real, and (ii) a second probability that the reference measured image is determined as fake; computing a first generator function associated with the first generator model as a function of: (i) the first probability that the predicted measured image is determined by the first discriminator model as real, and (iii) a first metric that is indicative of a difference between the input target image and a cyclic target image; adjusting first parameters of the first discriminator model to minimize the first discriminator function; and adjusting second parameters of the first generator model to minimize the first generator function.

In some embodiments, computing the first generator function includes: generating, via executing the second generator model, the cyclic target image from the predicted measured image to compute the first metric.

In some embodiments, the iteration includes: computing a second discriminator function associated with the second discriminator model as a function of: (i) a first probability that the predicted target image is determined as real, and (ii) a second probability that the input target image is determined as fake; computing a second generator function associated with the second generator model as a function of: (iii) the first probability that the predicted target image is determined by the second discriminator model as real, and (iv) a second metric that is indicative of a difference between the reference measured image and a cyclic measured image; adjusting first parameters of the second discriminator model to minimize the second discriminator function; and adjusting second parameters of the second generator model to minimize the second generator function.

In some embodiments, computing the second generator function includes: generating, via executing the first generator model, the cyclic measured image from the predicted target image to compute the second metric.

In a related aspect, a method for training a machine learning model to generate a predicted target image includes: obtaining an input measured image associated with a specified design pattern printed on a substrate and a reference target image associated with a reference design pattern, wherein the input measured image and the reference target image are non-aligned images; and training, by a hardware computer system and using the input measured image, the machine learning model to generate a predicted target image such that a cost function associated with the input measured image, the reference target image, and the predicted target image is reduced.

In some embodiments, training the machine learning model is an iterative process, wherein an iteration includes: generating, via executing a first generator model of the machine learning model, a predicted target image from the input measured image; determining, via a first discriminator model of the machine learning model, whether the predicted target image and the reference target image are real or fake, wherein the first discriminator model determines a first image to be real if the first image satisfies a first threshold related to the reference design pattern, and wherein the first discriminator model determines the first image to be fake if the first image does not satisfy the first threshold; generating, via executing a second generator model of the machine learning model, the predicted measured image from the reference target image; and determining, via a second discriminator model of the machine learning model, whether the predicted measured image and the input measured image are real or fake, wherein the second discriminator model determines a second image to be real if the second image satisfies a second threshold related to a specified measured image associated with a specified design pattern printed on a substrate, and wherein the second discriminator model determines the second image to be fake if the second image does not satisfy the second threshold According to an embodiment, there is provided a computer program product comprising a non-transitory computer readable medium having instructions recorded thereon. The instructions, when executed by a computer, implement the methods listed in the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed embodiments. In the drawings.

FIG. 3 illustrates an exemplary measured contour obtained from an image of a printed pattern, according to an embodiment.

FIG. 4 illustrates an exemplary method of aligning a measured contour with a simulated contour, according to an embodiment.

FIG. 25 schematically depicts an example inspection apparatus and metrology technique.

DETAILED DESCRIPTION

Figure 1:
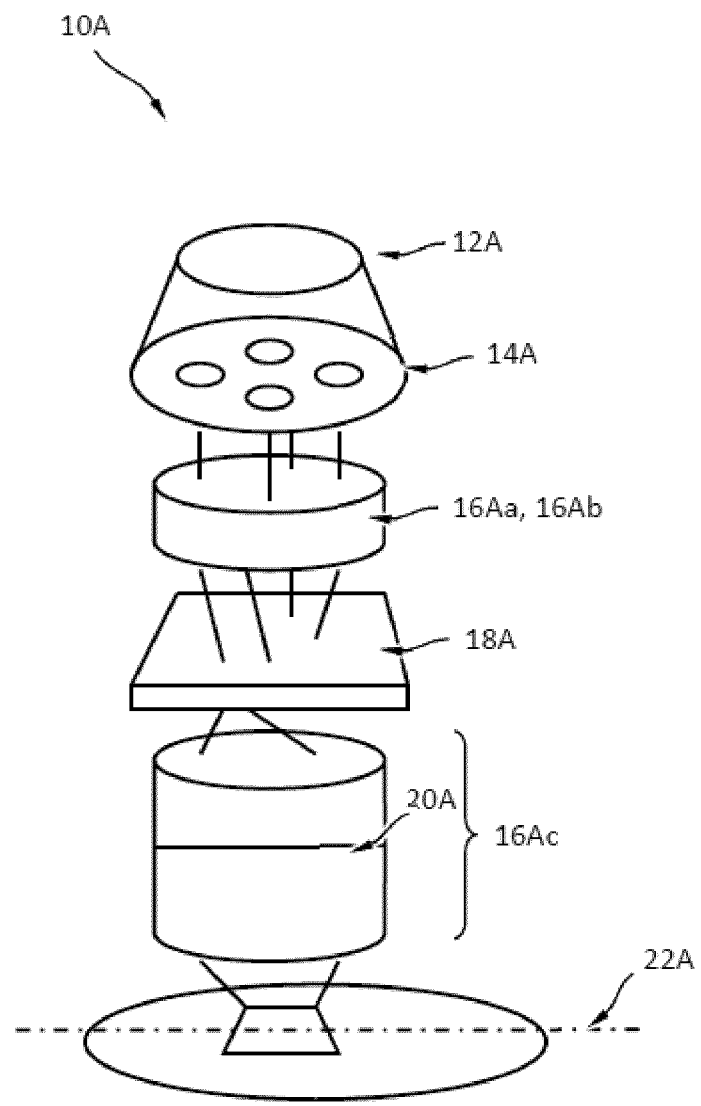
FIG. 1 illustrates a block diagram of various subsystems of a lithographic projection apparatus, according to an embodiment.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include a programmable mirror array and a programmable LCD array.

An example of a programmable mirror array can be a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

An example of a programmable LCD array is given in U.S. Pat. No. 5,229,872, which is incorporated herein by reference.

FIG. 1 illustrates a block diagram of various subsystems of a lithographic projection apparatus 10A, according to an embodiment. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics $NA=n \sin(\Theta_{max})$, wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist model can be used to calculate the resist image from the aerial image, an example of which can be found in U.S. Patent Application Publication No. US 2009-0157630, the disclosure of which is hereby incorporated by reference in its entirety. The resist model is related only to properties of the resist layer (e.g., effects of chemical processes which occur during exposure, post-exposure bake (PEB) and development). Optical properties of the lithographic projection apparatus (e.g., properties of the illumination, the patterning device and the projection optics) dictate the aerial image and can be defined in an optical model. Since the patterning device used in the lithographic projection apparatus can be changed, it is desirable to separate the optical properties of the patterning device from the optical properties of the rest of the lithographic projection apparatus including at least the source and the projection optics. Details of techniques and models used to transform a design layout into various lithographic images (e.g., an aerial image, a resist image, etc.), apply OPC using those techniques and models and evaluate performance (e.g., in terms of process window) are described in U.S. Patent Application Publication Nos. US 2008-0301620, 2007-0050749, 2007-0031745, 2008-0309897, 2010-0162197, and 2010-0180251, the disclosure of each which is hereby incorporated by reference in its entirety.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous tone mask or a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. In an embodiment, CTM may be a pixelated gray scale image, where each pixel having values (e.g., within a range

[-255, 255], normalized values within a range [0, 1] or [-1, 1] or other appropriate ranges).

The thin-mask approximation, also called the Kirchhoff boundary condition, is widely used to simplify the determination of the interaction of the radiation and the patterning device. The thin-mask approximation assumes that the thickness of the structures on the patterning device is very small compared with the wavelength and that the widths of the structures on the mask are very large compared with the wavelength. Therefore, the thin-mask approximation assumes the electromagnetic field after the patterning device is the multiplication of the incident electromagnetic field with the mask transmission function. However, as lithographic processes use radiation of shorter and shorter wavelengths, and the structures on the patterning device become smaller and smaller, the assumption of the thin-mask approximation can break down. For example, interaction of the radiation with the structures (e.g., edges between the top surface and a sidewall) because of their finite thicknesses ("mask 3D effect" or "M3D") may become significant. Encompassing this scattering in the mask transmission function may enable the mask transmission function to better capture the interaction of the radiation with the patterning device. A mask transmission function under the thin-mask approximation may be referred to as a thin-mask transmission function. A mask transmission function encompassing M3D may be referred to as a M3D mask transmission function.

According to an embodiment of the present disclosure, one or more images may be generated. The images includes various types of signal that may be characterized by pixel values or intensity values of each pixel. Depending on the relative values of the pixel within the image, the signal may be referred as, for example, a weak signal or a strong signal, as may be understood by a person of ordinary skill in the art. The term "strong" and "weak" are relative terms based on intensity values of pixels within an image and specific values of intensity may not limit scope of the present disclosure. In an embodiment, the strong and weak signal may be identified based on a selected threshold value. In an embodiment, the threshold value may be fixed (e.g., a midpoint of a highest intensity and a lowest intensity of pixel within the image. In an embodiment, a strong signal may refer to a signal with values greater than or equal to an average signal value across the image and a weak signal may refer to signal with values less than the average signal value. In an embodiment, the relative intensity value may be based on percentage. For example, the weak signal may be signal having intensity less than 50% of the highest intensity of the pixel (e.g., pixels corresponding to target pattern may be considered pixels with highest intensity) within the image. Furthermore, each pixel within an image may considered as a variable. According to the present embodiment, derivatives or partial derivative may be determined with respect to each pixel within the image and the values of each pixel may be determined or modified according to a cost function-based evaluation and/or gradient based computation of the cost function. For example, a CTM image may include pixels, where each pixel is a variable that can take any real value.

Figure 2:
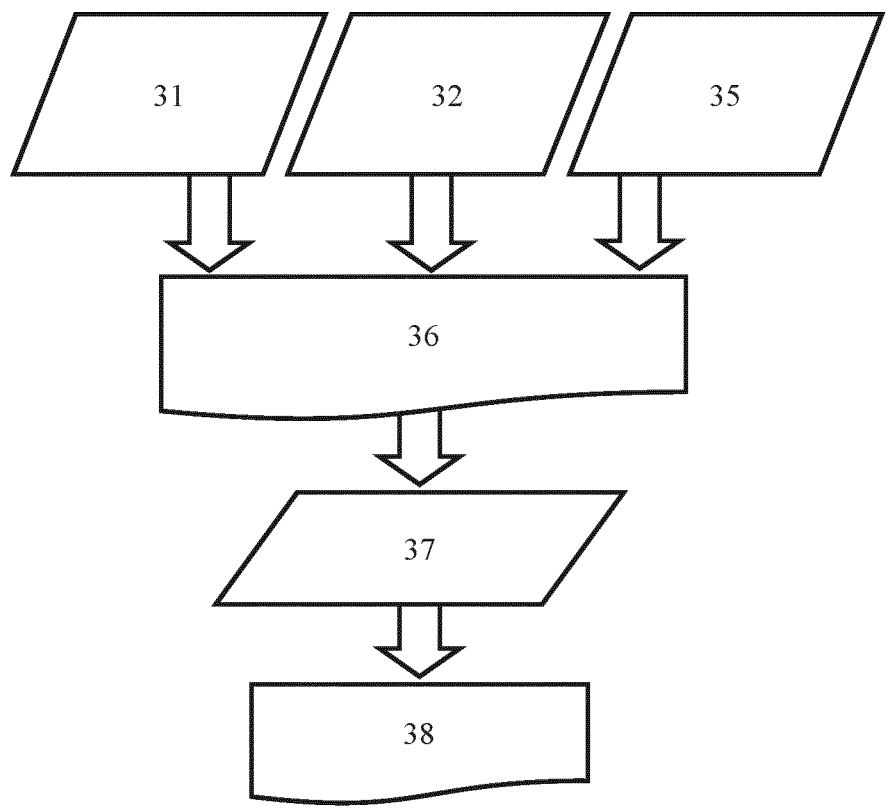
FIG. 2 illustrates an exemplary flow chart for simulating lithography in a lithographic projection apparatus, according to an embodiment.

FIG. 2 illustrates an exemplary flow chart for simulating lithography in a lithographic projection apparatus, according to an embodiment. Source model 31 represents optical characteristics (including radiation intensity distribution and/or phase distribution) of the source. Projection optics model 32 represents optical characteristics (including changes to the radiation intensity distribution and/or the phase distribution caused by the projection optics) of the projection optics. Design layout model 35 represents optical characteristics of a design layout (including changes to the radiation intensity distribution and/or the phase distribution caused by design layout 33), which is the representation of an arrangement of features on or formed by a patterning device. Aerial image 36 can be simulated from design layout model 35, projection optics model 32, and design layout model 35. Resist image 38 can be simulated from aerial image 36 using resist model 37. Simulation of lithography can, for example, predict contours and CDs in the resist image.

More specifically, it is noted that source model 31 can represent the optical characteristics of the source that include, but not limited to, numerical aperture settings, illumination sigma ($\sigma$) settings as well as any particular illumination shape (e.g. off-axis radiation sources such as annular, quadrupole, dipole, etc.). Projection optics model 32 can represent the optical characteristics of the projection optics, including aberration, distortion, one or more refractive indexes, one or more physical sizes, one or more physical dimensions, etc. Design layout model 35 can represent one or more physical properties of a physical patterning device, as described, for example, in U.S. Pat. No. 7,587,704, which is incorporated by reference in its entirety. The objective of the simulation is to accurately predict, for example, edge placement, aerial image intensity slope and/ or CD, which can then be compared against an intended design. The intended design is generally defined as a pre-OPC design layout which can be provided in a standardized digital file format such as GDSII or OASIS or other file format.

From this design layout, one or more portions may be identified, which are referred to as "clips". In an embodiment, a set of clips is extracted, which represents the complicated patterns in the design layout (typically about 50 to 1000 clips, although any number of clips may be used). These patterns or clips represent small portions (i.e. circuits, cells or patterns) of the design and more specifically, the clips typically represent small portions for which particular attention and/or verification is needed. In other words, clips may be the portions of the design layout, or may be similar or have a similar behavior of portions of the design layout, where one or more critical features are identified either by experience (including clips provided by a customer), by trial and error, or by running a full-chip simulation. Clips may contain one or more test patterns or gauge patterns.

An initial larger set of clips may be provided a priori by a customer based on one or more known critical feature areas in a design layout which require particular image optimization. Alternatively, in another embodiment, an initial larger set of clips may be extracted from the entire design layout by using some kind of automated (such as machine vision) or manual algorithm that identifies the one or more critical feature areas.

In a lithographic projection apparatus, as an example, a cost function may be expressed as $$CF(z_1, z_2, \ldots, z_N) = \sum_{p=1}^{P} w_p f_p^2(z_1, z_2, \ldots, z_N) \quad \text{(Eq. 1)}$$

where $(z_1, z_2, \ldots, z_N)$ are N design variables or values thereof. $f_p(z_1, z_2, \ldots, z_N)$ can be a function of the design variables $(z_1, z_2, \ldots, z_N)$ such as a difference between an actual value and an intended value of a characteristic for a set of values of the design variables of $(z_1, z_2, \ldots, z_N)$. $w_p$ is a weight constant associated with $f_p(z_1, z_2, \ldots, z_N)$. For example, the characteristic may be a position of an edge of a pattern, measured at a given point on the edge. Different $f_p(z_1, z_2, \ldots, z_N)$ may have different weight $w_p$. For example, if a particular edge has a narrow range of permitted positions, the weight $w_p$ for the $f_p(z_1, z_2, \ldots, z_N)$ representing the difference between the actual position and the intended position of the edge may be given a higher value. $f_p(z_1, z_2, \ldots, z_N)$ can also be a function of an interlayer characteristic, which is in turn a function of the design variables $(z_1, z_2, \ldots, z_N)$. Of course, CF $(z_1, z_2, \ldots, z_N)$ is not limited to the form in Eq. 1. CF $(z_1, z_2, \ldots, z_N)$ can be in any other suitable form.

The cost function may represent any one or more suitable characteristics of the lithographic projection apparatus, lithographic process or the substrate, for instance, focus, CD, image shift, image distortion, image rotation, stochastic variation, throughput, local CD variation, process window, an interlayer characteristic, or a combination thereof. In one embodiment, the design variables $(z_1, z_2, \ldots, z_N)$ comprise one or more selected from dose, global bias of the patterning device, and/or shape of illumination. Since it is the resist image that often dictates the pattern on a substrate, the cost function may include a function that represents one or more characteristics of the resist image. For example, $f_p(z_1, z_2, \ldots, z_N)$ can be simply a distance between a point in the resist image to an intended position of that point (i.e., edge placement error $EPE_p(z_1, z_2, \ldots, z_N)$. The design variables can include any adjustable parameter such as an adjustable parameter of the source, the patterning device, the projection optics, dose, focus, etc.

The lithographic apparatus may include components collectively called a "wavefront manipulator" that can be used to adjust the shape of a wavefront and intensity distribution and/or phase shift of a radiation beam. In an embodiment, the lithographic apparatus can adjust a wavefront and intensity distribution at any location along an optical path of the lithographic projection apparatus, such as before the patterning device, near a pupil plane, near an image plane, and/or near a focal plane. The wavefront manipulator can be used to correct or compensate for certain distortions of the wavefront and intensity distribution and/or phase shift caused by, for example, the source, the patterning device, temperature variation in the lithographic projection apparatus, thermal expansion of components of the lithographic projection apparatus, etc. Adjusting the wavefront and intensity distribution and/or phase shift can change values of the characteristics represented by the cost function. Such changes can be simulated from a model or actually measured. The design variables can include parameters of the wavefront manipulator.

The design variables may have constraints, which can be expressed as $(z_1, z_2, \ldots, z_N) \in Z$, where $Z$ is a set of possible values of the design variables. One possible constraint on the design variables may be imposed by a desired throughput of the lithographic projection apparatus. Without such a constraint imposed by the desired throughput, the optimization may yield a set of values of the design variables that are unrealistic. For example, if the dose is a design variable, without such a constraint, the optimization may yield a dose value that makes the throughput economically impossible. However, the usefulness of constraints should not be interpreted as a necessity. For example, the throughput may be affected by the pupil fill ratio. For some illumination designs, a low pupil fill ratio may discard radiation, leading to lower throughput. Throughput may also be affected by the resist chemistry. Slower resist (e.g., a resist that requires higher amount of radiation to be properly exposed) leads to lower throughput.

As used herein, the term "patterning process" generally means a process that creates an etched substrate by the application of specified patterns of light as part of a lithography process. However, "patterning process" can also include plasma etching, as many of the features described herein can provide benefits to forming printed patterns using plasma processing.

As used herein, the term "target pattern" means an idealized pattern that is to be etched on a substrate.

As used herein, the term "printed pattern" means the physical pattern on a substrate that was etched based on a target pattern. The printed pattern can include, for example, troughs, channels, depressions, edges, or other two and three dimensional features resulting from a lithography process.

As used herein, the term "process model" means a model that includes one or more models that simulate a patterning process. For example, a process model can include an optical model (e.g., that models a lens system/projection system used to deliver light in a lithography process and may include modelling the final optical image of light that goes onto a photoresist), a resist model (e.g., that models physical effects of the resist, such as chemical effects due to the light), and an OPC model (e.g., that can be used to make target patterns and may include sub-resolution resist features (SRAFs), etc.).

As used herein, the term "calibrating" means to modify (e.g., improve or tune) and/or validate something, such as the process model.

FIG. 3 illustrates an exemplary measured contour 330 obtained from an image of a printed pattern, according to an embodiment.

Lithographic processes can create of printed patterns (e.g., circuit patterns for integrated circuits or computer chips) based on, for example, target pattern 310 (shown in the top panel of FIG. 3). Due to limitations in the patterning process, a printed pattern will generally only be an approximation of the target pattern 310.

A printed pattern can be imaged by an image capture device to generate measured image 320 (shown in the middle panel of FIG. 3), which contains contours that correspond to the idealized shapes in target pattern 310. The image capture device can be used for both metrology and inspection. In one embodiment, the image capture device can be an electron beam tool (e.g., FIGS. 23-24) and in another embodiment it can be an optical tool (e.g., FIGS. 25-27). In one embodiment, a method can include obtaining measured contour 330 from the image capture device, for example, a scanning electron microscope (also referred to as an electron beam inspection system or electron beam tool). The electron beam inspection system can be similar to scanning electron microscope but have a large field of view (LFOV) and high throughput for obtaining measured image 320. One non-limiting example of an electron beam inspection system can be an HMI eP5, specifically configured to have a LFOV. In some embodiments, a LFOV can measure, on a side, for example, approximately 1-1000 microns, 100-500 microns, 1-50 microns, 6-12 microns, etc. The image capture device can be configured to detect hotspots and/or weak-points in the printed pattern as well as gates and active areas of a memory array, such as a static random access memory (SRAM). As illustrated in FIG. 3, measured image 320 resembles the printed pattern, but the rectangular features in measured image 320 show rounding and slightly distorted lines.

Some embodiments can include identifying measured contour 330 (shown in the bottom panel of FIG. 3) based on a change in intensity of pixels in measured image 320. Image analysis techniques can be used to identify measured contour 330 in measured image 320. Changes in intensity, gradient, and the like, can identify a change in height (or depth) of features in printed pattern, for example as used with edge determination. For example, when the measured image is expressed as a greyscale image, when the change exceeds a greyscale threshold (i.e., an intensity above or below a defined value), this can identify an edge (i.e. measured contour 330).

FIG. 4 illustrates an exemplary method of aligning measured contour 330 with simulated contour 510, according to an embodiment.

Process models that simulate a printed pattern can include any combination of resist models, optical models, optical proximity correction models, etc. Accordingly, simulated contour 510 can be generated from a simulation of the process model. As used herein, "simulated contour 510" means a contour that is generated by one or more computational models and represents a predicted outcome (whether a final stage or an intermediate stage) of a lithography process.

To calibrate a process model, measured contours 330 can be compared with simulated contours 510. As part of the calibration process, measured contour 330 can be aligned with simulated contour 510. In the example of FIG. 4, measured contour 330 (as represented in this specific illustration by a graphical representation of measured image 320) can be compared with simulated contour 510. In the upper diagram of FIG. 4, measured contour 330 is not aligned properly with simulated contour 510. Measured contour 330 can be translated and/or rotated over simulated contour 510 until measured contour 330 is in approximately the correct position, as shown in the lower diagram of FIG. 4. This can provide a coarse alignment which can be further improved upon as described below.

Figure 5:
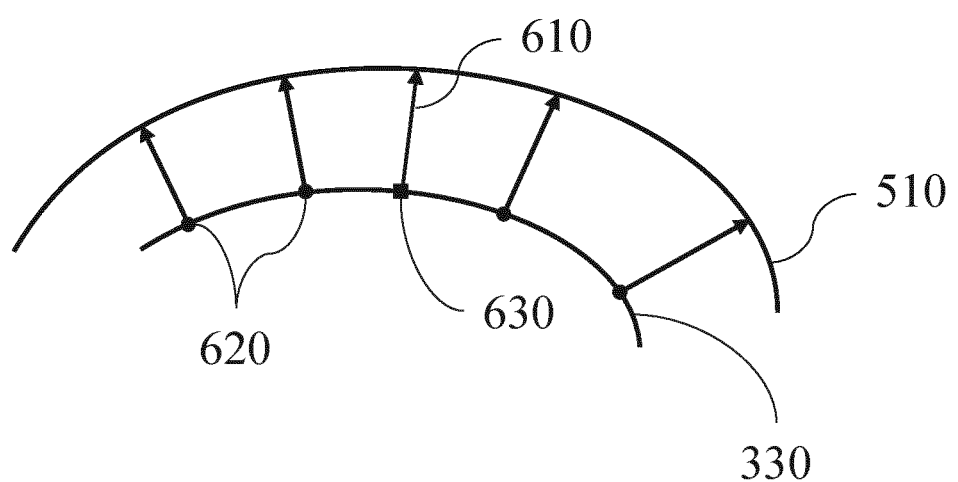
FIG. 5 illustrates an exemplary method of determining an offset between a measured contour and a simulated contour, according to an embodiment.

FIG. 5 illustrates an exemplary method of determining offset 610 between measured contour 330 and simulated contour 510, according to an embodiment.

Other alignment methods can be implemented, for example, after the coarse alignment described above with reference to FIG. 5. Such implementations can include aligning measured contour 330 with simulated contour 510 by determining offset 610 between measured contour 330 and simulated contour 510. As used herein, "offset 610" means a distance between a point on measured contour 330, and another point on simulated contour 510. The present disclosure provides various methods for determining offset 610. For example, offset 610 can be further determined based on measurement coordinates 620 substantially defining a portion of the measured contour 330. As used herein, the term "measurement coordinates" means coordinates that define some or all of a measured contour. Measurement coordinates can be generated by the imaging device, by analysis of images taken by the imaging device, etc. For example, measurement coordinates can be pixel positions that have been determined to correspond to an edge of a contour. Accordingly, an edge detection program can generate measurement coordinates 620 based on image processing of measured image 320. Examples of measurement coordinates 620 are illustrated in FIG. 5 by circles on measured contour 330.

In one embodiment, offset 610 can be further determined based on distances between measurement coordinates 620 and simulated contour 510. In some specific embodiments, the distances can be in directions perpendicular to measured contour 330 at measurement coordinates 620. In other embodiments, the degree of alignment can be determined by for example, summing the squares of distance of some or all offsets, or summing some or all offsets. This can be performed, for example, with the x-component and/or the y-component of the perpendicular offset vector.

In some embodiments, the aligning can further include reducing a cost function calculated based on the distances. Examples of cost functions are described above (e.g., the description of Eqn. 1). A cost function can be reduced by, for example, fine adjustments to the position of measured contour 330. When cost function is at a minimum (or otherwise satisfactory value), the alignment of measured contour 330 to simulated contour 510 can be used for further processes or as a measure of the process model calibration. In some embodiments, fine aligning the measured contour 330 includes improving the cost function further even after coarse aligning, e.g., reducing the cost function from a first value to a second value, to result in a more accurate alignment of the measured contour 330. That is, the cost function associated with the fine alignment is an improved cost function in comparison to the cost function associated with the coarse alignment (e.g., cost function after fine alignment has a lower value than the cost function after coarse alignment).

To provide additional points for the alignment methods described herein, certain embodiments can include generating any number of additional points (e.g., edge placement (EP) coordinates) on measured contour 330. As used herein, EP coordinate 630 (also referred to herein as an EP gauge), is an additional point that defines measured contour 330. One example of EP coordinate 630 is illustrated in FIG. 5 by the solid square located on measured contour 330. In some embodiments, EP coordinate 630 can be generated by interpolating between two or more measurement coordinates 620. In other embodiments, EP coordinate 630 can be generated by extrapolating from two or more measurement coordinates 620. Accordingly, offset 610 can be further determined based on EP coordinate 630, alternatively or in addition to, measurement coordinates 620.

In some embodiments, simulated contour 510 can be obtained from Graphic Database Systems (GDS) polygons, i.e., polygons generated by the process model and corresponding to a contour shape. In other embodiments, the GDS polygons can be in one or more formats selected from GDS stream format (GDSII) and Open Artwork System Interchange Standard (OASIS). Then, as part of the calibration process, edge placement coordinates 630 and/or measurement coordinates 620 comprising measured simulated contour 510 can be converted into GDS coordinates. Such a conversion can allow a more direct comparison between simulated contour 510 and measured contour 330.

Figure 6:
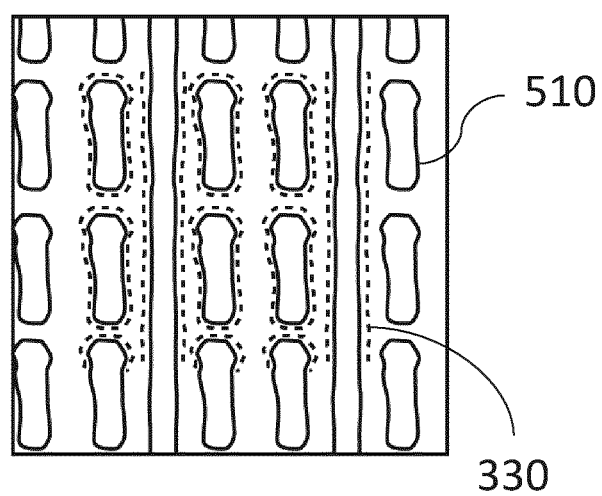
FIG. 6 illustrates an exemplary improvement of matching a simulated contour to a measured contour, according to an embodiment.

FIG. 6 illustrates an exemplary improvement of matching a simulated contour 510 to a measured contour 330, according to an embodiment.

The embodiments described herein can facilitate calibrating a process model to provide a more accurate match between a simulated contour 510 (generated by the process model) and the measured contour 330. In some embodiments, calibrating the process model can include reducing a difference, computed based on a determined offset 610, between simulated contour 510 and measured contour 330.

As used herein, "difference" means a quantified measure of degree of deviation between two or more contours. One non-limiting example of a difference is the aforementioned cost function. Another example of a difference can also be the offset or distance between points on two contours, without using them in a cost function.

In some embodiments, methods can include modifying a feature of the process model to reduce the difference. In some embodiments, the modifying can cause a change to a shape of simulated contour 510. Examples of features of the resist model that can be modified can include diffusion rate, diffusion range, deprotection ratio, and acid/base concentration. Modifications performed in this way can be considered a "fine-tuning" of the process model to improve its ability to predict measured contours 330. In some embodiments, this can result in an improved optical model, resist model, OPC model, etc.

Figure 7:
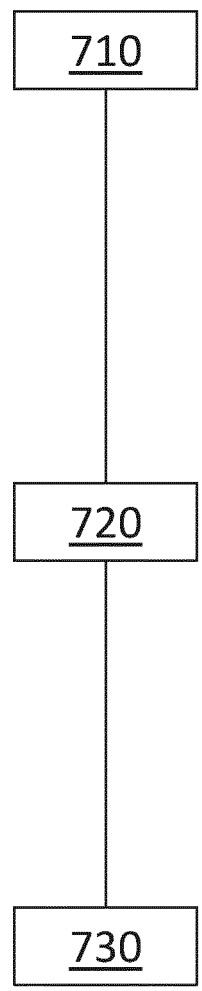
FIG. 7 illustrates an exemplary method of calibrating a process model, according to an embodiment.

FIG. 7 illustrates an exemplary method of calibrating a process model, according to an embodiment.

In some embodiments, a method for improving a process model for a patterning process can include, at 710, obtaining a) measured contour 330 from the image capture device, b) simulated contour 510 generated from a simulation of the process model.

At 720, aligning measured contour 330 with simulated contour 510 by determining offset 610 between measured contour 330 and simulated contour 510.

At 730, calibrating the process model to reduce a difference, computed based on determined offset 610, between simulated contour 510 and measured contour 330.

The foregoing paragraphs describe aligning images using contours and EP coordinates. In some embodiments, spatial domain-based image processing, such as the above, deals with processing the images by processing the value of the pixels of the image. Such spatial domain-based image processing for aligning the images can consume significant computing resources, e.g., processor capacity, memory and time, especially when the search range for aligning the image increases. That is, the larger the size of the image with which the measured image 320 is to be aligned the higher is the consumption of computing resources.

Additional details with respect to aligning an image using contours are described in U.S. Patent Application Ser. Nos. 62/680,284, filed on Jun. 4, 2018, which is incorporated by reference in its entirety.

In some embodiments, the image alignment process can be improved using frequency domain-based image processing. In frequency domain-based image processing, the images are processed based on the rate at which the pixel values are changing in spatial domain rather than the actual values of the pixel. In some embodiments, the frequency domain-based image processing can aid in aligning the images faster than the above spatial domain-based image processing. The frequency domain-based image processing can minimize the computing resources, such as processor capacity, memory and time, consumed in aligning the images.

In some embodiments, two images can be aligned by determining a similarity between the two images. Cross-Correlation is one such technique used to determine the similarity between images. In signal processing, cross-correlation is a measure of similarity of two series as a function of the displacement of one relative to the other. In image processing, a correlation value indicates a measure of similarity between a reference image (template) and a target image (search image). The result will be maximum for locations where the template have correspondence (pixel by pixel) to the search image located at (x,y). That is, the output of the cross-correlation function for determining the similarity between two images can include a correlation value and co-ordinates of the target image where the reference image has the highest similarity.

Correlation of images can be also done in the frequency domain. For example, correlation is obtained by multiplying a transform (e.g., Fourier or Fast Fourier) of the target image with the complex conjugate of a transform (e.g., Fourier or Fast Fourier) of the reference image. Peak locations (high correlations indicating a match) at spatial domain are then obtained using the inverse (Fourier) transform.

In some embodiments, a normalized cross-correlation (NCC) function, which is a variation of the cross-correlation function is used to determine the similarity between two images. In some embodiments, NCC is the inverse Fourier transform of the convolution of the Fourier transform of two images, normalized using the local sums and sigmas. In other words, normalized cross-correlation is not unlike a dot product where the result is the equivalent to the cosine of the angle between the two normalized pixel intensity vectors.

Figure 8:
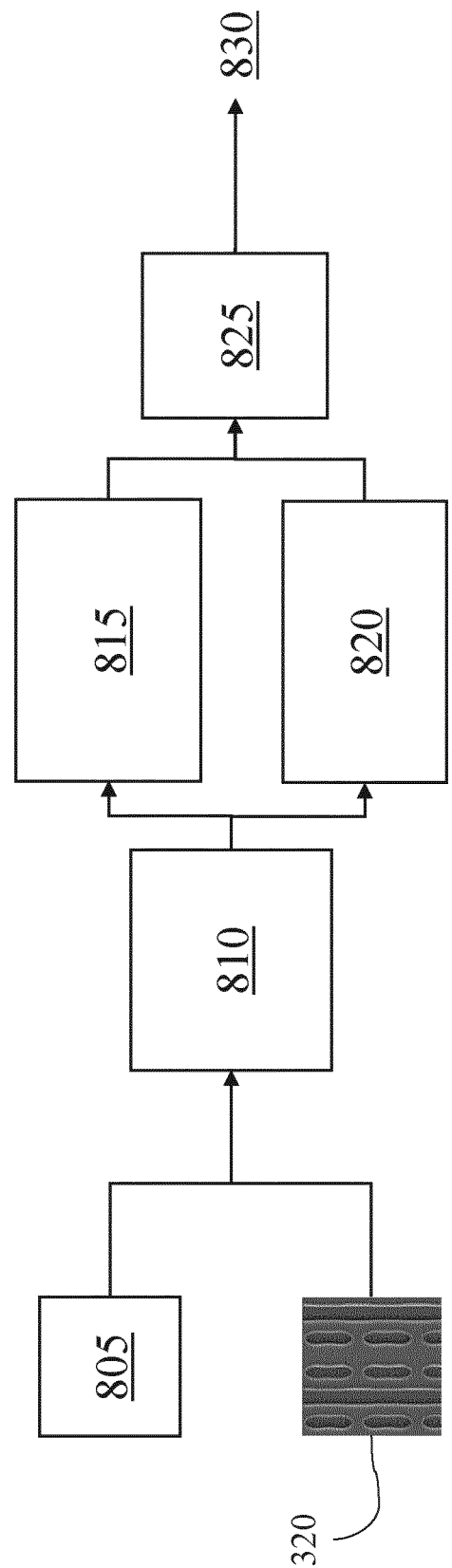
FIG. 8 is a block diagram of an example of frequency domain-based image alignment, according to an embodiment.

FIG. 8 is a block diagram of an example of frequency domain-based image alignment, according to an embodiment. A reference image 805 with which another image, such as the measured image 320, has to be aligned is transformed into frequency domain using a transformation function 810. Similarly, the measured image 320 is also transformed into frequency domain using the transformation function 810. In some embodiments, the transformation function 810 is a Fourier transform. The Fourier Transform is a tool which is used to decompose an image into its sine and cosine components.

The transformed reference image 815 and the transformed measured image 820 are correlated using a match function or a correlation function 825 to determine a similarity between the two images. The correlation function 825 can be the NCC function described above. The correlation function 825 determines a correlation value and an offset 830 relative to the reference image 805 at which a match between the measured image 320 and the reference image 805, or the similarity of the measured image 320 to the reference image 805, is the highest or above a specified threshold. In some embodiments, the correlation value is in the range of −1 to 1, where −1 indicates that the images are not similar and 1 indicates that the images are the same. The closer the correlation value to 1, the more similar is the measured image 320 to a portion of the reference image 805 determined based on the offset 830.

The measured image 320 is said to be aligned with the reference image 805 when the correlation value is the highest or above a specified threshold at a portion of the reference image 805 determined based on the offset 830.

In some embodiments, the offset 830 can be the actual co-ordinates (e.g., x, y) of a pixel in the reference image 805 at which the measured image 320 is considered to be aligned with the reference image 805 when the measured image 320 is moved such that a center pixel of the measured image 320 coincides with the pixel at the actual co-ordinates.

In some embodiments, the offset 830 can be indicated as (dx, dy) value pair, which indicates the direction and number of pixels (in x direction and y direction) a center pixel of the measured image 320 has to be moved from the center pixel of the reference image 805 for the measured image 320 to be aligned with the reference image 805.

The frequency domain-based image alignment provides an alignment between images that is reliable when the two images being compared are similar enough (e.g., correlation value exceeds a specified threshold), else the images would not be aligned or poorly aligned. Accordingly, to enable aligning of the measured image 320 an image that is similar enough (e.g., similarity exceeding a specified threshold) to the measured image 320 may have to be generated prior to aligning the measured image.

Figure 9:
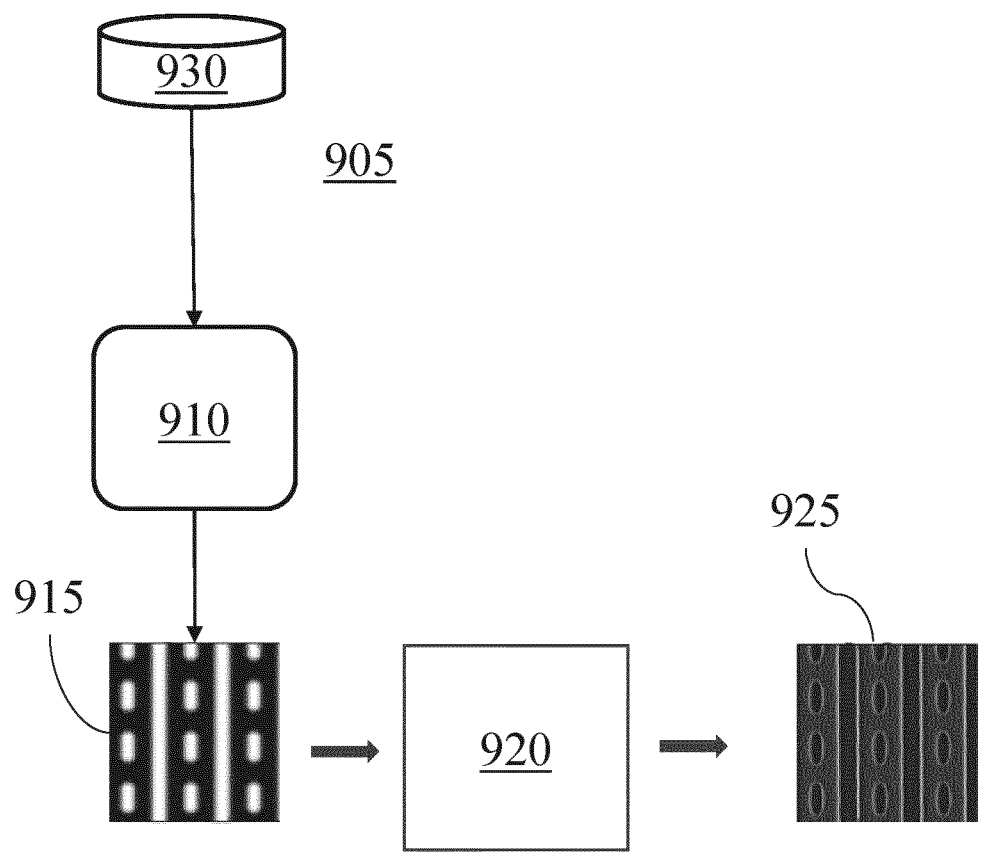
FIG. 9 is a block of diagram of an image generator for predicting a measured image, according to an embodiment.

FIG. 9 is a block of diagram of an image generator for predicting a measured image, according to an embodiment. A design pattern 905 is a representation, e.g., polygons in a database 930 such as the GDS, of a pattern to be etched on a substrate. A target image 915 is an image obtained from the design pattern 905. An image renderer 910 can render the target image 915 from the design pattern 905 using one or more image rendering techniques. The measured image 320, as described above at least with reference to FIG. 3, is an image of the actual design pattern printed on the substrate captured by the image capture device. In some embodiments, the target image 915 and the measured image 320 are not similar enough to be aligned using frequency domain-based image alignment techniques. Accordingly, an image generator model 920 is configured to predict a measured image (or generate a predicted measured image 925) using the target image 915. In some embodiments, the predicted measured image 925 is a prediction of how the design pattern 905 printed on the substrate may look like when imaged by the image capture device. The predicted measured image 925 can then be used to align the measured image 320 using frequency domain as described below at least with reference to FIG. 10.

In some embodiments, the image generator model 920 is a machine learning model that is trained to predict a measured image, such as the predicted measured image 925, using a target image, such as the target image 915, as an input. The details of training the image generator model 920 to generate a predicted measured image are discussed in detail at least with reference to FIGS. 12 and 17 below.

Figure 10:
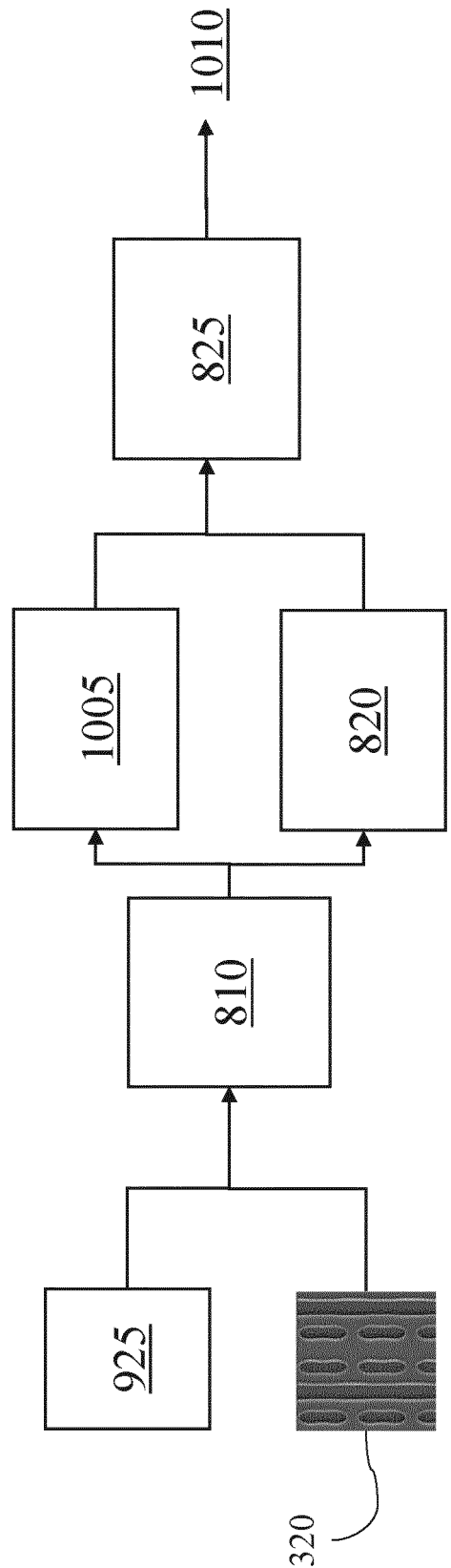
FIG. 10 is a block diagram of aligning a measured image with a predicted measured image using frequency domain, according to an embodiment.

FIG. 10 is a block diagram of aligning a measured image with a predicted measured image using frequency domain, according to an embodiment. The predicted measured image 925 and the measured image 320 are transformed into frequency domain using the transformation function 810 to generate transformed predicted measured image 1005 and transformed measured image 820, as described at least with reference to FIG. 8.

The transformed images are correlated using the correlation function 825 to determine a similarity between the two images. The correlation function 825 determines (a) a correlation value indicative of a measure of the similarity between two images, and (b) an offset 1010 relative to the predicted measured image 925 at which the similarity of the measured image 320 to the predicted measured image 925 is the highest or above a specified threshold.

The measured image 320 is said to be aligned with the predicted measured image 925 at the co-ordinates of the predicted measured image 925 determined based on the offset 1010 when the correlation value is the highest or above a specified threshold. In some embodiments, the offset 1010 is similar to the offset 830 of FIG. 8.

Figure 11:
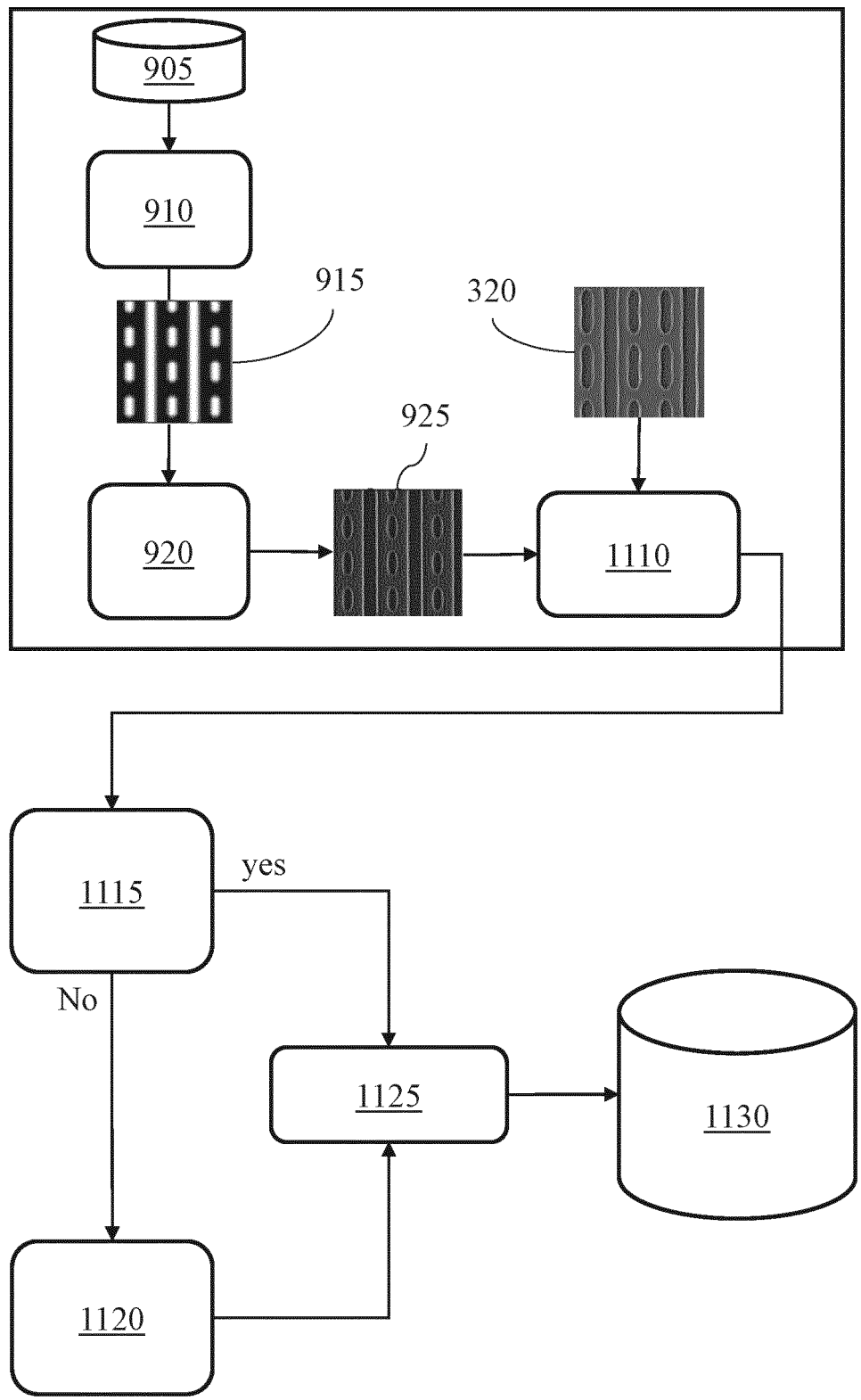
FIG. 11 is a block diagram of aligning a measured image using frequency domain and spatial domain, according to an embodiment.

FIG. 11 is a block diagram of aligning a measured image using frequency domain and spatial domain, according to an embodiment. In some embodiments, the measured image 320 may have to be aligned using both frequency domain and spatial domain to obtain an alignment that meets a specified criterion. However, performing a first alignment (e.g., coarse alignment) using frequency domain and then a second alignment (e.g., fine alignment) using spatial domain is much more efficient and less resource intensive than performing an overall alignment using the spatial domain.

The predicted measured image 925 and the measured image 320 are input to a first aligner 1110, which aligns the measured image 320 with the predicted measured image 925 using frequency domain, as described at least with reference to FIGS. 8 and 10. The predicted measured image 925 is generated by the image generator model 920 using the target image 915 as described at least with reference FIG. 9.

After the measured image 320 is aligned using frequency domain by the first aligner 1110, it is determined whether the alignment specification is satisfied at 1115. If the alignment specification is satisfied, the measured image 320 is input to a second aligner 1125, which performs a second alignment of the measured image 320 with the predicted measured image 925 in the spatial domain to generate an aligned measured image 1130. The second alignment can be a fine alignment, which is described at least with reference to FIG. 5. In some embodiments, performing fine alignment can include making fine adjustments to the position of measured contour 330 such that a cost function is minimized. The cost function can be calculated based on the distances between points on the simulated contour of the predicted measured image 925 (such as the simulated contour 510) and the measured contour 330.

If the alignment performed by the first aligner 1110 does not satisfy the alignment specification, the contour extractor 1120 obtains the measured contour 330 and the simulated contour 510 for performing the second alignment in the spatial domain. The second aligner 1125 performs the second alignment using the measured contour 330 and the simulated contour 510, as described at least with reference to FIGS. 3-7. The aligned measured image 1130 is then stored in a database. In some embodiments, the second alignment performed when the alignment specification is not met can include both coarse and fine alignment.

In some embodiments, the alignment specification can include one or more metrics that are indicative of a quality and/or accuracy of the alignment. If one or more metrics are not satisfied by the first alignment, the alignment specification will not be satisfied.

Figure 12:
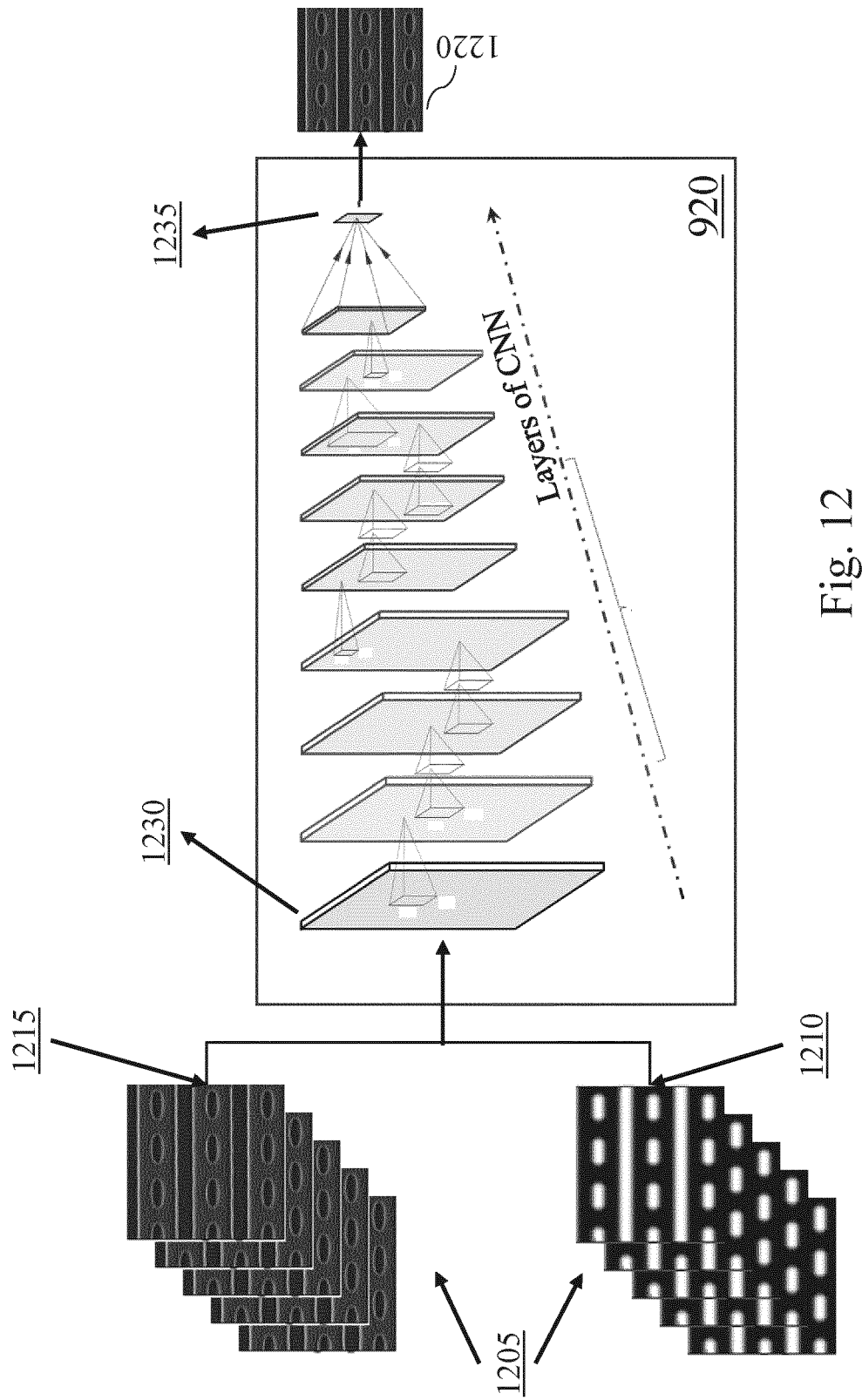
FIG. 12 is a block diagram of training an image generator model to predict a measured image, according to an embodiment.

FIG. 12 is a block diagram of training an image generator model to predict a measured image, according to an embodiment. In some embodiments, the image generator model 920 is a machine learning model that is trained to generate a predicted measured image for any given input target image. Training the image generator model 920 includes adjusting model parameters, such as weights and biases of the image generator model 920, such that a cost function in generating a predicted measured image is minimized. The cost function can be a measure of a difference between a predicted measured image (e.g., an output of the image generator model 920) and a real measured image obtained (e.g., using a SEM tool) from a printed substrate.

In an embodiment, the training of the image generator model 920 is an iterative process. An iteration involves initializing the model parameters of the image generator model 920 with a set of model parameter values; inputting an image pair having a target image 1210 associated with a design pattern and a measured image 1215 of the printed pattern on the substrate, obtained via the image capture device, to the image generator model 920; executing the image generator model 920 to generate a predicted measured image 1220; and adjusting the model parameter values of the image generator model 920 such that the cost function (which is a measure of difference between the predicted measured image 1220 and the measured image 1215) is reduced. The iterations are repeated with a number of image pairs 1205 (with the model parameters being adjusted progressively) until the cost function is minimized (in some embodiments, below a specified threshold), or does not reduce significantly anymore.

After the iterations are completed, the image generator model 920 is considered to be trained (and can optionally be referred to as trained image generator model 920). The trained image generator model 920 can then be used to predict a measured image for any desired design pattern, by using a target image associated with the desired design pattern as input to the trained image generator model 920, e.g., as described at least with reference to FIG. 9.

In some embodiments, the image generator model 920 can be a machine learning model such as a convolutional neural network (CNN) model or a deep CNN (DCNN) model. Briefly, a DCNN model for predicting a measured image 1220 consists of an input layer 1230 and an output layer 1235, as well as multiple hidden layers, such as convolutional layers, normalization layers, and pooling layers between the input layer 1230 and the output layer 1235. The parameters of the hidden layers are optimized to give a minimum value of a loss function. In some embodiments, CNN models may be trained to model the behavior of any process, or a combination of processes related to the patterning process.

Accordingly, the training of CNN based image generator model 920 to generate a predicted measured image includes adjusting the model parameters, such as weights and biases of the CNN, such that a cost function in generating a predicted measured image is minimized. In some embodiments, the adjusting of the model parameter values includes adjusting values of: one or more weights of a layer of the CNN, one or more bias of a layer of the CNN, hyperparameters of the CNN and/or a number of layers of the CNN. In some embodiments, the number of layers is a hyperparameter of the CNN which may be pre-selected and may not be changed during the training process. In some embodiments, a series of training process may be performed where the number of layers may be modified. An example of CNN is illustrated in FIG. 12.

In some embodiments, the training (e.g., CNN) involves determining a value of the cost function and progressively adjusting weights of one or more layers of the CNN such that the cost function is reduced (in an embodiment, minimized). In some embodiments, the cost function is a difference between a predicted measured image 1220 (e.g., an output vector of CNN) and a real measured image 1215 obtained (e.g., using a SEM tool) from a printed substrate. For example, the cost function may determine the cost as an edge placement error (EPE). In this case, the cost function extracts the contours from the measured image 1215 and the predicted measured image 1220 and determines the EPE (e.g., difference between a measured contour and a predicted contour as described at least with reference to FIGS. 3-6) as a measure of the difference between predicted measured image 1220 and the measured image 1215.

The cost function or the difference is reduced by modifying the values of the CNN model parameters (e.g., weights, bias, stride, etc.). In an embodiment, the cost function is computed as CF=$f$(measured image−CNN(input, cnn_parameters)). In this step, the input to CNN includes a target image and corresponding measured image, and cnn_parameters, which are weights and biases of CNN, has initial values that may be randomly selected.

In embodiment, a gradient corresponding to the cost function may be dcost/dparameter, where the cnn_parameters values may be updated based on an equation (e.g., parameter=parameter−learning_rate*gradient). The parameter may be the weight and/or bias, and learning_rate may be a hyper-parameter used to tune the training process and may be selected by a user or a computer to improve convergence (e.g., faster convergence) of the training process. After several iterations of training, optimized cnn_parameters values are obtained and further used as the model parameter values of a trained image generator model 920. The trained image generator model 920 can then be used to predict a measured image for any desired design pattern, by using a target image associated with the desired design pattern as input to the trained image generator model 920, e.g., as described at least with reference to FIG. 9.

Figure 13:
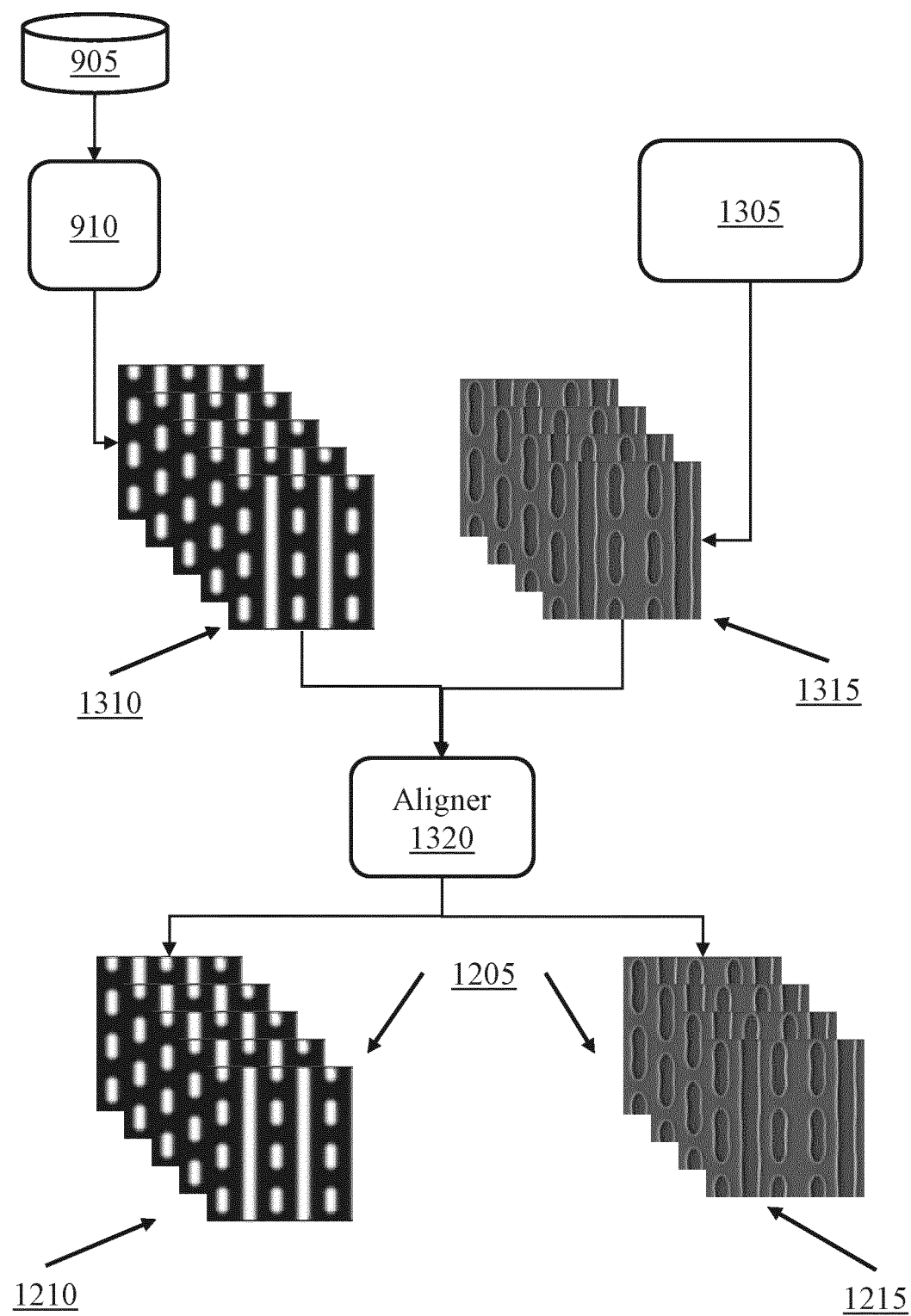
FIG. 13 is a block diagram of training data generation for training an image generator model, according to an embodiment.

FIG. 13 is a block diagram of training data generation for training an image generator model, according to an embodiment. As described at least with reference to FIG. 12, the image generator model 920 has to be trained to generate a predicted measured image for a desired pattern and such a training is performed using image pairs 1205 as training data. In some embodiments, to enable an improved accuracy of the alignment of a measured image 320 with a predicted measured image 925 using frequency domain, the training data may have to have aligned measured images. Accordingly, a measured image is aligned with a target image prior to using the image pair as training data.

A target image 1310, which is rendered from a desired design pattern stored in the database 930, and a measured image 1315 of the design pattern printed on the substrate is obtained from an image capture device 1305. The image capture device 1305 can be used for both metrology and inspection. In one embodiment, the image capture device 1305 can be an electron beam tool (e.g., FIGS. 23-24) and in another embodiment it can be an optical tool (e.g., FIGS. 25-27).

In some embodiments, the image capture device 1305 is a scanning electron microscope (SEM) and the measured image 1315 is a SEM image. The target image 1310 and the measured image 1315 are input to aligner 1320 for aligning the measured image 1315 with the target image 1310. In some embodiments, the aligner 1320 is similar to the second aligner 1125 of FIG. 11 and performs alignment of the measured image 1315 in the spatial domain, as described at least with reference to FIGS. 3-6. After measured image 1315 is aligned with the target image 1310, they are included as measured image 1215 and target image 1210 in the image pairs 1205. The alignment by aligner 1320 is performed for a number of other measured images and target images, and the resulting aligned measured images and the corresponding target images are included in the image pairs 1205, which is used as training data for training the image generator model 920.

Figure 14:
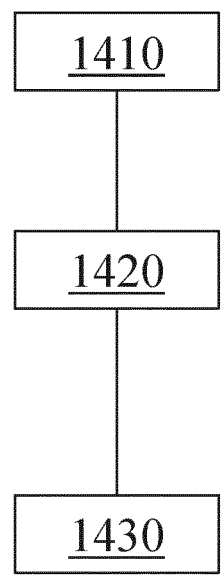
FIG. 14 is a flow diagram of a process for generating a predicted measured image, according to an embodiment.

FIG. 14 is a flow diagram of a process for generating a predicted measured image, according to an embodiment.

At operation 1410, a design pattern 905, which is a pattern etched/to be etched on a substrate, is accessed from the database 930, such as a GDS. In some embodiments, the design pattern 905 is polygons in the GDS.

At operation 1420, the image renderer 910 renders the target image 915 from the design pattern 905 using one or more image rendering techniques.

At operation 1430, the image generator model 920 generates the predicted measured image 925 using the target image 915. In some embodiments, the image generator model 920 is a machine learning model and is trained to generate the predicted measured image 925 using machine learning techniques.

Figure 15:
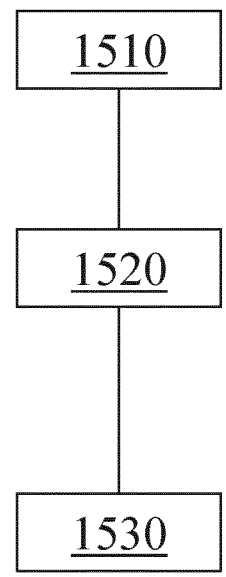
FIG. 15 is a flow diagram of a process for aligning a measured image using frequency domain, according to an embodiment.

FIG. 15 is a flow diagram of a process for aligning a measured image using frequency domain, according to an embodiment.

At operation 1510, a measured image 320 of a design pattern printed on a substrate is obtained from the image capture device 1305.

At operation 1520, a predicted measured image 925, which shows a prediction of the design pattern printed on the substrate, is obtained from the image generator model 920, e.g., as described at least with reference to FIGS. 9 and 13.

At operation 1530, the measured image 320 is aligned with the predicted measured image 925 using frequency domain. For example, aligning the measured image 320 using the frequency domain includes transforming the measured image 320 and the predicted measured image 925 into frequency domain using the transformation function 810 (e.g., fast Fourier transform), and correlating the transformed images using a correlation function 825 (e.g., NCC function) to determine the offset 1010 for aligning the measured image 320, as described at least with reference to FIGS. 8 and 10.

Figure 16:
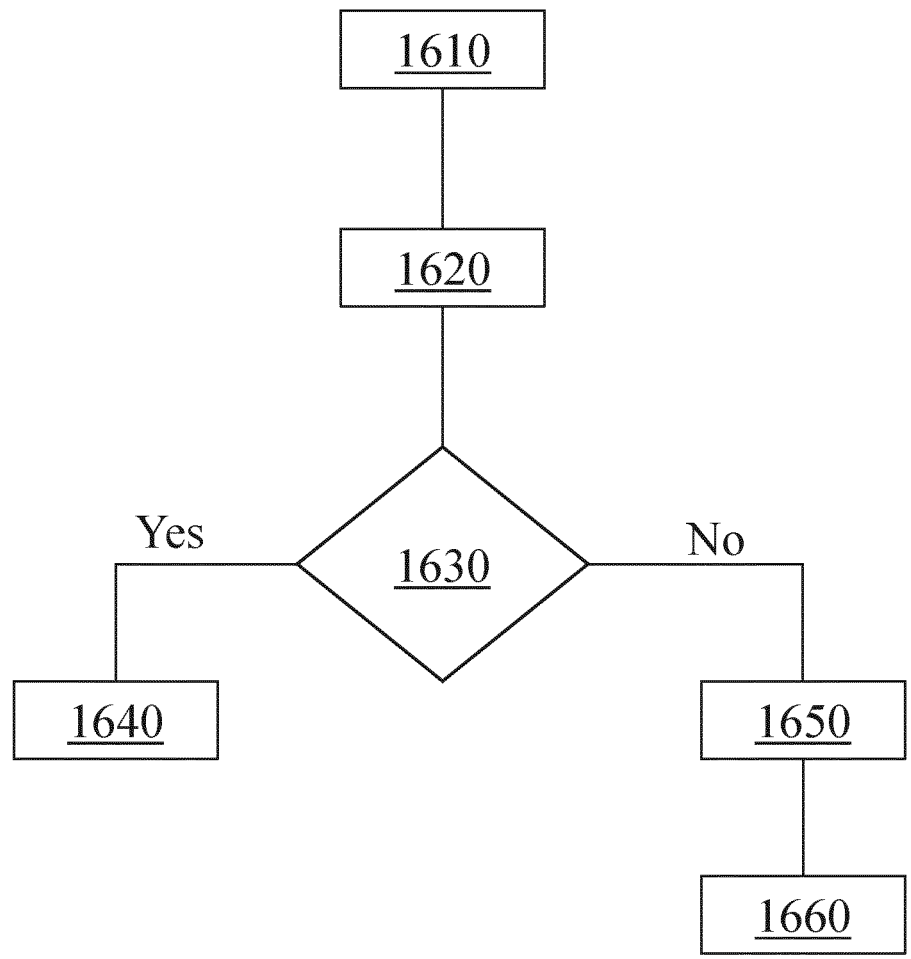
FIG. 16 is a flow diagram of a process for performing an overall alignment of a measured image using frequency domain and spatial domain, according to an embodiment.

FIG. 16 is a flow diagram of a process for performing an overall alignment of a measured image using frequency domain and spatial domain, according to an embodiment.

At operation 1610, the measured image 320 and the predicted measured image 925 are obtained, e.g., as described at least with reference to FIG. 14.

At operation 1620, a first alignment is performed to align the measured image 320 with the predicted measured image 925 using frequency domain, e.g., as described at least with reference to FIG. 15.

At operation 1630, it is determined whether the first alignment satisfies the alignment specification. In some embodiments, the alignment specification can include one or more metrics that are indicative of a quality and/or accuracy of the alignment.

If the first alignment satisfies the alignment specification, at operation 1640, a second alignment is performed to fine align the measured image 320, which includes making fine adjustments to the measured contour 330, with predicted measured image 925. In some embodiments, the second alignment is performed in the spatial domain, e.g., as described at least with reference to FIGS. 5 and 11.

If the first alignment does not satisfy the alignment specification, at operation 1650, the contour extractor 1120 obtains the measured contour 330 and the simulated contour 510 for performing the second alignment in the spatial domain.

At operation 1660, the second alignment is performed using the measured contour 330 and the simulated contour 510, as described at least with reference to FIGS. 3-6, to align the measured image 320 with the simulated contour 510.

Figure 17:
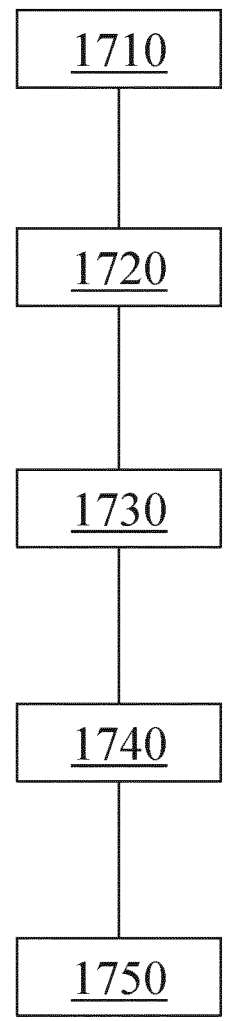
FIG. 17 is a flow diagram of a process for training the image generator model to predict a measured image, according to an embodiment.

FIG. 17 is a flow diagram of a process for training the image generator model to predict a measured image, according to an embodiment.

As described at least with reference to FIG. 12, training the image generator model 920 is an iterative process and includes adjusting model parameters, such as weights and biases of the image generator model 920, such that a cost function in generating a predicted measured image is minimized. The cost function can be a measure of a difference between a predicted measured image (e.g., an output of the image generator model 920) and a real measured image obtained (e.g., using a SEM tool) from a printed substrate.

At operation 1710, the model parameters of the image generator model 920 are initialized with a set of model parameter values (e.g., random values in case of a first iteration or values from a previous iteration).

At operation 1720, an image pair having (a) a target image 1210 associated with a design pattern etched/or to be etched on the substrate, and (b) a measured image 1215 of the pattern printed on the substrate are input to the image generator model 920. In some embodiments, the measured image 1215 is obtained via the image capture device 1305, and the target image 1310 is obtained using image renderer 910. The measured image 320 acts as a ground truth or a label, and the goal of the training is to generate a predicted measured image that matches the label.

At operation 1730 the image generator model 920 is executed to generate a predicted measured image 1220.

At operation 1740, the cost function (which is a measure of difference between the predicted measured image 1220 and the measured image 1215) is computed. In some embodiments, the cost function may determine the cost as EPE, which is a difference between a measured contour and a predicted contour and determined as described at least with reference to FIGS. 3-6.

At operation 1750, the set of model parameter values of the image generator model 920 are adjusted such that the cost function is reduced, that is, configuring the image generator model 920 to generate a predicted measure image that matches better with the input measured image.

The operations 1710-1750 are repeated with a number of image pairs 1205 with the model parameters being adjusted progressively until the cost function is minimized (in some embodiments, below a specified threshold), or does not reduce significantly any more.

After the iterations are completed, the image generator model 920 is considered to be trained. The trained image generator model 920 can then be used to predict a measured image for any desired design pattern, by using a target image associated with the desired design pattern as input to the trained image generator model 920, e.g., as described at least with reference to FIG. 9.

Figure 18:
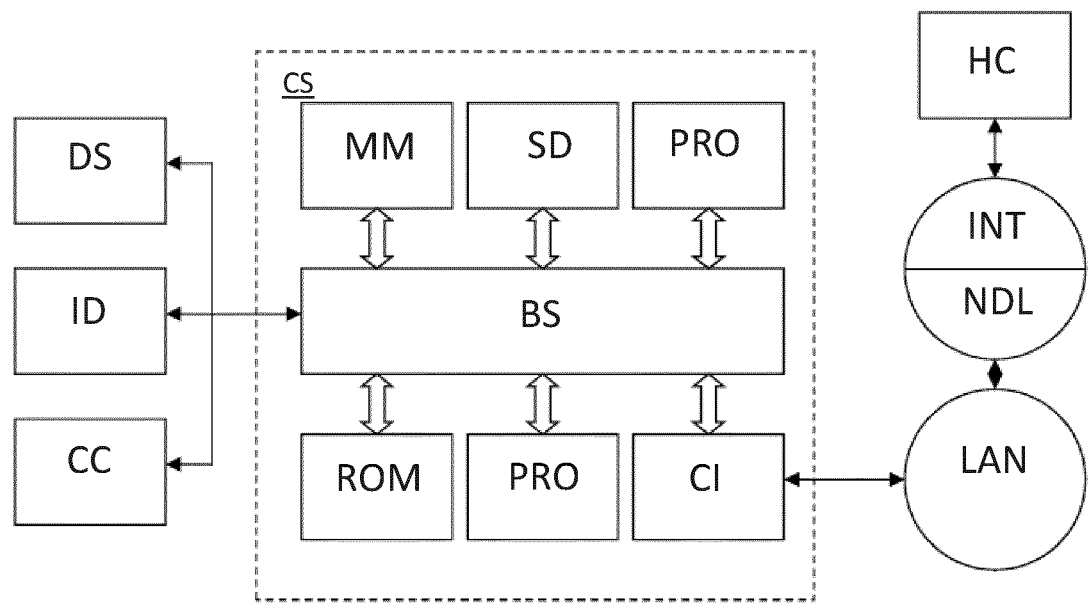
FIG. 18 is a block diagram of an example computer system, according to an embodiment.

FIG. 18 is a block diagram of an example computer system CS, according to an embodiment.

Computer system CS includes a bus BS or other communication mechanism for communicating information, and a processor PRO (or multiple processor) coupled with bus BS for processing information. Computer system CS also includes a main memory MM, such as a random access memory (RAM) or other dynamic storage device, coupled to bus BS for storing information and instructions to be executed by processor PRO. Main memory MM also may be used for storing temporary variables or other intermediate information during execution of instructions to be executed by processor PRO. Computer system CS further includes a read only memory (ROM) ROM or other static storage device coupled to bus BS for storing static information and instructions for processor PRO. A storage device SD, such as a magnetic disk or optical disk, is provided and coupled to bus BS for storing information and instructions.

Computer system CS may be coupled via bus BS to a display DS, such as a cathode ray tube (CRT) or flat panel or touch panel display for displaying information to a computer user. An input device ID, including alphanumeric and other keys, is coupled to bus BS for communicating information and command selections to processor PRO. Another type of user input device is cursor control CC, such as a mouse, a trackball, or cursor direction keys for communicating direction information and command selections to processor PRO and for controlling cursor movement on display DS. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system CS in response to processor PRO executing one or more sequences of one or more instructions contained in main memory MM. Such instructions may be read into main memory MM from another computer-readable medium, such as storage device SD. Execution of the sequences of instructions contained in main memory MM causes processor PRO to perform the process steps described herein. One or more processors in a multi-processing arrangement may also be employed to execute the sequences of instructions contained in main memory MM. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor PRO for execution. Such a medium may take many forms, including but not limited to, non-volatile media, volatile media, and transmission media. Non-volatile media include, for example, optical or magnetic disks, such as storage device SD. Volatile media include dynamic memory, such as main memory MM. Transmission media include coaxial cables, copper wire and fiber optics, including the wires that comprise bus BS. Transmission media can also take the form of acoustic or light waves, such as those generated during radio frequency (RF) and infrared (IR) data communications. Computer-readable media can be non-transitory, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge. Non-transitory computer readable media can have instructions recorded thereon. The instructions, when executed by a computer, can implement any of the features described herein. Transitory computer-readable media can include a carrier wave or other propagating electromagnetic signal.

Various forms of computer readable media may be involved in carrying one or more sequences of one or more instructions to processor PRO for execution. For example, the instructions may initially be borne on a magnetic disk of a remote computer. The remote computer can load the instructions into its dynamic memory and send the instructions over a telephone line using a modem. A modem local to computer system CS can receive the data on the telephone line and use an infrared transmitter to convert the data to an infrared signal. An infrared detector coupled to bus BS can receive the data carried in the infrared signal and place the data on bus BS. Bus BS carries the data to main memory MM, from which processor PRO retrieves and executes the instructions. The instructions received by main memory MM may optionally be stored on storage device SD either before or after execution by processor PRO.

Computer system CS may also include a communication interface CI coupled to bus BS. Communication interface CI provides a two-way data communication coupling to a network link NDL that is connected to a local network LAN. For example, communication interface CI may be an integrated services digital network (ISDN) card or a modem to provide a data communication connection to a corresponding type of telephone line. As another example, communication interface CI may be a local area network (LAN) card to provide a data communication connection to a compatible LAN. Wireless links may also be implemented. In any such implementation, communication interface CI sends and receives electrical, electromagnetic or optical signals that carry digital data streams representing various types of information.

Network link NDL typically provides data communication through one or more networks to other data devices. For example, network link NDL may provide a connection through local network LAN to a host computer HC. This can include data communication services provided through the worldwide packet data communication network, now commonly referred to as the "Internet" INT. Local network LAN (Internet) both use electrical, electromagnetic or optical signals that carry digital data streams. The signals through the various networks and the signals on network data link NDL and through communication interface CI, which carry the digital data to and from computer system CS, are exemplary forms of carrier waves transporting the information.

Computer system CS can send messages and receive data, including program code, through the network(s), network data link NDL, and communication interface CI. In the Internet example, host computer HC might transmit a requested code for an application program through Internet INT, network data link NDL, local network LAN and communication interface CI. One such downloaded application may provide all or part of a method described herein, for example. The received code may be executed by processor PRO as it is received, and/or stored in storage device SD, or other non-volatile storage for later execution. In this manner, computer system CS may obtain application code in the form of a carrier wave.

As described above, the disclosed embodiments include methods, systems and/or a non-transitory computer-readable medium having instructions that, when executed by the computer system (CS), will train the machine learning model 920 to generate the predicted measured image 1220. The method is conducted, at least in part, by obtaining a plurality of image pairs 1205, wherein each image pair includes a) the training target image 1210 associated with the training design pattern 905, and b) the training measured image 1215 that is aligned with the training target image 1210. The method also trains, by the hardware computer system (CS), the machine learning model 920 to generate the predicted measured image 1220 from the training target image 1210, the training being based on the plurality of image pairs 1205 and the cost function that determines a difference between the predicted measured image 1220 and the training measured image 1215.

Further, as described below, the disclosed embodiments include methods, systems and/or a non-transitory computer-readable medium having instructions that, when executed by the computer system (CS), will train the machine learning model 2800 to generate a predicted measured image 3255. The method is conducted, at least in part, by obtaining (a) an input target image 3250 associated with a reference design pattern, and (b) a reference measured image 3260 associated with a specified design pattern printed on a substrate, wherein the input target image and the reference measured image are non-aligned images. The method also trains, by a hardware computer system (CS), the machine learning model 2800 to generate the predicted measured image 3255 using the input target image 3250.

According to the present disclosure, the combination and sub-combinations of disclosed elements constitute separate embodiments. For example, the method for generating a predicted measured image and the method for aligning a measured image with the predicted measured image may comprise separate embodiments, and/or these methods may be used together in the same embodiment.

Figure 19:
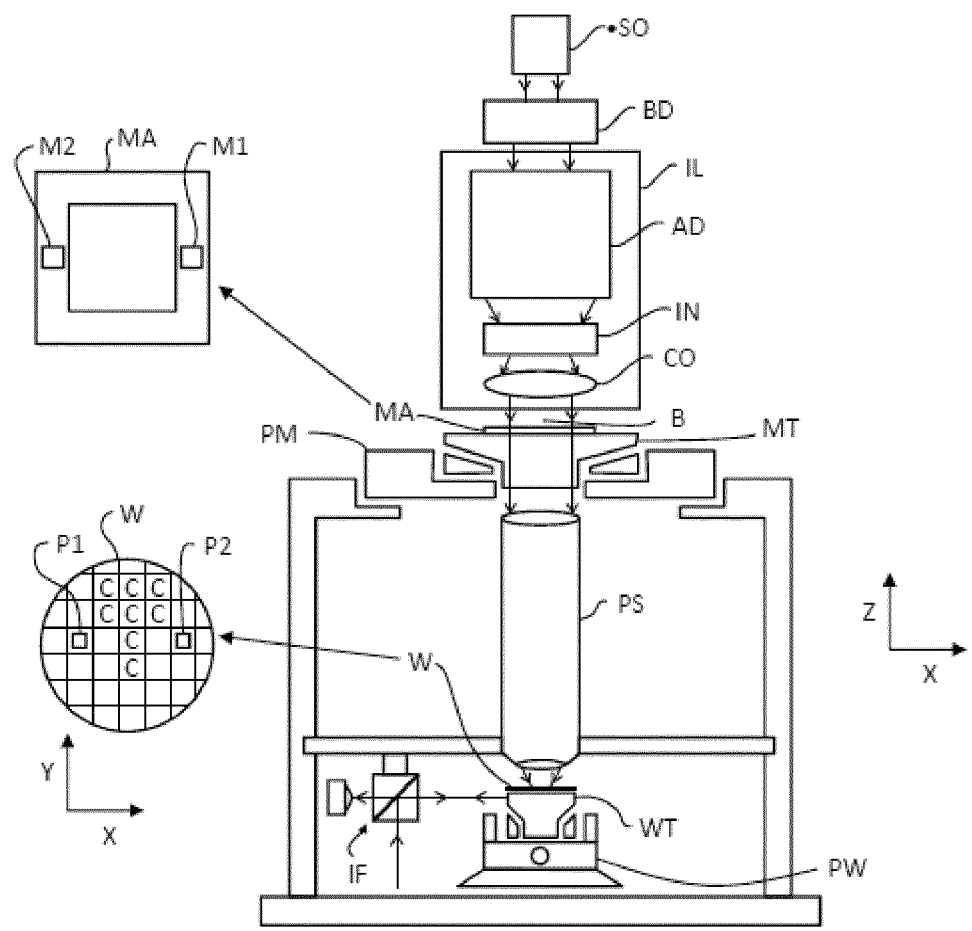
FIG. 19 is a schematic diagram of a lithographic projection apparatus, according to an embodiment.

FIG. 19 is a schematic diagram of a lithographic projection apparatus, according to an embodiment.

The lithographic projection apparatus can include an illumination system IL, a first object table MT, a second object table WT, and a projection system PS.

Illumination system IL, can condition a beam B of radiation. In this particular case, the illumination system also comprises a radiation source SO.

First object table (e.g., patterning device table) MT can be provided with a patterning device holder to hold a patterning device MA (e.g., a reticle), and connected to a first positioner to accurately position the patterning device with respect to item PS.

Second object table (substrate table) WT can be provided with a substrate holder to hold a substrate W (e.g., a resist-coated silicon wafer), and connected to a second positioner to accurately position the substrate with respect to item PS.

Projection system ("lens") PS (e.g., a refractive, catoptric or catadioptric optical system) can image an irradiated portion of the patterning device MA onto a target portion C (e.g., comprising one or more dies) of the substrate W.

As depicted herein, the apparatus can be of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

In some embodiments, source SO may be within the housing of the lithographic projection apparatus (as is often the case when source SO is a mercury lamp, for example), but that it may also be remote from the lithographic projection apparatus, the radiation beam that it produces being led into the apparatus (e.g., with the aid of suitable directing mirrors); this latter scenario can be the case when source SO is an excimer laser (e.g., based on KrF, ArF or F2 lasing).

The beam PB can subsequently intercept patterning device MA, which is held on a patterning device table MT. Having traversed patterning device MA, the beam B can pass through the lens PL, which focuses beam B onto target portion C of substrate W. With the aid of the second positioning means (and interferometric measuring means IF), the substrate table WT can be moved accurately, e.g. so as to position different target portions C in the path of beam PB. Similarly, the first positioning means can be used to accurately position patterning device MA with respect to the path of beam B, e.g., after mechanical retrieval of the patterning device MA from a patterning device library, or during a scan. In general, movement of the object tables MT, WT can be realized with the aid of a long-stroke module (coarse positioning) and a short-stroke module (fine positioning). However, in the case of a stepper (as opposed to a step-and-scan tool) patterning device table MT may just be connected to a short stroke actuator, or may be fixed.

The depicted tool can be used in two different modes, step mode and scan mode. In step mode, patterning device table MT is kept essentially stationary, and an entire patterning device image is projected in one go (i.e., a single "flash") onto a target portion C. Substrate table WT can be shifted in the x and/or y directions so that a different target portion C can be irradiated by beam PB.

In scan mode, essentially the same scenario applies, except that a given target portion C is not exposed in a single "flash." Instead, patterning device table MT is movable in a given direction (the so-called "scan direction", e.g., the y direction) with a speed v, so that projection beam B is caused to scan over a patterning device image; concurrently, substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 20:
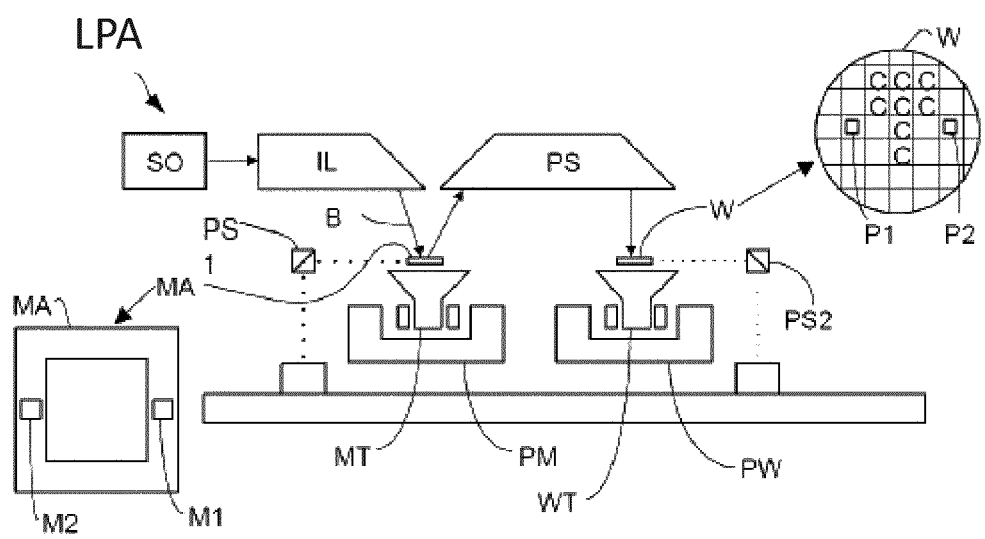
FIG. 20 is a schematic diagram of another lithographic projection apparatus, according to an embodiment.

FIG. 20 is a schematic diagram of another lithographic projection apparatus (LPA), according to an embodiment.

LPA can include source collector module SO, illumination system (illuminator) IL configured to condition a radiation beam B (e.g. EUV radiation), support structure MT, substrate table WT, and projection system PS.

Support structure (e.g. a patterning device table) MT can be constructed to support a patterning device (e.g. a mask or a reticle) MA and connected to a first positioner PM configured to accurately position the patterning device;

Substrate table (e.g. a wafer table) WT can be constructed to hold a substrate (e.g. a resist coated wafer) W and connected to a second positioner PW configured to accurately position the substrate.

Projection system (e.g. a reflective projection system) PS can be configured to project a pattern imparted to the radiation beam B by patterning device MA onto a target portion C (e.g. comprising one or more dies) of the substrate W.

As here depicted, LPA can be of a reflective type (e.g. employing a reflective patterning device). It is to be noted that because most materials are absorptive within the EUV wavelength range, the patterning device may have multi-layer reflectors comprising, for example, a multi-stack of molybdenum and silicon. In one example, the multi-stack reflector has a 40 layer pairs of molybdenum and silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Illuminator IL can receive an extreme ultra violet radiation beam from source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. Source collector module SO may be part of an EUV radiation system including a laser for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser may not be considered to form part of the lithographic apparatus and the radiation beam can be passed from the laser to the source collector module with the aid of a beam delivery system comprising, for example, suitable directing mirrors and/or a beam expander. In other cases, the source may be an integral part of the source collector module, for example when the source is a discharge produced plasma EUV generator, often termed as a DPP source.

Illuminator IL may comprise an adjuster for adjusting the angular intensity distribution of the radiation beam. Generally, at least the outer and/or inner radial extent (commonly referred to as G-outer and G-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B can be incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus LPA could be used in at least one of the following modes, step mode, scan mode, and stationary mode.

In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

In scan mode, the support structure (e.g. patterning device table) MT and the substrate table WT are scanned synchronously while a pattern imparted to the radiation beam is projected onto target portion C (i.e. a single dynamic exposure). The velocity and direction of substrate table WT relative to the support structure (e.g. patterning device table) MT may be determined by the (de-)magnification and image reversal characteristics of the projection system PS.

In stationary mode, the support structure (e.g. patterning device table) MT is kept essentially stationary holding a programmable patterning device, and substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 21:
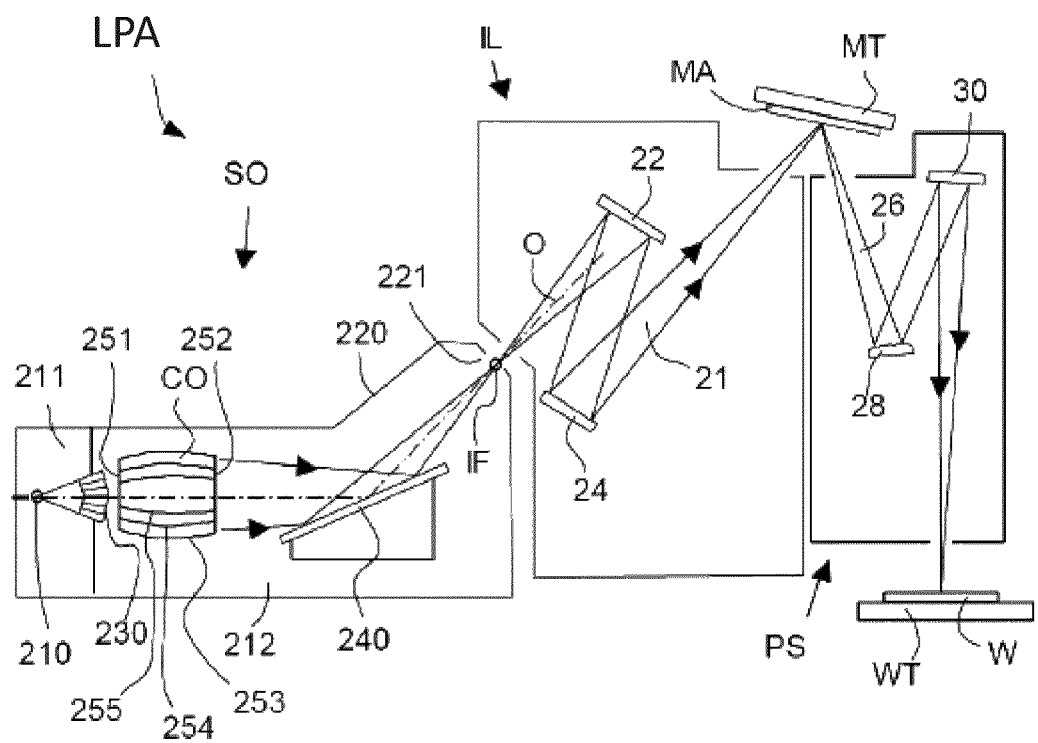
FIG. 21 is a detailed view of the lithographic projection apparatus, according to an embodiment.

FIG. 21 is a detailed view of the lithographic projection apparatus, according to an embodiment.

As shown, LPA can include the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 12.

Collector optic CO, as illustrated in FIG. 12, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 22:
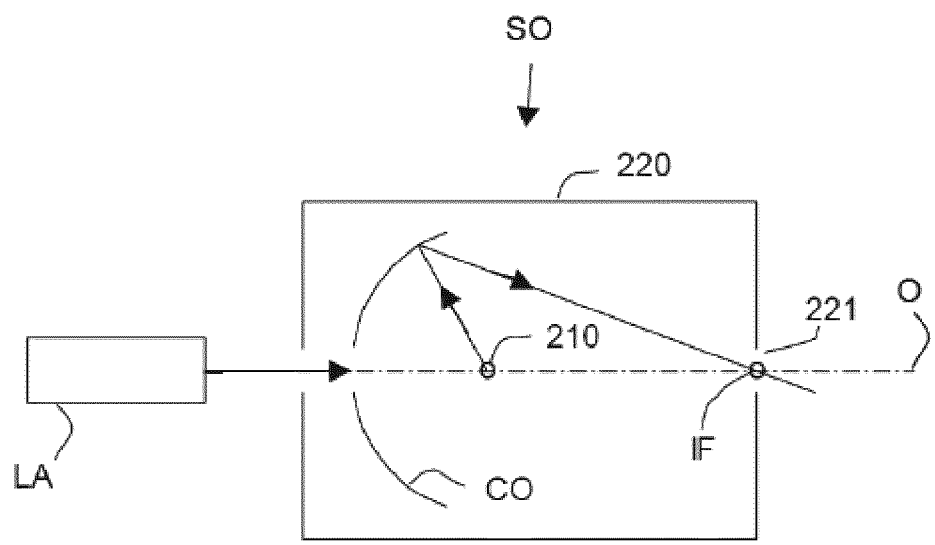
FIG. 22 is a detailed view of the source collector module of the lithographic projection apparatus, according to an embodiment.

FIG. 22 is a detailed view of source collector module SO of lithographic projection apparatus LPA, according to an embodiment.

Source collector module SO may be part of an LPA radiation system. A laser LA can be arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-50 nm by using a synchrotron or by hitting a material (either solid or a plasma) with high energy electrons in order to produce photons within this range.

Figure 23:
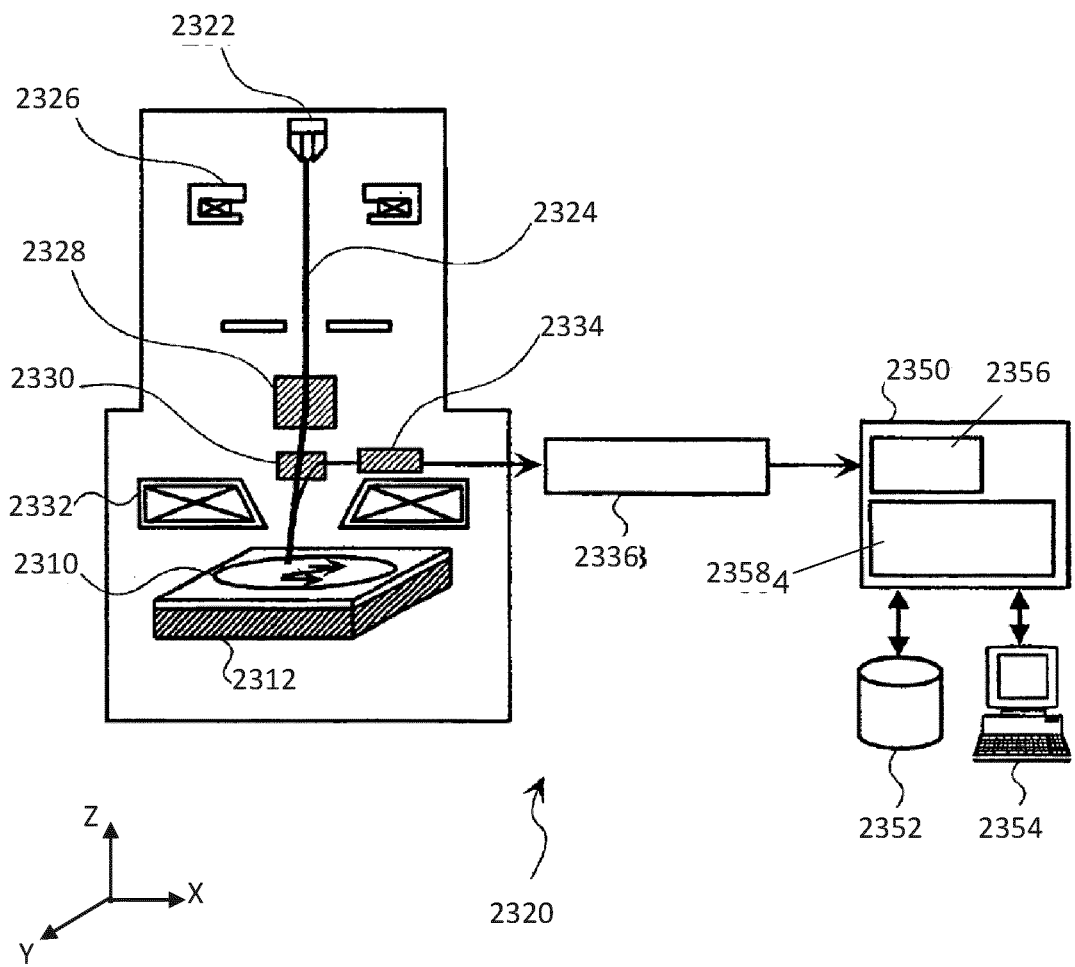
FIG. 23 schematically depicts an embodiment of an electron beam inspection apparatus, according to an embodiment.

FIG. 23 schematically depicts an embodiment of an electron beam inspection apparatus 2320, according to an embodiment. In an embodiment, the inspection apparatus may be an electron beam inspection apparatus (e.g., the same as or similar to a scanning electron microscope (SEM)) that yields an image of a structure (e.g., some or all the structure of a device, such as an integrated circuit) exposed or transferred on the substrate. A primary electron beam 2324 emitted from an electron source 2322 is converged by condenser lens 2326 and then passes through a beam deflector 2328, an E×B deflector 2330, and an objective lens 2332 to irradiate a substrate 2310 on a substrate table 2312 at a focus.

When the substrate 2310 is irradiated with electron beam 2324, secondary electrons are generated from the substrate 2310. The secondary electrons are deflected by the E×B deflector 2330 and detected by a secondary electron detector 2334. A two-dimensional electron beam image can be obtained by detecting the electrons generated from the sample in synchronization with, e.g., two dimensional scanning of the electron beam by beam deflector 2328 or with repetitive scanning of electron beam 2324 by beam deflector 2328 in an X or Y direction, together with continuous movement of the substrate 2310 by the substrate table 2312 in the other of the X or Y direction. Thus, in an embodiment, the electron beam inspection apparatus has a field of view for the electron beam defined by the angular range into which the electron beam can be provided by the electron beam inspection apparatus (e.g., the angular range through which the deflector 2328 can provide the electron beam 2324). Thus, the spatial extent of the field of the view is the spatial extent to which the angular range of the electron beam can impinge on a surface (wherein the surface can be stationary or can move with respect to the field).

A signal detected by secondary electron detector 2334 is converted to a digital signal by an analog/digital (A/D) converter 2336, and the digital signal is sent to an image processing system 2350. In an embodiment, the image processing system 2350 may have memory 2356 to store all or part of digital images for processing by a processing unit 2358. The processing unit 2358 (e.g., specially designed hardware or a combination of hardware and software or a computer readable medium comprising software) is configured to convert or process the digital images into datasets representative of the digital images. In an embodiment, the processing unit 2358 is configured or programmed to cause execution of a method described herein. Further, image processing system 2350 may have a storage medium 2356 configured to store the digital images and corresponding datasets in a reference database. A display device 2354 may be connected with the image processing system 2350, so that an operator can conduct necessary operation of the equipment with the help of a graphical user interface.

Figure 24:
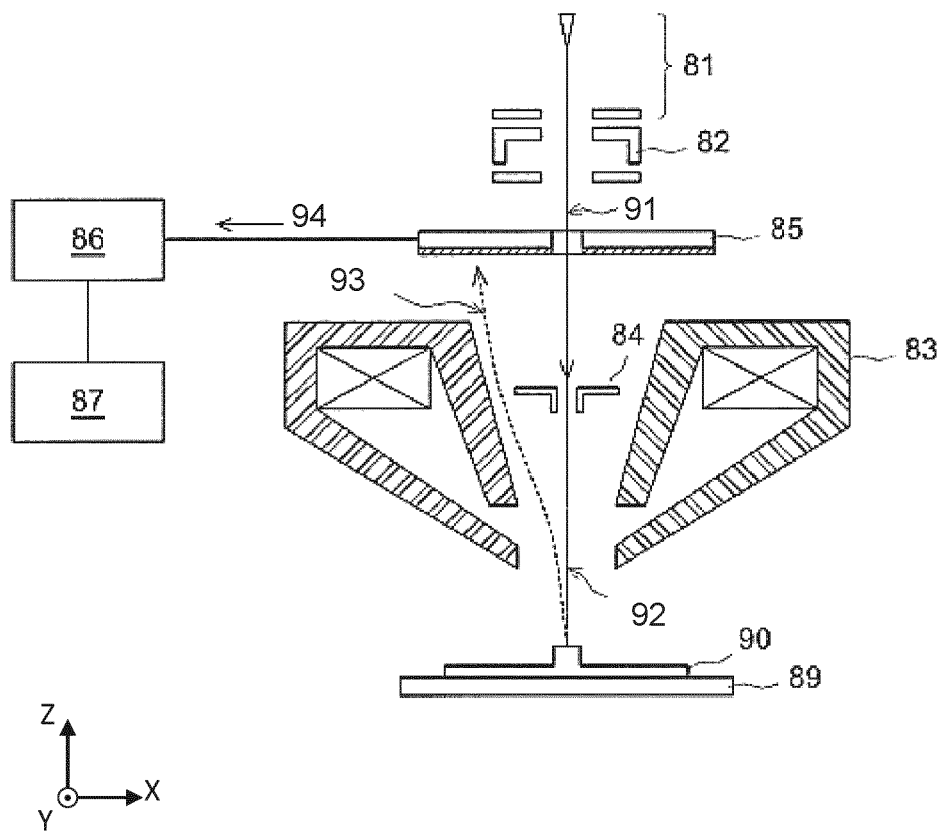
FIG. 24 schematically illustrates a further embodiment of an inspection apparatus, according to an embodiment.

FIG. 24 schematically illustrates a further embodiment of an inspection apparatus, according to an embodiment. The system is used to inspect a sample 90 (such as a substrate) on a sample stage 88 and comprises a charged particle beam generator 81, a condenser lens module 82, a probe forming objective lens module 83, a charged particle beam deflection module 84, a secondary charged particle detector module 85, and an image forming module 86.

The charged particle beam generator 81 generates a primary charged particle beam 91. The condenser lens module 82 condenses the generated primary charged particle beam 91. The probe forming objective lens module 83 focuses the condensed primary charged particle beam into a charged particle beam probe 92. The charged particle beam deflection module 84 scans the formed charged particle beam probe 92 across the surface of an area of interest on the sample 90 secured on the sample stage 88. In an embodiment, the charged particle beam generator 81, the condenser lens module 82 and the probe forming objective lens module 83, or their equivalent designs, alternatives or any combination thereof, together form a charged particle beam probe generator which generates the scanning charged particle beam probe 92.

The secondary charged particle detector module 85 detects secondary charged particles 93 emitted from the sample surface (maybe also along with other reflected or scattered charged particles from the sample surface) upon being bombarded by the charged particle beam probe 92 to generate a secondary charged particle detection signal 94. The image forming module 86 (e.g., a computing device) is coupled with the secondary charged particle detector module 85 to receive the secondary charged particle detection signal 94 from the secondary charged particle detector module 85 and accordingly forming at least one scanned image. In an embodiment, the secondary charged particle detector module 85 and image forming module 86, or their equivalent designs, alternatives or any combination thereof, together form an image forming apparatus which forms a scanned image from detected secondary charged particles emitted from sample 90 being bombarded by the charged particle beam probe 92.

In an embodiment, a monitoring module 87 is coupled to the image forming module 86 of the image forming apparatus to monitor, control, etc. the patterning process and/or derive a parameter for patterning process design, control, monitoring, etc. using the scanned image of the sample 90 received from image forming module 86. So, in an embodiment, the monitoring module 87 is configured or programmed to cause execution of a method described herein. In an embodiment, the monitoring module 87 comprises a computing device. In an embodiment, the monitoring module 87 comprises a computer program to provide functionality herein and encoded on a computer readable medium forming, or disposed within, the monitoring module 87.

In an embodiment, like the electron beam inspection tool of FIG. 19 that uses a probe to inspect a substrate, the electron current in the system of FIG. 20 is significantly larger compared to, e.g., a CD SEM such as depicted in FIG. 19, such that the probe spot is large enough so that the inspection speed can be fast. However, the resolution may not be as high as compared to a CD SEM because of the large probe spot.

The SEM images, from, e.g., the system of FIG. 19 and/or FIG. 20, may be processed to extract contours that describe the edges of objects, representing device structures, in the image. These contours are then typically quantified via metrics, such as CD, at user-defined cut-lines. Thus, typically, the images of device structures are compared and quantified via metrics, such as an edge-to-edge distance (CD) measured on extracted contours or simple pixel differences between images. Alternatively, metrics can include EP gauges as described herein.

Now, besides measuring substrates in a patterning process, it is often desirable to use one or more tools to produce results that, for example, can be used to design, control, monitor, etc. the patterning process. To do this, there may be provided one or more tools used in computationally controlling, designing, etc. one or more aspects of the patterning process, such as the pattern design for a patterning device (including, for example, adding sub-resolution assist features or optical proximity corrections), the illumination for the patterning device, etc. Accordingly, in a system for computationally controlling, designing, etc. a manufacturing process involving patterning, the major manufacturing system components and/or processes can be described by various functional modules. In particular, in an embodiment, one or more mathematical models can be provided that describe one or more steps and/or apparatuses of the patterning process, including typically the pattern transfer step. In an embodiment, a simulation of the patterning process can be performed using one or more mathematical models to simulate how the patterning process forms a patterned substrate using a measured or design pattern provided by a patterning device.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

FIG. 25 depicts an example inspection apparatus (e.g., a scatterometer). It comprises a broadband (white light) radiation projector 2 which projects radiation onto a substrate W. The redirected radiation is passed to a spectrometer detector 4, which measures a spectrum 10 (intensity as a function of wavelength) of the specular reflected radiation, as shown, e.g., in the graph in the lower left. From this data, the structure or profile giving rise to the detected spectrum may be reconstructed by processor PU, e.g. by Rigorous Coupled Wave Analysis and non-linear regression or by comparison with a library of simulated spectra as shown at the bottom right of FIG. 3. In general, for the reconstruction the general form of the structure is known and some variables are assumed from knowledge of the process by which the structure was made, leaving only a few variables of the structure to be determined from the measured data. Such an inspection apparatus may be configured as a normal-incidence inspection apparatus or an oblique-incidence inspection apparatus.

Figure 26:
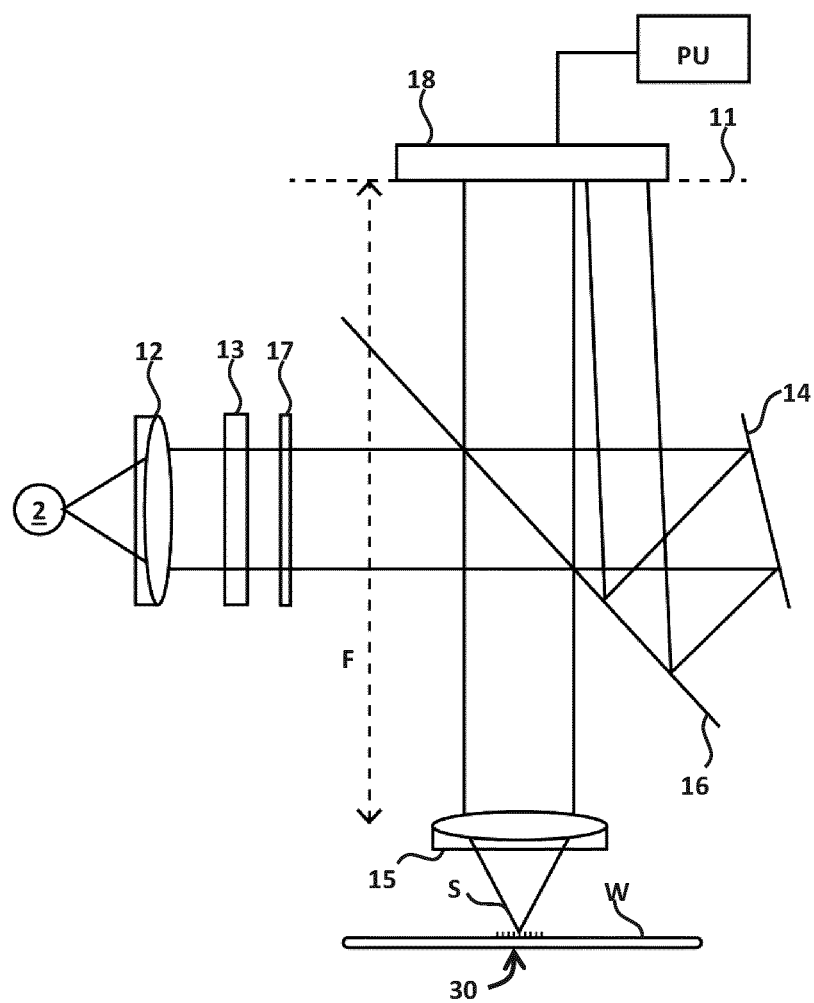
FIG. 26 schematically depicts an example inspection apparatus.

Another inspection apparatus that may be used is shown in FIG. 26. In this device, the radiation emitted by radiation source 2 is collimated using lens system 12 and transmitted through interference filter 13 and polarizer 17, reflected by partially reflecting surface 16 and is focused into a spot S on substrate W via an objective lens 15, which has a high numerical aperture (NA), desirably at least 0.9 or at least 0.95. An immersion inspection apparatus (using a relatively high refractive index fluid such as water) may even have a numerical aperture over 1.

As in the lithographic apparatus LA, one or more substrate tables may be provided to hold the substrate W during measurement operations. The substrate tables may be similar or identical in form to the substrate table WT of FIG. 1. In an example where the inspection apparatus is integrated with the lithographic apparatus, they may even be the same substrate table. Coarse and fine positioners may be provided to a second positioner PW configured to accurately position the substrate in relation to a measurement optical system. Various sensors and actuators are provided for example to acquire the position of a target of interest, and to bring it into position under the objective lens 15. Typically many measurements will be made on targets at different locations across the substrate W. The substrate support can be moved in X and Y directions to acquire different targets, and in the Z direction to obtain a desired location of the target relative to the focus of the optical system. It is convenient to think and describe operations as if the objective lens is being brought to different locations relative to the substrate, when, for example, in practice the optical system may remain substantially stationary (typically in the X and Y directions, but perhaps also in the Z direction) and only the substrate moves. Provided the relative position of the substrate and the optical system is correct, it does not matter in principle which one of those is moving in the real world, or if both are moving, or a combination of a part of the optical system is moving (e.g., in the Z and/or tilt direction) with the remainder of the optical system being stationary and the substrate is moving (e.g., in the X and Y directions, but also optionally in the Z and/or tilt direction).

The radiation redirected by the substrate W then passes through partially reflecting surface 16 into a detector 18 in order to have the spectrum detected. The detector 18 may be located at a back-projected focal plane 11 (i.e., at the focal length of the lens system 15) or the plane 11 may be re-imaged with auxiliary optics (not shown) onto the detector 18. The detector may be a two-dimensional detector so that a two-dimensional angular scatter spectrum of a substrate target 30 can be measured. The detector 18 may be, for example, an array of CCD or CMOS sensors, and may use an integration time of, for example, 40 milliseconds per frame.

A reference beam may be used, for example, to measure the intensity of the incident radiation. To do this, when the radiation beam is incident on the partially reflecting surface 16 part of it is transmitted through the partially reflecting surface 16 as a reference beam towards a reference mirror 14. The reference beam is then projected onto a different part of the same detector 18 or alternatively on to a different detector (not shown).

One or more interference filters 13 are available to select a wavelength of interest in the range of, say, 405-790 nm or even lower, such as 200-300 nm. The interference filter may be tunable rather than comprising a set of different filters. A grating could be used instead of an interference filter. An aperture stop or spatial light modulator (not shown) may be provided in the illumination path to control the range of angle of incidence of radiation on the target.

The detector 18 may measure the intensity of redirected radiation at a single wavelength (or narrow wavelength range), the intensity separately at multiple wavelengths or integrated over a wavelength range. Furthermore, the detector may separately measure the intensity of transverse magnetic- and transverse electric-polarized radiation and/or the phase difference between the transverse magnetic- and transverse electric-polarized radiation.

The target 30 on substrate W may be a 1-D grating, which is printed such that after development, the bars are formed of solid resist lines. The target 30 may be a 2-D grating, which is printed such that after development, the grating is formed of solid resist pillars or vias in the resist. The bars, pillars or vias may be etched into or on the substrate (e.g., into one or more layers on the substrate). The pattern (e.g., of bars, pillars or vias) is sensitive to change in processing in the patterning process (e.g., optical aberration in the lithographic projection apparatus (particularly the projection system PS), focus change, dose change, etc.) and will manifest in a variation in the printed grating. Accordingly, the measured data of the printed grating is used to reconstruct the grating. One or more parameters of the 1-D grating, such as line width and/or shape, or one or more parameters of the 2-D grating, such as pillar or via width or length or shape, may be input to the reconstruction process, performed by processor PU, from knowledge of the printing step and/or other inspection processes.

In addition to measurement of a parameter by reconstruction, angle resolved scatterometry is useful in the measurement of asymmetry of features in product and/or resist patterns. A particular application of asymmetry measurement is for the measurement of overlay, where the target 30 comprises one set of periodic features superimposed on another. The concepts of asymmetry measurement using the instrument of FIG. 25 or FIG. 26 are described, for example, in U.S. patent application publication US2006-066855, which is incorporated herein in its entirety. Simply stated, while the positions of the diffraction orders in the diffraction spectrum of the target are determined only by the periodicity of the target, asymmetry in the diffraction spectrum is indicative of asymmetry in the individual features which make up the target. In the instrument of FIG. 26, where detector 18 may be an image sensor, such asymmetry in the diffraction orders appears directly as asymmetry in the pupil image recorded by detector 18. This asymmetry can be measured by digital image processing in unit PU, and calibrated against known values of overlay.

Figure 27:
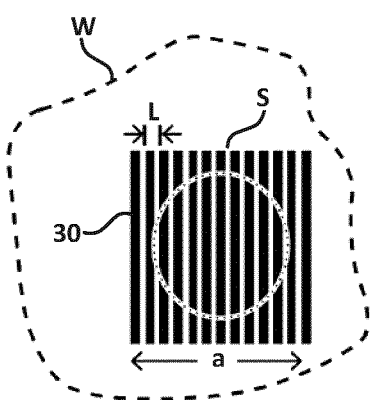
FIG. 27 illustrates the relationship between an illumination spot of an inspection apparatus and a metrology target.

FIG. 27 illustrates a plan view of a typical target 30, and the extent of illumination spot S in the apparatus of FIG. 26. To obtain a diffraction spectrum that is free of interference from surrounding structures, the target 30, in an embodiment, is a periodic structure (e.g., grating) larger than the width (e.g., diameter) of the illumination spot S. The width of spot S may be smaller than the width and length of the target. The target in other words is 'underfilled' by the illumination, and the diffraction signal is essentially free from any signals from product features and the like outside the target itself. The illumination arrangement 2, 12, 13, 17 may be configured to provide illumination of a uniform intensity across a back focal plane of objective 15. Alternatively, by, e.g., including an aperture in the illumination path, illumination may be restricted to on axis or off axis directions.

The present disclosure describes, among other things, methods for ML based image generation. In some embodiments, improving metrology during process model calibration can include obtaining accurate images of a printed pattern (e.g., a printed wafer or portion thereof) that is based on a target pattern. From the images, contours can be extracted that correspond to features on the printed pattern. The contours (also referred to as measured contours) can then be aligned to simulated contours, generated by the process model, to allow for calibration of the process model. The process model can be improved by adjusting parameters in the process model such that the simulated contours more accurately match the measured contours. For performing the alignment, typically machine learning (ML) model based simulated measured image, which contains contours that correspond to the idealized shapes in a target pattern (e.g., design pattern to be printed on a substrate), is generated, and then the simulated measured image may be aligned with an actual measured image (e.g., image of a design pattern printed on the substrate) that is obtained using an image capture device. In some embodiments, known systems train the ML model to generate the simulated measured images, using a target image and a measured image that is aligned with the target image. That is, training data for the ML model may have to have aligned pair of images. In some embodiments, a target image and measured image may be considered to be aligned when one or more characteristics of a target image (e.g., contours of a feature in the design pattern) is aligned, corresponds, matches, or has a match above a threshold, with the respect to one or more characteristics of the measured image. However, in some embodiments, the aligned pair of images may not be available, and/or in some embodiments, even if the aligned images can be prepared, a significant amount of time and/or computing resources is consumed in preparing the aligned pair of images.

The present disclosure describes, among other things, methods for ML based image generation using non-aligned pair of images. For example, a ML model can be trained using a training dataset having target images and measured images that are not aligned with one another (but the training dataset can include aligned images as well) to generate a simulated or predicted measured image. In another example, the ML model can be trained to generate a simulated or predicted target image using non-aligned target image and measured image pairs. In some embodiments, a model-predicted measured image is aligned with a measured image to align the measured image with a target image input to the model, while a model-predicted target image is aligned with the corresponding target image to align the target image with a measured image input to the model. The aligning of the images, among other things, improves a process model for a patterning process.

In some embodiments, a target image and a measured image is regarded as non-aligned when one or more characteristics of a target image (e.g., contours of a feature in the design pattern) is not aligned, does not match, has a match less than a threshold, or does not correspond, with the respective one or more characteristics of the measured image. In some embodiments, a target image and a measured image are regarded non-aligned as no alignment process has been performed on them.

Figure 28:
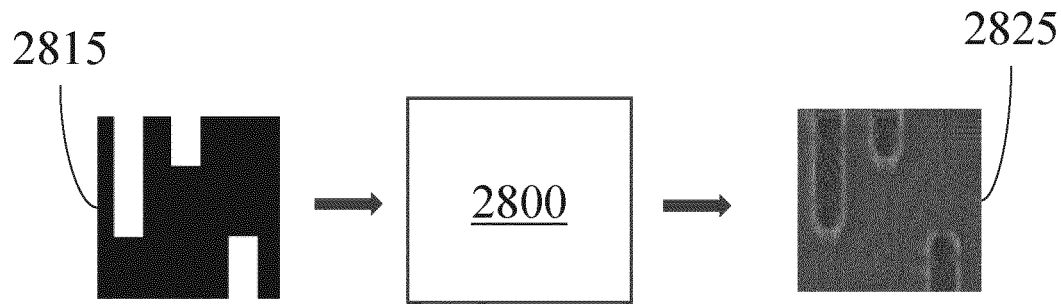
FIG. 28 is a block of diagram of an exemplary image generator model for predicting a measured image, according to an embodiment.

FIG. 28 is a block of diagram of an exemplary image generator model 2800 for predicting a measured image, according to an embodiment. A target image 2815 is an image obtained from a design pattern, such as a design pattern 905 of FIG. 9. As described above, design pattern 905 is a representation, e.g., polygons in a database 930 such as the GDS, of a pattern to be etched on a substrate. An image renderer, such as the image render 910, can render the target image 2815 from the design pattern 905 using one or more image rendering techniques. In some embodiments, the target image 2815 can be similar to the target image 915. A measured image, such as the measured image 320 of FIG. 3, is an image of the actual design pattern printed on the substrate and captured by the image capture device. In some embodiments, the target image 2815 and the measured image 320 are not similar enough to be aligned. Accordingly, an image generator model 2800 is configured to predict a measured image (or generate a predicted measured image 2825) using the target image 2815. In some embodiments, the predicted measured image 2825 is a prediction of how the design pattern 905 or the target image 2815 printed on the substrate may look like when imaged by the image capture device. The predicted measured image 2825 can then be used to align a measured image, e.g., using frequency domain as described at least with reference to FIG. 29 below.

In some embodiments, the image generator model 2800 is an ML model that is trained to predict a measured image, such as the predicted measured image 2825, using a target image, such as the target image 2815, and a measured image, such as the measured image 320, as inputs. The measured image and the target image used to train the image generator model 2800 may be aligned with each other or non-aligned with each other. In some embodiments, the training data can include multiple target images and multiple measured images in which none of the target images and measured images are aligned with each other, or at least some target images and measured images are not aligned with each other. The details of training the image generator model 2800 to generate the predicted measured image 2825 are discussed in detail at least with reference to FIGS. 32-34 below.

Figure 29:
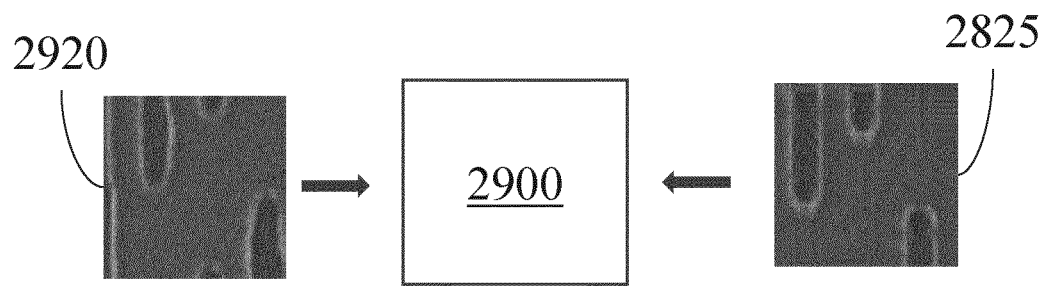
FIG. 29 is a block of diagram of an exemplary image aligner model for aligning a pair of images, according to an embodiment.

FIG. 29 is a block of diagram of an exemplary image aligner model 2900 for aligning a pair of images, according to an embodiment. In some embodiments, the image aligner model 2900 is similar to the first aligner 1110 and/or the second aligner 1125 of FIG. 11, and is used to align a pair of images, such as a given measured image 2920, which is an image of the actual design pattern (corresponding to the target image 2815) printed on the substrate captured by the image capture device, and a simulated measured image such as the predicted measured image 2825 generated using the image generator model 2800. The image aligner model 2900 can align the predicted measured image 2825 with the given measured image 2920 by using any suitable technique without departing from the scope of the present disclosure, e.g., using frequency domain as described at least with reference to FIG. 10 and/or using spatial domain as described at least with reference to FIGS. 3-7 and 11. In some embodiments, as a result of aligning the measured image 2920 with the predicted measured image 2825, the measured image 2920 and the corresponding target image 2815 from which the predicted measured image 2825 is generated are aligned with each other.

For example, in frequency domain alignment, the predicted measured image 2825 and the given measured image 2920 are transformed into frequency domain using the transformation function 810 to generate transformed predicted measured image and transformed measured image, as described at least with reference to FIG. 8. The transformed images are correlated using the correlation function 825 to determine a similarity between the two images. The correlation function 825 determines (a) a correlation value indicative of a measure of the similarity between two images, and (b) an offset relative to the predicted measured image 2825 at which the similarity of the given measured image 2920 to the predicted measured image 2825 is the highest or above a specified threshold.

The given measured image 2920 is said to be aligned with the predicted measured image 2825 at the co-ordinates of the predicted measured image 2825 determined based on the offset when the correlation value is the highest or above a specified threshold. In some embodiments, the offset is similar to the offset 830 of FIG. 8.

Figure 30:
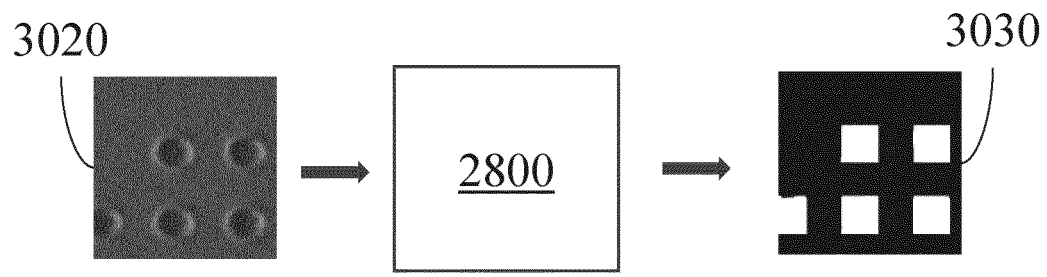
FIG. 30 is a block of diagram of an exemplary image generator model for predicting a target image, according to an embodiment.

FIG. 30 is a block of diagram of an exemplary image generator model 2800 for predicting a target image, according to an embodiment. While FIG. 28 describes the image generator model 2800 generating a predicted measured image 2825 from an input target image 2815, the image generator model 2800 may also be configured to generate a simulated or predicted target image 3030 from a measured image, such as measured image 3020, which is an image of a specified design pattern printed on a substrate. In some embodiments, the measured image 3020 can be similar to the measured image 320 of FIG. 3 or measured image 2920 of FIG. 29.

The image generator model 2800 may be trained to generate the predicted target image 3030 using multiple measured images and target images as training data. The measured image and the target image used to train the image generator model 2800 may be aligned with each other or non-aligned with each other. In some embodiments, the training data can include multiple target images and multiple measured images in which none of the target images and measured images are aligned with each other, or at least some target images and measured images are not aligned with each other. The details of training the image generator model 2800 to generate the predicted target image 3030 are discussed in detail at least with reference to FIGS. 32-34 below.

Figure 31:
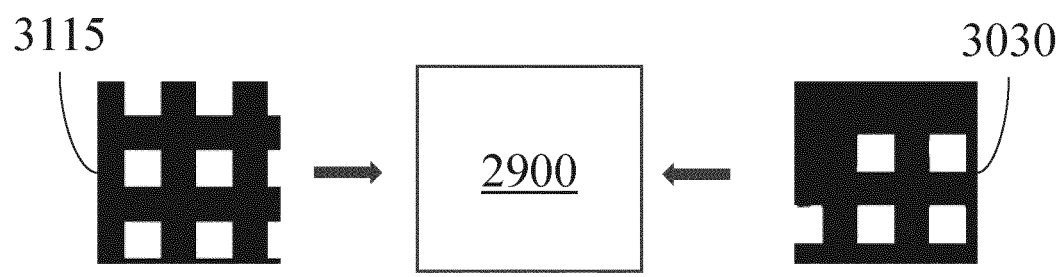
FIG. 31 is a block of diagram of an exemplary image aligner model for aligning a pair of images, according to an embodiment.

FIG. 31 is a block of diagram of an exemplary image aligner model 2900 for aligning a pair of images, according to an embodiment. While FIG. 29 describes the image aligner model 2900 for aligning a pair of images, such as the given measured image 2920 and the predicted measured image 2825, the image aligner model 2900 can also be used to align a given target image 3115 with the predicted target image 3030. In some embodiments, the given target image 3115 may correspond to the specified design pattern captured in the measured image 3020. In some embodiments, the image aligner model 2900 can align the given target image 3115 with the predicted target image 3030, in a way similar to aligning the given measured image 2920 and the predicted measured image 2825, e.g., using frequency domain as described at least with reference to FIG. 10 and/or using spatial domain as described at least with reference to FIGS. 3-7 and 11. For example, instead of inputting the measured image 320 and predicted measured image 925 to the first aligner 1110, the given target image 3115 and the predicted target image 3030 are input to the first aligner 1110 to perform the alignment of the given target image 3115 with the predicted target image 3030. In some embodiments, as a result of aligning the target image 3115 with the predicted target image 3030, the target image 3115 and the measured image 3020 from which the predicted target image 3030 is generated are aligned with each other.

Figure 32A:
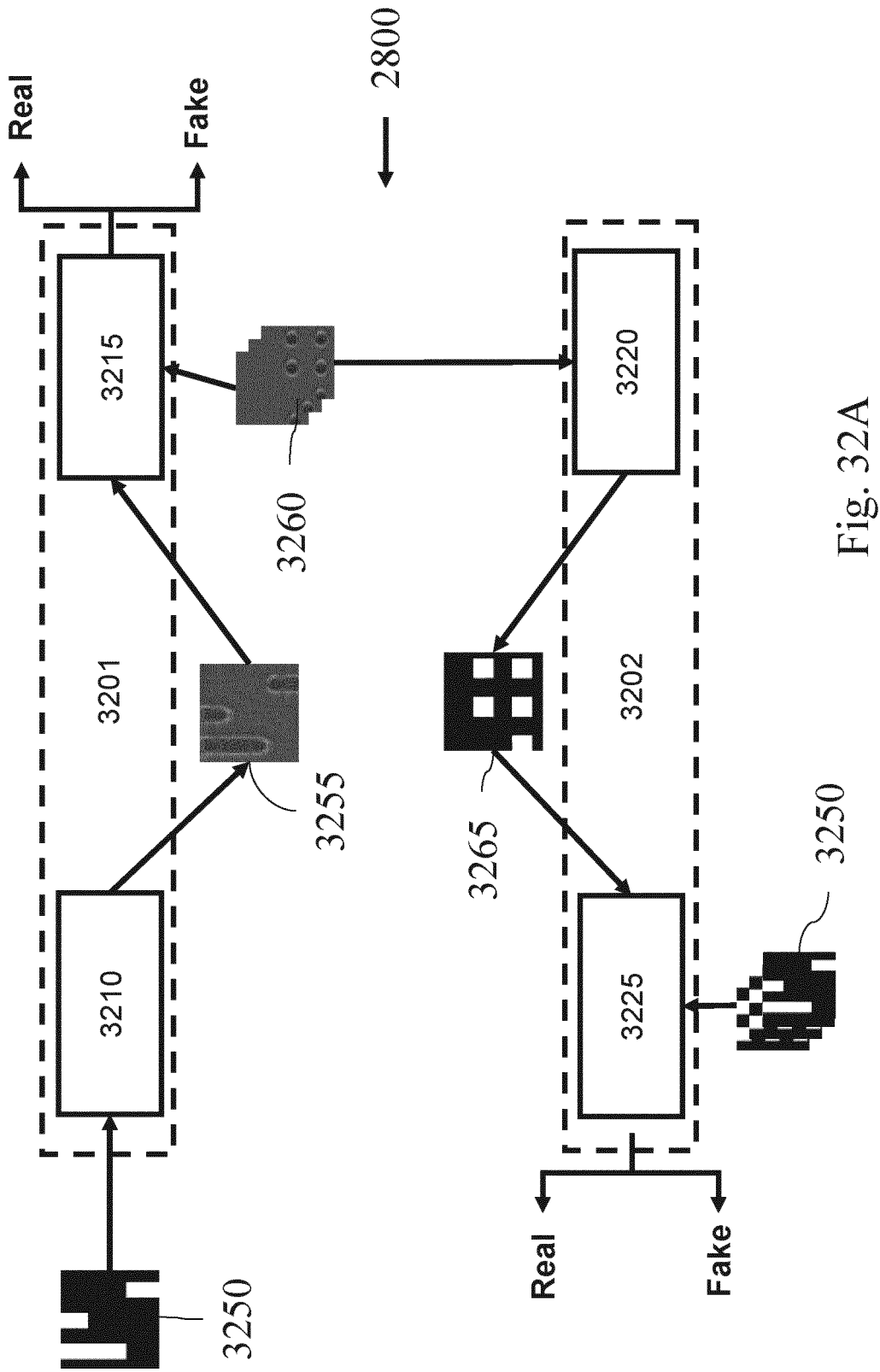
FIG. 32A is a block diagram of training an image generator model to predict a measured image or a target image, according to an embodiment.
Figure 32B:
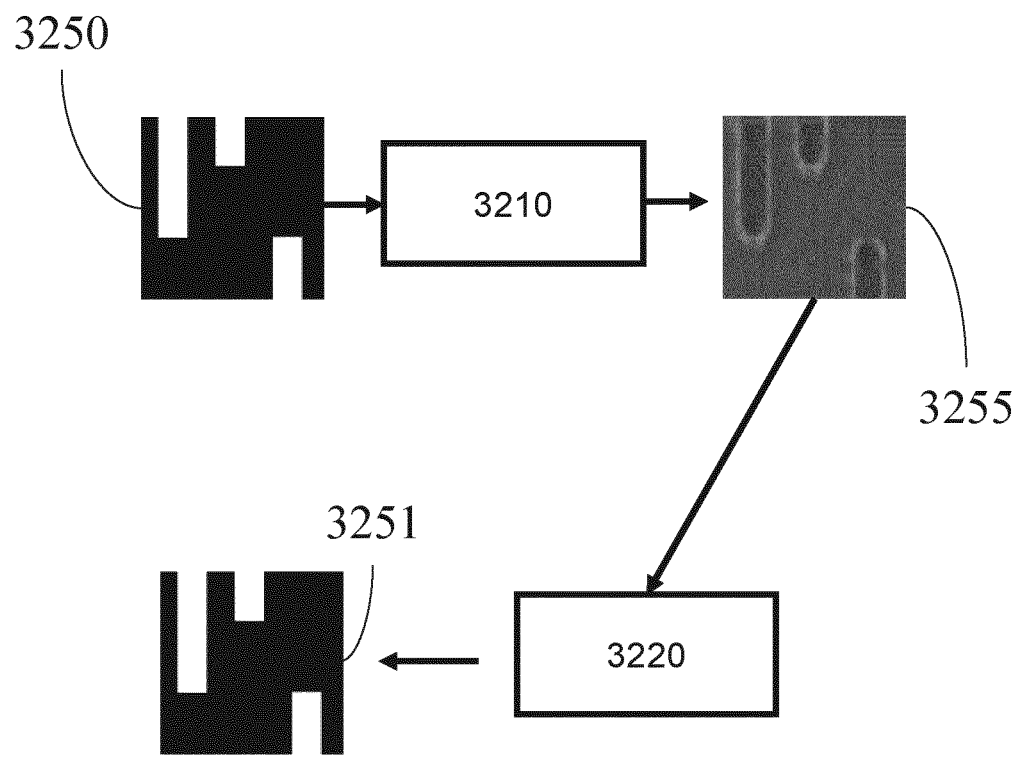
FIG. 32B is a block diagram illustrating generation of a cyclic target image, consistent with various embodiments.
Figure 32C:
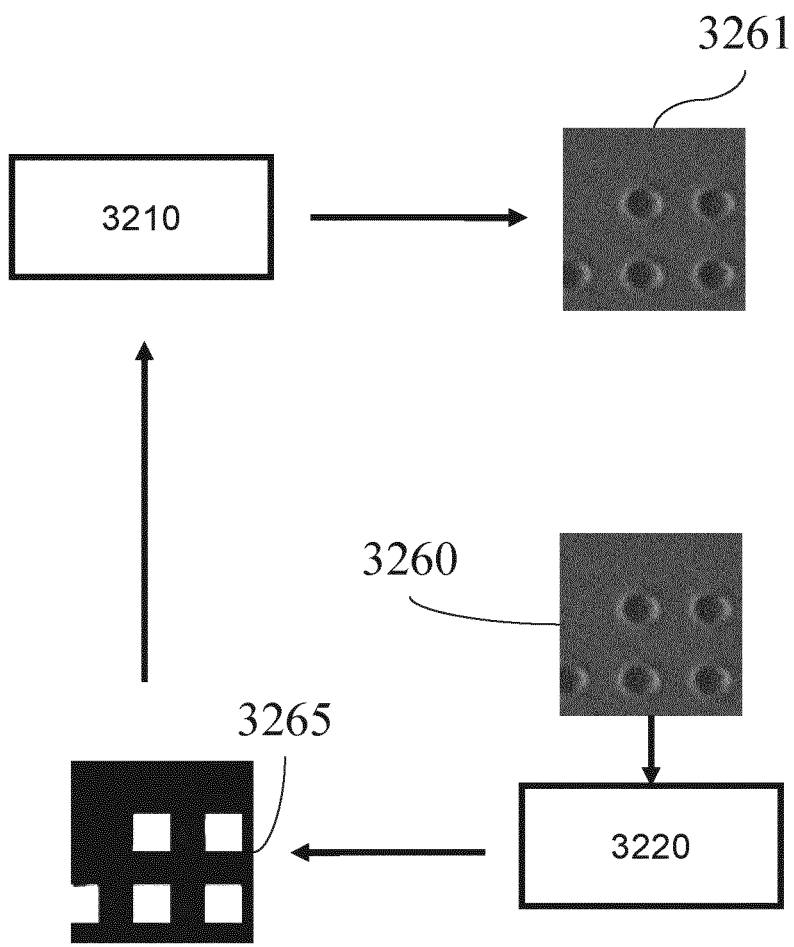
FIG. 32C is a block diagram illustrating generation of a cyclic measured image, according to an embodiment.

FIGS. 32A-32C are block diagrams of training an image generator model to predict a measured image or a target image, according to an embodiment. In some embodiments, the image generator model 2800 is an ML model, such as a Cycle-consistent Generative Adversarial Network (Cycle GAN), which is a variation of Generative Adversarial Network (GAN). The GAN architecture includes two different models called a generator model and a discriminator model that are trained in a cooperative manner. For example, the discriminator model is trained using an output from the generator model and an image from a target domain (or a plurality of images from a target domain), which is a domain to which the input image to the generator model has to be converted, or in other words, an image that is to be generated by the generator model. The discriminator model is trained to identify an input as "real" or "fake". A "real" input is an image that is indistinguishable from images in a target domain and/or has one or more features that satisfy a specified criterion, and a "fake" input is one that does not satisfy the specified criterion. The generator model is trained to improve the generated image so that the discriminator model may not distinguish the generated image as fake. In some embodiments, the generator model and the discriminator model may be two separate convolutional neural networks (CNNs).

In some embodiments, in image-to-image translation neural networks the goal may be to learn the mapping between an input image and an output image using a training set of aligned image pairs. In a paired training set, every image, say "$img_A$" from input domain A, is manually mapped to some image, say "$img_B$" from target domain B, such that they share various features. Features can be used to map an image ($img_A$/$img_B$) to its correspondingly mapped counterpart ($img_B$/$img_A$). Basically, pairing is done to make input and output share some common features. This mapping defines meaningful transformation of an image from one domain (e.g., domain A) to another domain (e.g., domain B). So, when a paired training dataset is available, generator may take an input, say "$input_A$," from domain "$D_A$" and map this image to an output image, say "$gen_B$", which may be close to its mapped counterpart. However, for many tasks, training dataset having paired images or aligned images may not be available, and therefore, such pre-defined meaningful transformation is not readily available in unpaired training dataset.

In some embodiments, cycle GAN is one neural network architecture that generates such meaningful relation between input image and generated image that can be used to translate an image from one domain to another domain with unpaired training dataset. In some embodiments, a cycle GAN has two GANs and each GAN has its own generator and discriminator pair. In cycle GAN, a first generator will map an input image (e.g., "$input_A$") from domain $D_A$ to some image in target domain "$D_B$." A second generator maps back this output image generated by the first generator back to the original input. For example, the cycle GAN inputs an image, $input_A$(e.g., a target image 3250), from domain $D_A$ (e.g., target images set), to the first generator which transforms the image $input_A$ to an image, $gen_B$(e.g., predicted measured image 3255), in target domain $D_B$ (e.g., measured images set). This new generated image $gen_B$(e.g., predicted measured image 3255), is then fed to a second generator which converts it back into a target image, $cyclic_A$(e.g., cyclic target image 3251), from the original domain $D_A$ (target images set). The cycle GAN continues to train the first generator until this output image, $cyclic_A$(e.g., cyclic target image 3251), is close to the original input image, $input_A$(e.g., target image 3250), to define a meaningful mapping that can be used in translating an image from one domain to another domain using an unpaired dataset.

In some embodiments, the image generator model 2800 is implemented using cycle GAN ML model. However, the implementation of the image generator model 2800 is not limited to cycle GAN. In order to generate a predicted measured image from a target image, the image generator model 2800 may use a relationship between an input target image and a cyclic target image, which is generated from the predicted measured image generated using the input target image, to define a cost function that aids in generating the predicted measured image when the training data has unpaired or non-aligned target images and measured images.

The image generator model 2800 includes two modules, e.g., a first module 3201 and a second module 3202, each of which can be a GAN ML model. The first module 3201 includes a first generator model 3210 and a first discriminator model 3215, each of which in some embodiments can be implemented using a CNN. The first generator model 3210 takes as input a target image 3250 (or multiple target images) and outputs a predicted measured image 3255. The first discriminator model 3215 takes as input the predicted measured image 3255 and a reference measured image 3260 (or multiple reference measured images) and distinguishes the reference measured image 3260 and the predicted measured image 3255 as real or fake.

In some embodiments, the target image 3250 is similar to the target image 2815 of FIG. 28 and is an image rendered from a design pattern that is to be printed on a substrate. In some embodiments, the reference measured image 3260 is similar to the measured image 2920 of FIG. 29 and is an image of the actual design pattern printed on the substrate captured by the image capture device. In some embodiments, the predicted measured image 3255 is similar to the predicted measured image 2825 of FIG. 28 and is a prediction of how the design pattern corresponding to the target image 3250 printed on the substrate may look like when imaged by the image capture device. It should be noted that at least some of the target images 3250 and the reference measured images 3260 in the training dataset are non-aligned images, that is, a target image 3250 and the reference measured image 3260 may not be aligned with one another.

In some embodiments, the first discriminator model 3215 distinguishes the predicted measured image 3255 and/or the measured images 3260 as real if they satisfy a specified criterion, e.g., a first threshold related to one or more features of a measured image associated with a specified design pattern printed on a substrate, and as fake if they don't satisfy the specified criterion, e.g., don't satisfy the first threshold. In some embodiments, the first discriminator model 3215 may output numerical values of a certain range (e.g., 0 to 1 or −1 to 1) that are indicative of a real or fake image. For example, a value of "1" may indicate a real image and a value of "0" may indicate a fake image. In some embodiments, the closer the value to "1" the more real the image is and the closer the value "0," the more fake the image is. In some embodiments, a value above a specified threshold (e.g., "0.7") can be indicative of a real image, and below the specified threshold can be indicative of a fake image. During the training, in some embodiments, the first discriminator model 3215 is trained to distinguish the predicted measured image 3255 as fake and the first generator model 3210 is trained to generate the predicted measured image 3255 such that the first discriminator model 3215 may not distinguish the predicted measured image 3255 as fake. As the training progresses (e.g., more and more target images and/or reference measured images are processed), the first generator model 3210 may succeed in generating the predicted measured image 3255 that is similar to reference measured images 3260 (e.g., one or more features of the predicted measured image 3255 satisfies a first threshold related to the reference measured images) such that the first discriminator model 3215 may not distinguish the predicted measured image 3255 as fake anymore.

Similar to the first module 3201, the second module 3202 includes a second generator model 3220 and a second discriminator model 3225. The second generator model 3220 takes as input a reference measured image 3260 (or multiple measured images) and outputs a predicted target image 3265. The second discriminator model 3225 takes as input the predicted target image 3265 and a target image 3250 (or multiple target images) and distinguishes the target images 3250 and the predicted target image 3265 as real or fake. In some embodiments, the predicted target image 3265 is a prediction of how a design pattern corresponding to the reference measured image 3260 may look like. In some embodiments, the second discriminator model 3225 distinguishes the predicted target image 3265 and/or the target images 3250 as real if they satisfy a specified criterion, e.g., a second threshold related to one or more features of a design pattern to be printed on a substrate, and as fake if they don't satisfy the specified criterion. As described above with respect to the first discriminator model 3215, in some embodiments, the second discriminator model 3225 may also output numerical values of a certain range (e.g., 0 to 1 or −1 to 1) that are indicative of a real or fake image. During the training, in some embodiments, the second discriminator model 3225 is trained to distinguish the predicted target image 3265 as fake and the second generator model 3220 is trained to generate the predicted target image 3265 such that the second discriminator model 3225 may not distinguish the predicted target image 3265 as fake. As the training progresses, the second generator model 3220 may succeed in generating the predicted target image 3265 that is similar to the target image 3250 (e.g., one or more features of the predicted target image 3265 satisfies a second threshold) such that the second discriminator model 3225 may not distinguish the predicted target image 3265 as fake anymore.

In some embodiments, the training process of the image generator model 2800 is an iterative process and an iteration can include receiving a target image 3250, a measured image 3260 and generating a predicted measured image 3255 (and/or predicted target image 3265), computing a cost function associated with at least the target image 3250, reference measured image 3260 and the predicted measured image 3255 (and/or the predicted target image 3265), and adjusting model parameters, such as weights and biases of the image generator model 2800, such that the cost function is minimized. The cost function of the image generator model 2800, f, can be a combination of cost functions, including cost functions associated with (a) the first module 3201, which includes first generator and discriminator cost functions, and (b) the second module 3202, which includes second generator and discriminator cost functions.

In the training process, the first generator model 3210 receives the target image 3250 as input and generates the predicted measured image 3255 as output. The first discriminator model 3215 receives the predicted measured image 3255, and one or more reference measured images 3260 as input and the first discriminator model 3215 distinguishes each of the reference measured images 3260 and the predicted measured image 3255 as fake or real. In some embodiments, the predicted measured image 3255 may be distinguished as real and/or the reference measured images 3260 may be distinguished as fake. This is an undesired result indicating a model parameter or a plurality of model parameters (e.g., weights and biases) of the first discriminator model 3215 should be adjusted so that the predicted measured image is distinguished as fake and the reference measured images 3260 are distinguished as real. Further, a model parameter of the first generator model 3210 may also have to be adjusted to improve the quality of the predicted measured image 3255 such that the predicted measured image 3255 may be distinguished by the first discriminator model 3215 as real.

In some embodiments, the adjusting of the model parameter(s) of the first generator model 3210 is based on a first generator cost function and the adjusting of the model parameter(s) of the first discriminator model 3215 is based on a first discriminator cost function. For example, the first generator cost function may be defined as a function of (i) a first probability that the first discriminator model 3215 determines the predicted measured image 3255 as real, and (ii) a first metric that is indicative of a difference between the input target image 3250 and a cyclic target image.

In some embodiments, a cyclic target image is generated back from the predicted measured image 3255 to determine if the predicted measured image 3255 is accurate enough to generate the input target image 3250 from which the predicted measured image 3255 is generated. FIG. 32B is a block diagram illustrating generation of a cyclic target image 3251, consistent with various embodiments. After generating the predicted measured image 3255 from the input target image 3250, the first generator model 3210 inputs the predicted measured image 3255 to the second generator model 3220 to generate a target image, such as the cyclic target image 3251, from the predicted measured image 3255. The first generator model 3210 can then measure the first metric that is indicative of a difference between the input target image 3250 and the cyclic target image 3251. In some embodiments, the lesser the difference between the input target image 3250 and the cyclic target image 3251 the more accurate is the predicted measured image 3255. In some embodiments, any of various methods for image comparison may be used to quantify the difference between the two images (e.g., pixel to pixel comparison).

An example of the first generator cost function (e.g., $L_{G1}$) can be expressed by equation 1 below:

$$L_{G1}=E[\log 1-DY(G(x))]+\lambda E[\|F(G(x))-x\|] \quad (1)$$

where G tries to generate predicted measured images G(x) that look similar to reference measured images 3260 from domain Y, while log 1−DY is a log conditional probability that the first discriminator model 3215 distinguishes the predicted measured images G(x) as real, and where λ is a constant and $\|F(G(x))-x\|$ indicates the first metric, which is also referred to as a forward cycle consistency loss—for each target image 3250, x, from domain X, the image translation cycle should be able to bring the predicted measured image 3255, G(x), back to the original image (F(G(x))), i.e., x→G(x)→F(G(x))≈x.

In some embodiments, the model parameter(s) of the first generator model 3210 is adjusted such that the first generator function, e.g., the first probability and the first metric, is minimized (e.g., reduced or is below a specified threshold). Consequently, the first generator model 3210 may generate fake images (e.g., the predicted measured images 3255) such that the conditional probability that the first discriminator model 3215 will distinguish the fake image as fake is low (or below a specified threshold). In other words, the first generator model 3210 will progressively generate predicted measured images that are more and more realistic or are similar to reference measured images 3260 (or predicted measured images that satisfy the first threshold for being considered as real).

In some embodiments, the first discriminator cost function may be defined as a function of (i) a first probability that the predicted measured image 3255 is determined as real, and (ii) a second probability that the reference measured image 3260 is determined as fake.

An example discriminator cost function may be expressed by equation 2 below:

$$L_{D1}=E[\log 1-DY(y)]+E[\log 1-DY(G(x))] \quad (2)$$

where log 1–DY (y) is a log likelihood of conditional probability that the first discriminator model 3215 distinguishes the reference measured images, y, as fake.

In some embodiments, the first discriminator cost function (eq. 2) is minimized Consequently, the first discriminator model 3215 progressively gets better at distinguishing a real measured image (e.g., reference measured image 3260) from a fake measured image (e.g., predicted measured image 3255).

Thus, the first generator model 3210 and the first discriminator model 3215 are trained simultaneously, such that the first discriminator model 3215 provides a feedback to the first generator model 3210 about the quality of the fake image (i.e., how closely the predicted measured image resembles the reference measured image). Further, as the quality of the fake image gets better; the first discriminator model 3215 needs to get better at distinguishing the fake image from the real image. The goal is to train the first module 3201 until the first generator model 3210 and the first discriminator model 3215 do not improve each other. For example, if values of the respective cost functions do not change substantially over further iterations, the models do not improve each other, hence considered as trained models.

Like the first module 3201, the second module 3202 is also trained to get better at generating the predicted target image 3265 from the reference measured images 3260 input to the second generator model 3220. In the training process, the second generator model 3220 receives a measured image 3260 as input and generates the predicted target image 3265 as output. The second discriminator model 3225 receives the predicted target image 3265 and one or more reference target images 3250 as input, and distinguishes each of the reference target images 3250 and the predicted target image 3265 as fake or real. In some embodiments, the predicted target image 3265 may be distinguished as real and/or the reference target images 3250 may be distinguished as fake. This is an undesired result indicating a model parameter or a plurality of model parameters (e.g., weights and biases) of the second discriminator model 3225 should be adjusted so that the predicted target image 3265 is distinguished as fake and the reference target images 3250 are distinguished as real. Further, a model parameter of the second generator model 3220 may also have to be adjusted to improve the quality of the predicted target image 3265 such that the predicted target image 3265 may be distinguished by the second discriminator model 3225 as real.

In some embodiments, the adjusting of the model parameter(s) of the second generator model 3220 is based on a second generator cost function and the adjusting of the model parameter(s) of the second discriminator model 3225 is based on a second discriminator cost function. For example, the second generator cost function may be defined as a function of (i) a first probability that the second discriminator model 3225 determines the predicted target image 3265 as real, and (ii) a second metric that is indicative of a difference between the input target image 3250 and a cyclic measured image.

In some embodiments, a cyclic measured image is generated back from the predicted target image 3265 to determine if the predicted target image 3265 is accurate enough to generate the input measured image 3260 from which the predicted target image 3265 is generated. FIG. 32C is a block diagram illustrating generation of a cyclic measured image 3261, according to an embodiment. After generating the predicted target image 3265 from the input measured image 3260, the second generator model 3220 inputs the predicted target image 3265 to the first generator model 3210 to generate a measured image, such as the cyclic measured image 3261, from the predicted target image 3265. The second generator model 3220 can then measure the second metric that is indicative of a difference between the input measured image 3260 and the cyclic measured image 3261. In some embodiments, the lesser the difference between the input measured image 3260 and the cyclic measured image 3261 the more accurate is the predicted target image 3265. In some embodiments, any of various methods for image comparison may be used to quantify the difference between the two images (e.g., pixel to pixel comparison).

An example of the second generator cost function (e.g., $L_{G2}$) can be expressed by equation 1 below:

$$L_{G2}=E[\log 1-DX(F(y))]+\lambda E[\|G(F(y))-y\|] \quad (3)$$

where F tries to generate predicted target images F(y) that look similar to reference target images 3250 from domain X, while log 1-DX is a log conditional probability that the second discriminator model 3225 distinguishes the predicted target images F(y) as real, and where A is a constant and ∥G(F(y))−y∥∥ indicates the second metric, which is also referred to as a backward cycle consistency loss—for each measured image 3260, y, from domain Y, the image translation cycle should be able to bring the predicted target image 3265, F(y), back to the original image (G(F(y))), i.e., y→F(y)→G(F(y))≈y.

In some embodiments, the model parameter(s) of the second generator model 3220 is adjusted such that the second generator function, e.g., the first probability and the second metric, is minimized (e.g., reduced or is below a specified threshold). Consequently, the second generator model 3220 may generate fake images (e.g., the predicted target images 3265) such that the conditional probability that the second discriminator model 3225 will distinguish the fake image as fake is low (or below a specified threshold). In other words, the second generator model 3220 will progressively generate predicted target images that are more and more realistic or are similar to reference target images 3250 (or predicted target images that satisfy the second threshold for being considered as real).

In some embodiments, the second discriminator cost function may be defined as a function of (i) a first probability that the predicted target image 3265 is determined as real, and (ii) a second probability that the reference target image 3250 is determined as fake.

An example discriminator cost function may be expressed by equation 4 below:

$$L_{D2}=E[\log 1-DX(x)]+E[\log 1-DX(F(y))] \quad (4)$$

where log 1–DX (x) is a log likelihood of conditional probability that the second discriminator model 3225 distinguishes the reference target images, x, as fake.

In some embodiments, the second discriminator cost function (eq. 4) is minimized. Consequently, the second discriminator model 3225 progressively gets better at distinguishing a real target image (e.g., reference target image 3250) from a fake target image (e.g., predicted target image 3265).

Thus, the second generator model 3220 and the second discriminator model 3225 are trained simultaneously, such that the second discriminator model 3225 provides a feedback to the second generator model 3220 about the quality of the fake image (i.e., how closely the predicted target image resembles the reference target image). Further, as the quality of the fake image gets better; the second discriminator model 3225 needs to get better at distinguishing the fake image from the real image. The goal is to train the second module 3202 until the second generator model 3220 and the second discriminator model 3225 do not improve each other. For example, if values of the respective cost functions do not change substantially over further iterations, the models do not improve each other, hence considered as trained models.

An example cost function, $f$, of the image generator model 2800 can be expressed as:

$$f(L_{G1}, L_{D1}, L_{G2}, L_{D2}) = \qquad (5)$$
$$E[\log 1 - DY(G(x))] + \lambda E[\|F(G(x)) - x\|]$$
$$+$$
$$E[\log 1 - DY(y)] + E[\log 1 - DY(G(x))]$$
$$+$$
$$E[\log 1 - DX(F(y))] + \lambda E[\|G(F(y)) - y\|]$$
$$+$$
$$E[\log 1 - DX(x)] + E[\log 1 - DX(F(y))]$$

In some embodiments, the cost function, $f$, (eq. 5) of the image generator model 2800 is a combination of the equations (1)-(4) above. In some embodiments, the first module 3201 and the second module of 3202 are co-operatively trained such that the cost function of the image generator model 2800 (eq. 5) does not improve anymore (e.g., is reduced, minimized or below a specified threshold). For example, if values of the cost function do not change substantially over further iterations, the image generator model 2800 is considered as a trained model. In other words, the image generator model 2800 is configured to generate predicted measured images or predicted target images that are realistic or similar to actual measured images or target images, respectively, or that satisfy respective criterion to be considered as real. The trained image generator model 2800 can then be used to generate a predicted measured image from a given target image, and the predicted measured image can be used to align a given measured image. Similarly, the trained image generator model 2800 can be used to generate a predicted target image from a given measured image, and the predicted target image can be used to align a given target image.

In some embodiments, the first module 3201 and the second module 3202 are trained co-operatively. However, in some embodiments, each of the modules can be "fine-tuned" (e.g., model parameters adjusted) independent of the other module. For example, the first module 3201 may be fine-tuned to improve the generation of the predicted measured 3255 without affecting the performance of, or independent of, the second module 3202 in generating the predicted target image 3265. Additional details of training the image generator model 2800 is described at least with reference to FIGS. 33 and 34 below.

Figure 33:
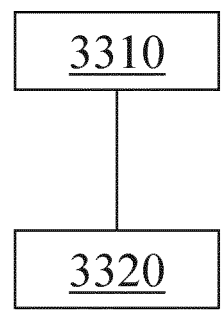
FIG. 33 is a flow diagram of training a machine learning model configured to generate a predicted measured image, according to an embodiment.

FIG. 33 is a flow diagram of training a machine learning model configured to generate a predicted measured image (and/or a predicted target image), according to an embodiment. While the following description is focused on training the image generator model 2800 to generate a predicted measured image from an input target image, it should be noted that, at least in some embodiments, training the image generator model 2800 to generate the predicted measured image may also train the image generator model 2800 to generate a predicted target image from an input measured image (e.g., as described at least with reference to FIG. 32 above).

At operation 3310, an input target image associated with a reference design pattern to be printed on a substrate, and a reference measured image associated with a specified design pattern printed on a substrate is obtained. For example, the input target image can be the target image 3250 and the reference measured image can be the reference measured image 3260. In some embodiments, the target image 3250 is an image rendered from a reference design pattern, such as the design pattern 905 of FIG. 9, that is to be printed on a substrate. The reference design pattern can be accessed from the database 930, such as the GDS.

In some embodiments, the reference measured image is an image of the specified design pattern printed on the substrate captured by the image capture device.

In some embodiments, the input target image 3250 and the reference measured image 3260 are non-aligned images. That is, one or more features of the input target image 3250 (e.g., contours) may not align with the one or more features of the reference measured image 3260.

At operation 3320, the machine learning model is trained to generate a predicted measured image using the input target image. For example, the image generator model 2800 is trained to generate the predicted measured image 3255 using the input target image 3250. The predicted measured image 3255 is a prediction of how the reference design pattern corresponding to the input target image 3250 printed on the substrate may look like when imaged by the image capture device. Additional details of the training process are described at least with reference to FIGS. 34A-34C.

The training of the image generator model 2800 is an iterative process and may be continued until a cost function, $f$, of the image generator model 2800 (e.g., represented by equation 5) is minimized (e.g., reduced and/or is below a specified threshold). In some embodiments, the image generator model 2800 is trained such that the cost function does not improve anymore (e.g., is reduced, minimized or below a specified threshold) at which point the image generator model 2800 may be considered as a trained model. Once trained, the image generator model 2800 is configured to generate predicted measured images or predicted target images that are realistic or similar to actual measured images or target images, respectively, or that satisfy respective criterion to be considered as real. The trained image generator model 2800 can then be used to generate a predicted measured image from a given target image and/or generate a predicted target image from a given measured image.

FIG. 34A is a flow diagram of another exemplary method for training the image generator model to generate a predicted measured image (and/or predicted target image), according to an embodiment. In some embodiments, the method of FIG. 34A is performed as part of operation 3320 of FIG. 33.

At operation 3410, a first generator model of the machine learning model is executed to generate the predicted measured image from the input target image. For example, the first generator model 3210 is executed to generate the predicted measured image 3255 from the input target image 3250. In some embodiments, the first generator model 3210 is a CNN that takes an input vector (e.g., input target image 3250) and generates an output vector (e.g., predicted measured image 3255).

At operation 3420, a first discriminator model of the machine learning model determines whether the predicted measured image and the reference measured image are real or fake. For example, the first discriminator model 3215 takes as input the predicted measured image 3255 generated by the first generator model 3210 and one or more reference measured images 3260 and determines whether each of those images is real or fake. In some embodiments, the first discriminator model 3215 is a CNN that takes an input vector (e.g., predicted measured image 3255 or reference measured image 3260) and generates an output value (e.g., "0" or "1", a value in a specified range "0"-"1") that is indicative of whether an image is real or fake. In some embodiments, the first discriminator model 3215 determines an image to be real if the image satisfies a first threshold related to a measured image associated with a specified design pattern printed on a substrate, else determines the image to be fake. For example, if the predicted measured image 3255 or one or more features of the predicted measured image 3255 satisfy a first threshold related to one or more features of the measured image associated with the specified design pattern printed on the substrate, the first discriminator model 3215 determines the predicted measured image 3255 as real (e.g., outputs value "1" or a value above a specified threshold), else determines the predicted measured image 3255 as fake (e.g., outputs value "0" or a value below the specified threshold).

In some embodiments, based on the output of the first discriminator model 3215, model parameters are adjusted to minimize a cost function associated with the first generator model 3210 and/or the first discriminator model 3215, which is described in detail at least with reference to FIG. 33 above and/or FIG. 34B below.

At operation 3430, a second generator model of the machine learning model is executed to generate a predicted target image from the reference measured image. For example, the second generator model 3220 takes as input a reference measured image 3260 (also referred to as "input measured image 3260" with reference to the second module 3202) and generates the predicted target image 3265 from the input measured image 3260. In some embodiments, the predicted target image 3265 is a prediction of how a design pattern corresponding to the input measured image 3260 may look like. In some embodiments, the second generator model 3220 is a CNN that takes an input vector (e.g., input measured image 3260) and generates an output vector (e.g., predicted target image 3265).

At operation 3440, a second discriminator model of the machine learning model determines whether the predicted target image and the input target image are real or fake. For example, the second discriminator model 3225 takes as input the predicted target image 3265 generated by the second generator model 3220 and one or more input target images 3250 (also referred to as "reference target images 3250" at least with reference to second module 3202) and determines whether each of those images is real or fake. In some embodiments, the second discriminator model 3225 is a CNN that takes an input vector (e.g., predicted target image 3265 or reference target image 3250) and generates an output value (e.g., "0" or "1", a value in a specified range "0"-"1") that is indicative of whether an image is real or fake. In some embodiments, the second discriminator model 3225 determines an image to be real if the image satisfies a second threshold related to an input design pattern to be printed on a substrate, else determines the image to be fake. For example, if the predicted target image 3265 or one or more features of the predicted target image 3265 satisfy a second threshold related to one or more features of the input design pattern associated with the input target image 3250 to be printed on the substrate, the second discriminator model 3225 determines the predicted target image 3265 as real (e.g., outputs value "1" or a value above a specified threshold), else determines the predicted target image 3265 as fake (e.g., outputs value "0" or a value below the specified threshold).

In some embodiments, based on the output of the second discriminator model 3225, model parameters are adjusted to minimize a cost function associated with the second generator model 3220 and/or the second discriminator model 3225, which is described in detail at least with reference to FIG. 33 above and/or FIG. 34C below.

FIG. 34B is a flow diagram of an exemplary method for minimizing a cost function associated with a first module of the machine learning model in generating a predicted measured image, according to an embodiment. In some embodiments, the method of FIG. 34B is performed as part of operation 3420 of FIG. 34A.

At operation 3421, the first module 3201 computes a first discriminator function associated with the first discriminator model 3215. In some embodiments, the first discriminator function is a function of: (i) a first probability that the predicted measured image 3255 is determined as real, and (ii) a second probability that the reference measured image 3260 is determined as fake.

At operation 3422, the first module 3201 computes a first generator function associated with the first generator model 3210. In some embodiments, the first generator function is a function of: (i) the first probability that the predicted measured image 3255 is determined by the first discriminator model 3215 as real, and (ii) a first metric that is indicative of a difference between the input target image 3250 and a cyclic target image 3251. In some embodiments, as described at least with reference to FIG. 32B, the cyclic target image 3251 is generated from the predicted measured image 3255 (which is generated from the input target image 3250).

At operation 3423, the first module 3201 adjusts parameters of the first discriminator model 3215 to minimize the first discriminator function. For example, if the first discriminator model 3215 determines the predicted measured image 3255 to be real and/or determines the reference measured image 3260 to be fake, which are undesired results, the model parameters of the first discriminator model 3215 have to be adjusted to make the first discriminator model 3215 determine the predicted measured image 3255 as fake and/or the reference measured image 3260 as real. An example first discriminator cost function is expressed using equation 2 above.

At operation 3424, the first module 3201 adjusts parameters of the first generator model 3210 to minimize the first generator cost function. For example, if the first discriminator model 3215 determines the predicted measured image 3255 as fake, it is an undesired result as the first generator model 3210 has not generated the predicted measured image 3255 which is similar to, matches with, or is characteristic of an actual measured image (e.g., one or more features of the predicted measured image does not satisfy a first threshold related to a specified measured image associated with a specified design pattern printed on a substrate). In another example, if the first metric that is indicative of a difference between the input target image 3250 and a cyclic target image 3251 is above a specified threshold, then it is an undesired result as the generated predicted measured image 3255 is not accurate enough to generate the original target input image back from the predicted measured image 3255. Accordingly, the model parameters of the first generator model 3210 have to be adjusted to make the first generator model 3210 generate an improved predicted measured image 3255 such that the first discriminator model 3215 does not determine the predicted measured image 3255 as fake anymore. An example first generator cost function is expressed using equation 1 above.

FIG. 34C is a flow diagram of an exemplary method for minimizing a cost function associated with a second module of the machine learning model in generating a predicted target image, according to an embodiment. In some embodiments, the method of FIG. 34C is performed as part of operation 3440 of FIG. 34A.

At operation 3441, the second module 3202 computes a second discriminator function associated with the second discriminator model 3225. In some embodiments, the second discriminator function is a function of: (i) a first probability that the predicted target image 3265 is determined as real, and (ii) a second probability that the reference target image 3250 is determined as fake.

At operation 3442, the second module 3202 computes a second generator function associated with the second generator model 3220. In some embodiments, the second generator function is a function of: (i) the first probability that the predicted target image 3265 is determined by the second discriminator model 3225 as real, and (ii) a second metric that is indicative of a difference between the input measured image 3260 and a cyclic measured image 3261. In some embodiments, as described at least with reference to FIG. 32C, the cyclic measured image 3261 is generated from the predicted target image 3265 (which is generated using the input measured image 3260).

At operation 3443, the second module 3202 adjusts parameters of the second discriminator model 3225 to minimize the second discriminator function. For example, if the second discriminator model 3225 determines the predicted target image 3265 to be real and/or determines the reference target image 3250 to be fake, which are undesired results, the model parameters of the second discriminator model 3225 have to be adjusted to make the second discriminator model 3225 determine the predicted target image 3265 as fake and/or the reference target image 3250 as real. An example second discriminator function is expressed using equation 4 above.

At operation 3444, the second module 3202 adjusts parameters of the second generator model 3220 to minimize the second generator cost function. For example, if the second discriminator model 3225 determines the predicted target image 3265 as fake, it is an undesired result as the second generator model 3220 is not capable of generating a predicted target image 3265 which is similar to, matches with, or is characteristic of an actual target image (e.g., one or more features of the predicted target image does not satisfy a second threshold related to a design pattern associated with reference target images). In another example, if the second metric that is indicative of a difference between the input measured image 3260 and the cyclic measured image 3261 (which is a copy of the original input measured image 3260 generated back from the predicted target image 3265) is above a specified threshold, then it is an undesired result as the generated predicted target image 3265 is not accurate enough to generate back the original target input image from which the predicted target image 3265 is generated. Accordingly, the model parameters of the second generator model 3220 have to be adjusted to make the second generator model 3220 generate an improved predicted target image 3265 such that the second metric is below the specified threshold and/or the second discriminator model 3225 does not determine the predicted target image 3265 as fake anymore. An example second generator cost function is expressed using equation 3 above.

Referring to FIG. 34A, the operations 3410-3440 are repeated with a number of input target images 3250 and a number of reference measured images 3260 with the model parameters of the first module 3201 and/or second module 3202 being adjusted progressively until the cost function, f, (expressed using equation 5) associated with the image generator model 2800 is minimized (in some embodiments, below a specified threshold), or does not reduce significantly any more.

After the iterations are completed, the image generator model 2800 is considered to be trained. The trained image generator model 2800 can then be used to predict a measured image for any desired design pattern, by using a target image associated with the desired design pattern as input to the trained image generator model 2800, e.g., as described at least with reference to FIG. 28 above, and/or FIG. 35 below. Similarly, the trained image generator model 2800 can be used to predict a target image corresponding to a design pattern etched on a substrate, by using a measured image of the design pattern captured by an image acquiring device as an input to the trained image generator model 2800, e.g., as described at least with reference to FIG. 30 above, and/or FIG. 35 below.

Figure 35:
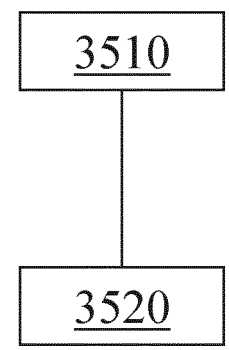
FIG. 35 is a flow diagram of an exemplary process for generating a predicted measured image, according to an embodiment.

FIG. 35 is a flow diagram of an exemplary process for generating a predicted measured image, according to an embodiment.

At operation 3510, an input target image associated with a design pattern to be etched on a substrate is obtained. For example, the design pattern such as a design pattern 905 of FIG. 9, which is a pattern etched/to be etched on a substrate, is accessed from the database 930, such as a GDS. In some embodiments, the design pattern 905 is polygons in the GDS. The input target image, e.g., the input target image 2815 of FIG. 28, can be rendered from the design pattern 905 by the image renderer 910 using one or more image rendering techniques.

At operation 3520, the image generator model 2800 generates a predicted measured image 2825 using the input target image 2815. In some embodiments, the predicted measured image 2825 is a prediction of how the design pattern 905 or the target image 2815 printed on the substrate may look like when imaged by the image capture device.

Figure 34:
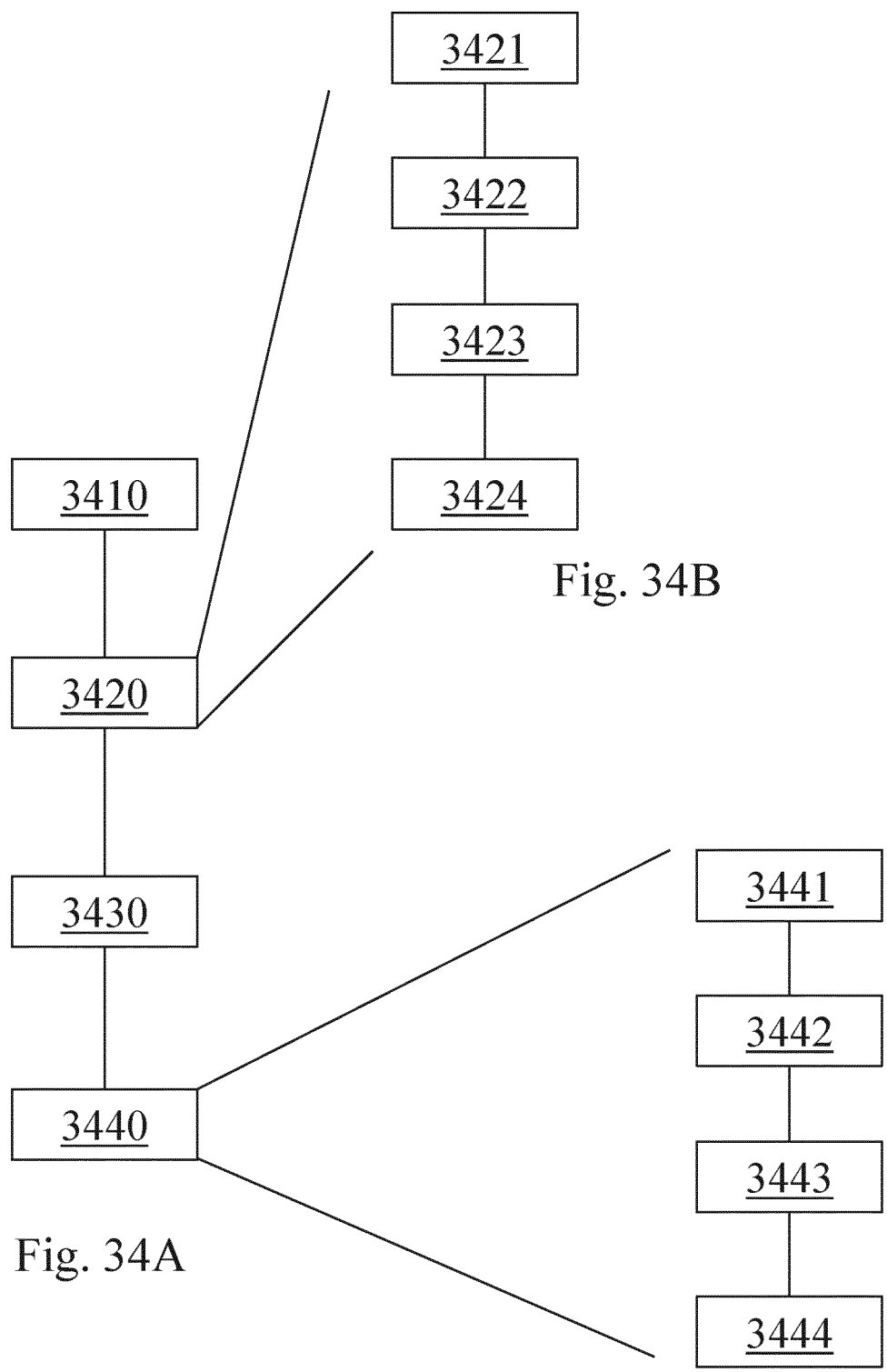
FIG. 34A is a flow diagram of another exemplary method for training the image generator model to generate a predicted measured image (and/or predicted target image), according to an embodiment.
FIG. 34B is a flow diagram of an exemplary method for minimizing a cost function associated with a first module of the machine learning model in generating a predicted measured image, according to an embodiment.
FIG. 34C is a flow diagram of an exemplary method for minimizing a cost function associated with a second module of the machine learning model in generating a predicted target image, according to an embodiment.

In some embodiments, the image generator model 2800 is a machine learning model and is trained to generate a predicted measured image using machine learning techniques discussed at least with reference to FIGS. 32-34 above. Further, in some embodiments, the image generator model 2800 may use only a portion of the image generator model 2800, such as the first generator model 3210 (and not the first discriminator model 3215), for generating the predicted measured image 2825.

Similar to the process discussed above, the image generator model 2800 may also be used to generate a predicted target image, such as the predicted target image 3030, by taking as input a measured image, such as measured image 3020 of FIG. 30. The measured image 3020 is an image generated from an image capture device of a design pattern printed on the substrate. The predicted target image 3030 is a simulated image of a design pattern (e.g., simulated image having GDS polygons corresponding to the design pattern) generated based on the measured image 3020. Like in generating the predicted measured image 2825, the image generator model 2800 may, in some embodiments, use only a portion of the image generator model 2800, such as the second generator model 3220 (and not the second discriminator model 3225), for generating the predicted target image 3030.

A predicted measured image, such as the predicted measured image 2825, may be used to align a measured image. In some embodiments, aligning two images may include aligning one or more features (e.g., a contour) of a first image with one or more features (e.g., a contour) of a second image. Any of various methods may be used for aligning the images. The following figure describes on such example.

Figure 36:
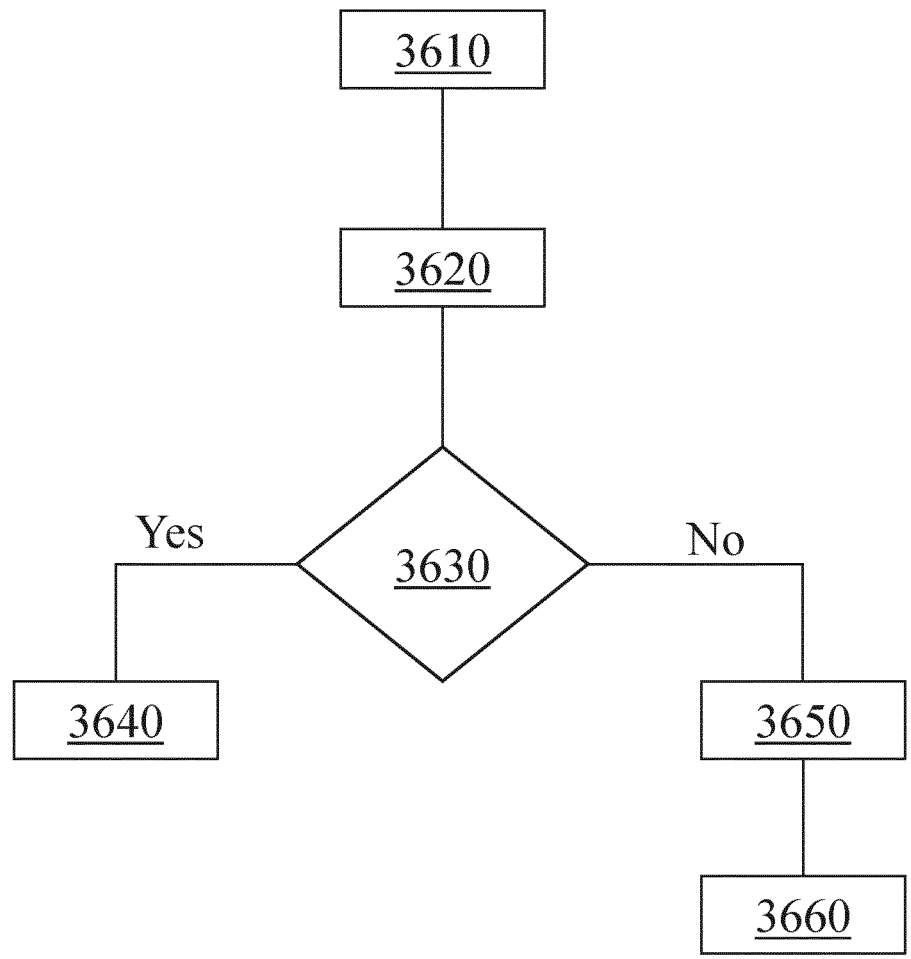
FIG. 36 is a flow diagram of an exemplary process for aligning a measured image (or a target image), according to an embodiment.

FIG. 36 is a flow diagram of an exemplary process for aligning a measured image (or a target image), according to an embodiment. In some embodiments, the process of FIG. 26 is similar to the process of FIG. 16 above.

At operation 3610, a measured image, such as the measured image 2920 of FIG. 29, and a predicted measured image, such as the predicted measured image 2825 of FIG. 28, with which the measured image is to be aligned are obtained, e.g., as described at least with reference to FIGS. 28 and 35.

At operation 3620, the image aligner model 2900 performs a first alignment to align the measured image 2920 with the predicted measured image 2825 using frequency domain, e.g., as described at least with reference to FIG. 15.

At operation 3630, the image aligner model 2900 determines whether the first alignment satisfies the alignment specification. In some embodiments, the alignment specification can include one or more metrics that are indicative of a quality and/or accuracy of the alignment.

If the first alignment satisfies the alignment specification, at operation 3640, the image aligner model 2900 performs a second alignment to fine align the measured image 2920, which includes making fine adjustments to a first contour associated with the measured image 2920 (such as the measured contour 330 of FIG. 3), with the predicted measured image 2825. In some embodiments, the second alignment is performed in the spatial domain, e.g., as described at least with reference to FIGS. 5 and 11.

If the first alignment does not satisfy the alignment specification, at operation 3650, the image aligner model 2900 obtains the first contour associated with the measured image 2920 and a second contour associated with the predicted measured image 2825 (such as the measured contour 330 and the simulated contour 510, respectively) for performing the second alignment in the spatial domain.

At operation 3660, the image aligner model 2900 performs the second alignment using the first contour and the second contour, as described at least with reference to FIGS. 3-6, to align the measured image 2920 with the predicted measured image 2825.

Figure 37:
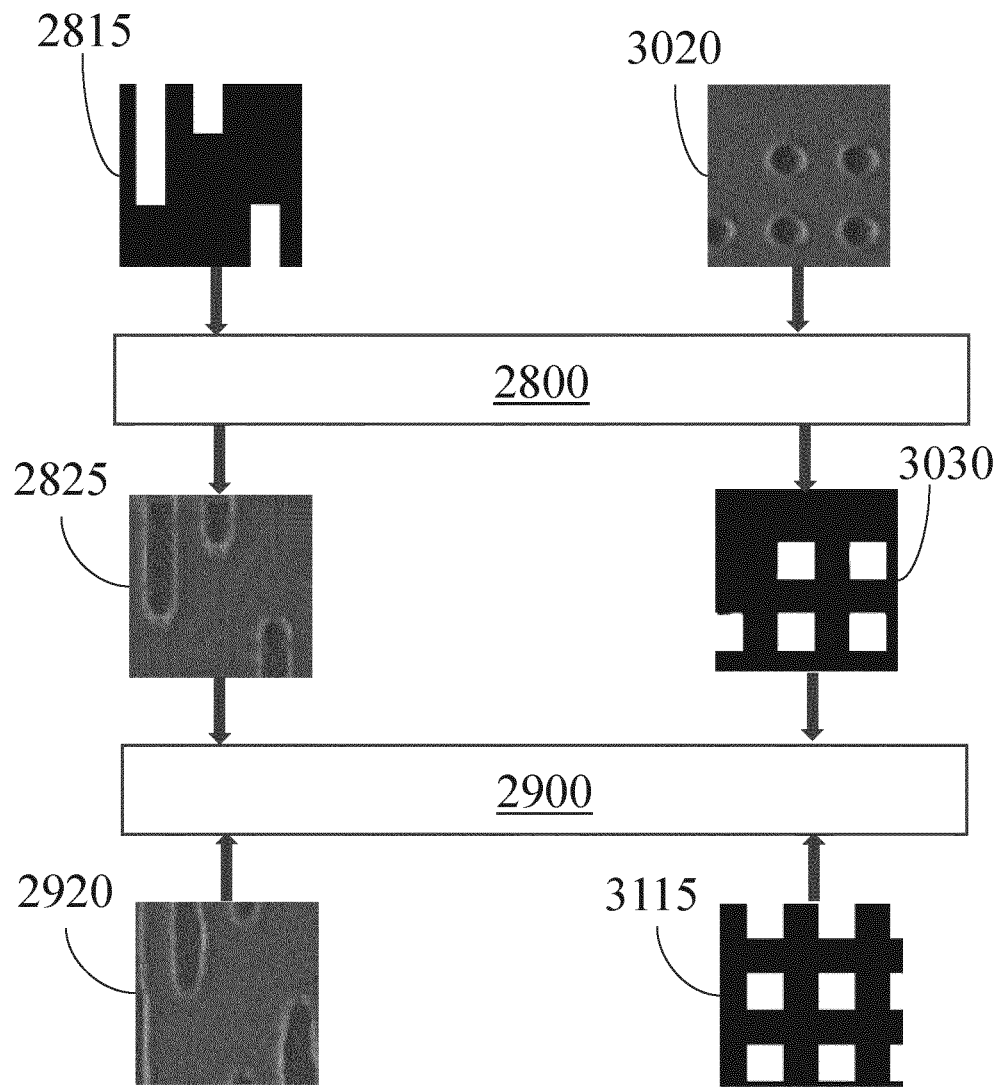
FIG. 37 is a diagram illustrating an exemplary process of aligning a pair of target and measured images, according to an embodiment.

FIG. 37 is a diagram illustrating an exemplary process of aligning a pair of target and measured images, according to an embodiment. As described above, at least with reference to FIGS. 28-31 and 35, the image generator model 2800 can generate a predicted measured image 2825 from an input target image 2815 or a predicted target image 3030 from an input measured image 3020. In some embodiments, the image generator model 2800 can take as input both target image 2815 and measured image 3020 and generate the predicted measured image 2825 (e.g., from the input target image 2815) and the predicted target image 3030 (e.g., from the input measured image 3020).

The predicted measured image 2825 may then be used to align the target image 2815 with a corresponding measured image 2920, which, for example, may be achieved by inputting the measured image 2920 and the predicted measured image 2825 to the image aligner model 2900 and aligning the predicted measured image 2825 with the measured image 2920. Similarly, the predicted target image 3030 may be used to align the measured image 3020 with a corresponding target image 3115, which, for example, may be achieved by inputting the target image 3115 and the predicted target image 3030 to the image aligner model 2900 and aligning the predicted target image 3030 with the target image 3115. The image aligner model 2900 performs the alignment as described at least with reference to FIGS. 29, 31, and 36. The image aligner model 2900, as described above at least with reference to FIG. 36, can use any of various known methods for performing the alignment. In some embodiments, the image aligner model 2900 can perform both the alignments discussed above simultaneously.

One of the advantages of the disclosed methods and system is that the image generator model 2800, which is used to generate the predicted measured image and/or predicted target image, can be trained using non-aligned pair of images. That is, the training data set (e.g., an input target image and a reference measured image) may not be aligned with each other. As described above, in some embodiments, a target image and measured image may be considered to be non-aligned when one or more characteristics of a target image (e.g., contours of a feature in the design pattern) is not aligned, does not match, has a match less than a threshold, or does not correspond, with the respective one or more characteristics of the measured image. By enabling the training of the image generator model 2800 using non-aligned pair of images, the need for obtaining aligned pair of images is eliminated and thereby, a significant amount of computing resources that may be consumed in preparing the training dataset having aligned pair of images is minimized.

Embodiments of the present disclosure may be further described by the following clauses:

1. A method for training a machine learning model to generate a predicted measured image, the method comprising:

obtaining a plurality of image pairs, wherein each image pair includes a) a training target image associated with a training design pattern, and b) a training measured image that is aligned with the training target image; and training, by a hardware computer system, the machine learning model to generate a predicted measured image from the training target image, the training being based on the plurality of image pairs and a cost function that determines a difference between the predicted measured image and the training measured image.

2. The method of clause 1 further comprising:

receiving, by the machine learning model, a specific target image associated with a specific design pattern on a substrate; and generating, by the machine learning model, a specific predicted measured image from the specific target image.

3. The method of clause 2 further comprising:
obtaining, from an image capture device, a specific measured image associated with the specific design pattern; and
determining an offset between the specific measured image and the specific predicted measured image.

4. The method of clause 3, wherein the offset is determined based on a cross correlation of the specific measured image and the specific predicted measured image.

5. The method of clauses 3 or 4, wherein the offset is determined as co-ordinates of the specific predicted measured image where a match function indicating a match between the specific measured image and the specific predicted measured image is the highest.

6. The method of clauses 3-5, wherein the offset is determined based on a normalized cross correlation of the specific measured image and the specific predicted measured image in a frequency domain.

7. The method of clause 1, wherein the training design pattern is associated with a pattern on a substrate.

8. The method of clause 1, wherein the training measured images are obtained from an image capture device.

9. The method of clause 1, wherein the training measured image is aligned with the training target image.

10. A method for training a machine learning model to generate a predicted measured image, the method comprising:
obtaining a first plurality of image pairs, wherein each image pair includes a) a training target image associated with a training design pattern on a substrate, and b) a training measured image that is obtained from an image capture device and aligned with the training target image; and
training, by a hardware computer system, the machine learning model using a training set to generate a predicted measured image from a target image associated with a design pattern, wherein the training set includes the training target images of the first plurality of image pairs as a feature vector and the training measured images of the first plurality of image pairs as labels.

11. The method of clause 10 further comprising:
determining a cost function, the cost function indicating a measure of difference between the predicted measured image and a measured image associated with the design pattern that is obtained from the image capture device; and
training the machine learning model using a second training set having a second plurality of image pairs until the cost function is below a specified threshold.

12. The method of clause 11, wherein training the machine learning model using the second training set includes:
decreasing a size of each of the images in the second plurality of image pairs compared to a size of each of the images in the first plurality of image pairs to generate an adjusted second plurality of image pairs, and
training the machine learning model using the adjusted second plurality of image pairs.

13. A method of aligning a measured image, the method comprising:
obtaining (a) a measured image associated with a design pattern on a substrate, and (b) a predicted measured image generated from a target image associated with the design pattern; and
aligning, by a hardware computer system, the measured image with the predicted measured image by determining an offset between the measured image and the predicted measured image.

14. The method of clause 13, wherein aligning the measured image includes:
determining the offset based on a cross correlation of the measured image and the predicted measured image.

15. The method of clauses 13-14, wherein determining the offset includes determining co-ordinates associated with the predicted measured image where a measure of the correlation exceeds a specified threshold.

16. The method of clauses 13-15, wherein the offset is further determined based on a normalized cross correlation of the measured image and the predicted measured image in a frequency domain.

17. The method of clause 13, wherein obtaining the predicted measured image includes:
obtaining the predicted measured image from a machine learning model that is trained to generate the predicted measured image from the target image.

18. The method of clause 17, wherein obtaining the predicted measured image from the machine learning model includes:
obtaining a plurality of image pairs, wherein each image pair includes a) a training target image associated with the design pattern, and b) a training measured image that is obtained from an image capture device and aligned with the training target image, and
training the machine learning model using the plurality of image pairs such that a cost function associated with the generation of the predicted measured image improves, the cost function determining a difference between the predicted measured image and the measured image.

19. The method of clauses 17 or 18, wherein training the machine learning model is an iterative process, wherein an iteration includes:
determining model parameters such that the cost function indicative of a difference between a training predicted measured image and the training measured image is minimized, wherein training predicted measured image is predicted based on the training target image.

20. The method of clauses 17 or 18, wherein training the machine learning model includes:
determining the cost function, and
retraining the machine learning model with a second plurality of image pairs until the cost function is below a specified threshold.

21. The method of clauses 17 or 18, wherein the machine learning model includes a convolutional neural network (CNN) model.

22. The method of clauses 13-21, wherein the measured image is obtained via a metrology tool.

23. The method of clause 22, wherein the metrology tool is a scanning electron microscope (SEM) and the measured image is a SEM image.

24. The method of clauses 13-21, wherein the measured image is obtained via an inspection tool.

25. The method as in clauses 13-22 further comprising:
obtaining the target image from Graphic Database Systems (GDS) polygons associated with the design pattern.

26. The method of clause 25, wherein the GDS polygons can be in one or more formats selected from GDS stream format (GDSII) and Open Artwork System Interchange Standard (OASIS).

27. The method of clause 13 further comprising:
performing a second alignment of the measured image with the predicted measured image by aligning a first contour associated with the measured image with a second contour associated with the predicted measured image.

28. A method of aligning a measured image, the method comprising:
obtaining (a) a measured image from an image capture device, and (b) a predicted measured image from a machine learning model trained to generate the predicted measured image from a target image associated with a design pattern to be printed on a substrate, the measured image corresponding to the design pattern printed on the substrate; and
determining, by a hardware computer system, an offset for aligning the measured image with the predicted measured image using a cross correlation function on the measured image and the predicted measured image, wherein the offset is a pair of co-ordinates associated with predicted measured image where a measure of the correlation is the highest.

29. The method of clause 28, wherein obtaining the predicted measured image from the machine learning model includes:
obtaining a plurality of image pairs, wherein each image pair includes a) a training target image associated with the design pattern, and b) a training measured image that is obtained from an image capture device and aligned with the training target image, and
training the machine learning model using the plurality of image pairs such that a cost function associated with the generation of the predicted measured image improves, the cost function indicating a difference between the predicted measured image and the measured image.

30. The method of clause 29, wherein obtaining the plurality of image pairs includes:
performing an alignment of the training measured image with the training target image based on contours of the training measured image with the training target image to obtain an image pair of the plurality of image pairs.

31. The method of clause 30, wherein performing the alignment includes:
extracting a first contour associated with the training measured image and a second contour associated with the training target image, and
aligning the training measured image with the training target image by determining an offset between the first contour and the second contour.

32. A non-transitory computer readable medium having instructions recorded thereon, the instructions when executed by a computer implementing the method of any of the above clauses.

33. A non-transitory computer-readable medium having instructions that, when executed by a computer, cause the computer to execute a method for training a machine learning model to generate a predicted measured image, the method comprising:
obtaining a plurality of image pairs, wherein each image pair includes a) a training target image associated with a training design pattern, and b) a training measured image that is aligned with the training target image; and
training, by a hardware computer system, the machine learning model to generate a predicted measured image from the training target image, the training being based on the plurality of image pairs and a cost function that determines a difference between the predicted measured image and the training measured image.

34. The computer-readable medium of clause 33 further comprising:
receiving, by the machine learning model, a specific target image associated with a specific design pattern on a substrate; and
generating, by the machine learning model, a specific predicted measured image from the specific target image.

35. The computer-readable medium of clause 34 further comprising:
obtaining, from an image capture device, a specific measured image associated with the specific design pattern; and
determining an offset between the specific measured image and the specific predicted measured image.

36. The computer-readable medium of clause 35, wherein the offset is determined based on a cross correlation of the specific measured image and the specific predicted measured image.

37. The computer-readable medium of clauses 35 or 36, wherein the offset is determined as co-ordinates of the specific predicted measured image where a match function indicating a match between the specific measured image and the specific predicted measured image is the highest.

38. A non-transitory computer-readable medium having instructions that, when executed by a computer, cause the computer to execute a method for training a machine learning model, the method comprising:
obtaining (a) an input target image associated with a reference design pattern, and (b) a reference measured image associated with a specified design pattern printed on a substrate, wherein the input target image and the reference measured image are non-aligned images; and
training, by a hardware computer system and using the input target image, the machine learning model to generate a predicted measured image.

39. The computer-readable medium of clause 38, wherein the training the machine learning model is an iterative process, wherein an iteration includes:
generating, via executing a first generator model of the machine learning model, the predicted measured image from the input target image;
determining, via a first discriminator model of the machine learning model, whether the predicted measured image and the reference measured image are real or fake, wherein the first discriminator model determines a first image to be real if the first image satisfies a first threshold related to a specified measured image associated with a specified design pattern printed on a substrate, and wherein the first discriminator model determines the first image to be fake if the first image does not satisfy the first threshold;
generating, via executing a second generator model of the machine learning model, a predicted target image from the reference measured image; and
determining, via a second discriminator model of the machine learning model, whether the predicted target image and the input target image are real or fake, wherein the second discriminator model determines a second image to be real if the second image satisfies a second threshold related to the input design pattern, and wherein the second discriminator model determines the second image to be fake if the second image does not satisfy the second threshold.

40. The computer-readable medium of clause 39, wherein the iteration includes:
  computing a first discriminator function associated with the first discriminator model as a function of:
    (i) a first probability that the predicted measured image is determined as real, and
    (ii) a second probability that the reference measured image is determined as fake;
  computing a first generator function associated with the first generator model as a function of:
    (iii) the first probability that the predicted measured image is determined by the first discriminator model as real, and
    (iv) a first metric that is indicative of a difference between the input target image and a cyclic target image;
  adjusting first parameters of the first discriminator model to minimize the first discriminator function; and
  adjusting second parameters of the first generator model to minimize the first generator function.

41. The computer-readable medium of clause 40, wherein computing the first generator function includes:
  generating, via executing the second generator model, the cyclic target image from the predicted measured image to compute the first metric.

42. The computer-readable medium of any of clauses 39-41, wherein the iteration includes:
  computing a second discriminator function associated with the second discriminator model as a function of:
    (i) a first probability that the predicted target image is determined as real, and
    (ii) a second probability that the input target image is determined as fake;
  computing a second generator function associated with the second generator model as a function of:
    (iii) the first probability that the predicted target image is determined by the second discriminator model as real, and
    (iv) a second metric that is indicative of a difference between the reference measured image and a cyclic measured image;
  adjusting first parameters of the second discriminator model to minimize the second discriminator function; and
  adjusting second parameters of the second generator model to minimize the second generator function.

43. The computer-readable medium of clause 42, wherein computing the second generator function includes:
  generating, via executing the first generator model, the cyclic measured image from the predicted target image to compute the second metric.

44. The computer-readable medium of clauses 40 and 42, wherein the training includes training the machine learning model such that a cost function associated with the input target image, the predicted measured image and/or the reference measured image is minimized, wherein the cost function is a function of at least one of the first discriminator function, the first generator function, the second discriminator function, or the second generator function.

45. The computer-readable medium of any of clauses 40-43, wherein the first discriminator function includes a log-likelihood term that determines the first probability that the predicted measured image is real and a log-likelihood term that determines the second probability that the reference measured image is fake.

46. The computer-readable medium of any of clauses 40-43, wherein the first generator function includes a log-likelihood term that determines the first probability that the predicted measured image is real.

47. The computer-readable medium of any of clauses 41-43, wherein the second discriminator function includes a log-likelihood term that determines the first probability that the predicted target image is real and a log-likelihood term that determines the second probability that the input target image is fake.

48. The computer-readable medium of any of clauses 41-43, wherein the second generator function includes a log-likelihood term that determines the first probability that the predicted target image is real.

49. The computer-readable medium of any of clauses 38-48 further comprising:
  receiving, by the machine learning model, a target image associated with a design pattern on a substrate; and
  generating, by the machine learning model and using the target image, a first predicted measured image.

50. The computer-readable medium of clause 49 further comprising:
  obtaining, from an image capture device, a measured image associated with the design pattern; and
  determining an offset between the measured image and the first predicted measured image.

51. The computer-readable medium of clause 50 further comprising:
  aligning the measured image with the target image by aligning the measured image with the first predicted measured image based on the offset.

52. The computer-readable medium of any of clauses 50 or 51, wherein the offset is determined based on a cross correlation of the measured image and the first predicted measured image.

53. The computer-readable medium of any of clauses 50-52, wherein the offset is determined as co-ordinates of the first predicted measured image where a match function indicating a match between the measured image and the first predicted measured image is the highest or exceeds a specified threshold.

54. The computer-readable medium of any of clauses 49-53, wherein receiving the target image includes obtaining the target image from Graphic Database Systems (GDS) polygons associated with the design pattern.

55. The computer-readable medium of any of clauses 38-48 further comprising:
  receiving, by the machine learning model, a measured image associated with a design pattern on a substrate; and
  generating, by the machine learning model and using the measured image, a first predicted target image.

56. The computer-readable medium of clause 55 further comprising:
  obtaining a target image associated with the design pattern; and
  determining an offset between the target image and the first predicted target image.

57. The computer-readable medium of clause 56 further comprising:
  aligning the target image with the measured image by aligning the target image with the first predicted target image based on the offset.

58. The computer-readable medium of any of clauses 38-49 further comprising:
  receiving, by the machine learning model, (a) a target image associated with a design pattern on a first substrate, (b) a measured image associated with a design pattern on a second substrate; and generating, by the machine learning model, a first predicted measured image using the target image, and (b) a first predicted target image using the measured image.

59. The computer-readable medium of clause 58 further comprising:
obtaining (a) a second measured image associated with the design pattern, and (b) a second target image associated with the design pattern; and
determining (a) a first offset between the second measured image and the first predicted measured image, and (b) a second offset between the second target image and the first predicted target image.

60. The computer-readable medium of clause 59 further comprising:
aligning (a) the second measured image with the first predicted measured image based on the first offset, and (b) the second target image with the first predicted target image based on the second offset.

61. The computer-readable medium of any of clauses 38-60, wherein the reference design pattern is associated with a pattern to be printed on a substrate, and wherein the input target image is rendered from reference design pattern.

62. The computer-readable medium of any of clauses 38-60, wherein the reference measured image is obtained from an image capture device and corresponds to the specified design pattern printed on the substrate.

63. The computer-readable medium of any of clauses 38-62, wherein the obtaining includes obtaining the input target image and the reference measured image in which a match of one or more characteristics of the input target image with one or more characteristics of the reference measured image is below a specified threshold.

64. A non-transitory computer-readable medium having instructions that, when executed by a computer, cause the computer to execute a method for training a machine learning model, the method comprising:
obtaining an input target image associated with a reference design pattern, and a reference measured image associated with a specified design pattern printed on a substrate; and
training, by a hardware computer system, the machine learning model to generate a predicted measured image, wherein the training includes:
training a first module of the machine learning model to generate the predicted measured image from the input target image such that a first metric that is determined as a function of the input target image and the predicted measured image is reduced, and
training a second module of the machine learning model to generate a predicted target image from the reference measured image such that a second metric that is determined as a function of the reference measured image and the predicted target image is reduced.

65. The computer-readable medium of clause 64, wherein the training the machine learning model is an iterative process, wherein an iteration includes:
training the first module by:
generating, via executing a first generator model of the first module, the predicted measured image using the input target image, and
determining, via a first discriminator model of the first module, whether the predicted measured image and the reference measured image are real or fake, wherein the first discriminator model determines a first image to be real if the first image satisfies a first threshold related to a specified measured image associated with a specified design pattern printed on a substrate, and wherein the first discriminator model determines the first image to be fake if the first image does not satisfy the first threshold; and
training the second module by:
generating, via executing a second generator model of the second module, a predicted target image using the reference measured image, and
determining, via a second discriminator model of the machine learning model, whether the predicted target image and the input target image are real or fake, wherein the second discriminator model determines a second image to be real if the second image satisfies a second threshold related to the input design pattern, and wherein the second discriminator model determines the second image to be fake if the second image does not satisfy the second threshold.

66. The computer-readable medium of clause 65, wherein the iteration includes:
computing a first discriminator function associated with the first discriminator model as a function of:
(i) a first probability that the predicted measured image is determined as real, and
(ii) a second probability that the reference measured image is determined as fake;
computing a first generator function associated with the first generator model as a function of:
(i) the first probability that the predicted measured image is determined by the first discriminator model as real, and
(iii) the first metric;
adjusting first parameters of the first discriminator model to minimize the first discriminator function; and
adjusting second parameters of the first generator model to minimize the first generator function.

67. The computer-readable medium of clause 66, wherein computing the first generator function includes:
generating, via executing the second generator model, a cyclic target image from the predicted measured image, and
computing the first metric as a difference between the input target image and the cyclic target image.

68. The computer-readable medium of any of clauses 65-67, wherein the iteration includes:
computing a second discriminator function associated with the second discriminator model as a function of:
(i) a first probability that the predicted target image is determined as real, and
(ii) a second probability that the input target image is determined as fake;
computing a second generator function associated with the second generator model as a function of:
(iii) the first probability that the predicted target image is determined by the second discriminator model as real, and
(iv) the second metric;
adjusting first parameters of the second discriminator model to minimize the second discriminator function; and
adjusting second parameters of the second generator model to minimize the second generator function.

69. The computer-readable medium of clause 68, wherein computing the second generator function includes:
generating, via executing the first generator model, a cyclic measured image from the predicted target image, and computing the second metric as a difference between the reference measured image and the cyclic measured image.

70. The computer-readable medium of any of clauses 64-69, wherein the input target image and the reference measured image are non-aligned with respect to one another.

71. The computer-readable medium of any of clauses 64-70 further comprising:
receiving, by the machine learning model, a target image associated with a design pattern on a substrate; and
generating, by the machine learning model and using the target image, a first predicted measured image.

72. The computer-readable medium of clause 71 further comprising:
obtaining, from an image capture device, a measured image associated with the design pattern; and
determining an offset between the measured image and the first predicted measured image.

73. The computer-readable medium of clause 72 further comprising:
aligning the measured image with the target image by aligning the measured image with the first predicted measured image based on the offset.

74. A method for training a machine learning model to generate a predicted measured image, the method comprising:
obtaining an input target image associated with a reference design pattern and a reference measured image associated with a specified design pattern printed on a substrate, wherein the reference measured image and the input target image are non-aligned images; and
training, by a hardware computer system and using the input target image, the machine learning model to generate a predicted measured image such that a cost function associated with input target image, the predicted measured image and the reference measured image is reduced.

75. The method of clause 74, wherein the training the machine learning model is an iterative process, wherein an iteration includes:
generating, via executing a first generator model of the machine learning model, the predicted measured image from the input target image;
determining, via a first discriminator model of the machine learning model, whether the predicted measured image and the reference measured image are real or fake, wherein the first discriminator model determines a first image to be real if the first image satisfies a first threshold related to a specified measured image associated with a specified design pattern printed on a substrate, and wherein the first discriminator model determines the first image to be fake if the first image does not satisfy the first threshold;
generating, via executing a second generator model of the machine learning model, a predicted target image from the reference measured image; and
determining, via a second discriminator model of the machine learning model, whether the predicted target image and the input target image are real or fake, wherein the second discriminator model determines a second image to be real if the second image satisfies a second threshold related to the input design pattern, and wherein the second discriminator model determines the second image to be fake if the second image does not satisfy the second threshold.

76. The method of clause 75, wherein the iteration includes:
computing a first discriminator function associated with the first discriminator model as a function of:
(i) a first probability that the predicted measured image is determined as real, and
(ii) a second probability that the reference measured image is determined as fake;
computing a first generator function associated with the first generator model as a function of:
(i) the first probability that the predicted measured image is determined by the first discriminator model as real, and
(iii) a first metric that is indicative of a difference between the input target image and a cyclic target image;
adjusting first parameters of the first discriminator model to minimize the first discriminator function; and
adjusting second parameters of the first generator model to minimize the first generator function.

77. The method of clause 76, wherein computing the first generator function includes:
generating, via executing the second generator model, the cyclic target image from the predicted measured image to compute the first metric.

78. The method of any of clauses 75-77, wherein the iteration includes:
computing a second discriminator function associated with the second discriminator model as a function of:
(i) a first probability that the predicted target image is determined as real, and
(ii) a second probability that the input target image is determined as fake;
computing a second generator function associated with the second generator model as a function of:
(iii) the first probability that the predicted target image is determined by the second discriminator model as real, and
(iv) a second metric that is indicative of a difference between the reference measured image and a cyclic measured image;
adjusting first parameters of the second discriminator model to minimize the second discriminator function; and
adjusting second parameters of the second generator model to minimize the second generator function.

79. The method of clause 78, wherein computing the second generator function includes:
generating, via executing the first generator model, the cyclic measured image from the predicted target image to compute the second metric.

80. A method for training a machine learning model to generate a predicted target image, the method comprising:
obtaining an input measured image associated with a specified design pattern printed on a substrate and a reference target image associated with a reference design pattern, wherein the input measured image and the reference target image are non-aligned images; and
training, by a hardware computer system and using the input measured image, the machine learning model to generate a predicted target image such that a cost function associated with the input measured image, the reference target image, and the predicted target image is reduced.

81. The method of clause 80, wherein the training the machine learning model is an iterative process, wherein an iteration includes:

generating, via executing a first generator model of the machine learning model, a predicted target image from the input measured image;

determining, via a first discriminator model of the machine learning model, whether the predicted target image and the reference target image are real or fake, wherein the first discriminator model determines a first image to be real if the first image satisfies a first threshold related to the reference design pattern, and wherein the first discriminator model determines the first image to be fake if the first image does not satisfy the first threshold;

generating, via executing a second generator model of the machine learning model, the predicted measured image from the reference target image; and determining, via a second discriminator model of the machine learning model, whether the predicted measured image and the input measured image are real or fake, wherein the second discriminator model determines a second image to be real if the second image satisfies a second threshold related to a specified measured image associated with a specified design pattern printed on a substrate, and wherein the second discriminator model determines the second image to be fake if the second image does not satisfy the second threshold.

82. A non-transitory computer readable medium having instructions recorded thereon, the instructions when executed by a computer implementing the method of any of the above clauses 38-81.

The descriptions above are intended to be illustrative, not limiting. Thus, it will be apparent to one skilled in the art that modifications may be made as described without departing from the scope of the claims set out below.

The invention claimed is:

1. A method comprising:
    obtaining a measured image associated with a design pattern on a substrate;
    predicting, by a machine learning model, a predicted measured image from a target image associated with the design pattern;
    aligning the measured image with the predicted measured image based an offset between the measured image and the predicted measured image; and
    configuring, based on the alignment of the measured image with the predicted measured image, a computerized simulation model, separate from the machine learning model, that is configured to predict a characteristic associated with manufacture or measurement of a physical structure corresponding to the design pattern.

2. The method of claim 1, wherein the aligning the measured image includes determining the offset based on a cross correlation of the measured image and the predicted measured image.

3. The method of claim 2, wherein the determining the offset includes determining co-ordinates associated with the predicted measured image where a measure of the correlation exceeds a specified threshold.

4. The method of claim 1, wherein the offset is determined based on a normalized cross correlation of the measured image and the predicted measured image in a frequency domain.

5. The method of claim 3, wherein the determining the offset further includes determining the offset based on a normalized cross correlation of the measured image and the predicted measured image in a frequency domain.

6. The method of claim 1, wherein the obtaining the predicted measured image from the machine learning model includes:
    obtaining a plurality of image pairs, wherein each image pair includes a) a training target image associated with the design pattern, and b) a training measured image that is obtained from an image capture device and aligned with the training target image, and
    training the machine learning model by using the plurality of image pairs as training data.

7. The method of claim 6, wherein the training includes using the plurality of image pairs such that a cost function associated with the generation of the predicted measured image improves, the cost function determining a difference between the predicted measured image and the measured image.

8. The method of claim 7, wherein the training the machine learning model is an iterative process, wherein an iteration includes:
    determining model parameters such that the cost function indicative of a difference between a training predicted measured image and the training measured image is minimized, wherein the training predicted measured image is predicted based on the training target image.

9. The method of claim 7, wherein the training the machine learning model includes:
    determining the cost function, and
    retraining the machine learning model with a second plurality of image pairs until the cost function is below a specified threshold.

10. The method of claim 1, wherein the machine learning model includes a convolutional neural network (CNN) model.

11. The method of claim 1, wherein the measured image is obtained via a metrology tool.

12. The method of claim 11, wherein the metrology tool is a scanning electron microscope (SEM) and the measured image is a SEM image, and wherein the predicted measured image is a predicted SEM image.

13. The method of claim 1, further comprising obtaining the target image from Graphic Database Systems (GDS) polygons associated with the design pattern.

14. The method of claim 1, further comprising performing a second alignment of the measured image with the predicted measured image by aligning a first contour associated with the measured image with a second contour associated with the predicted measured image.

15. A non-transitory computer-readable medium having instructions therein, the instructions, when executed by a computer system, configured to cause the computer system to at least:
    obtain a measured image associated with a design pattern on a substrate;
    predict, by a machine learning model, a predicted measured image from a target image associated with the design pattern;
    align the measured image with the predicted measured image based an offset between the measured image and the predicted measured image; and
    configure, based on the alignment of the measured image with the predicted measured image, a computerized simulation model, separate from the machine learning model, that is configured to predict a characteristic associated with manufacture or measurement of a physical structure corresponding to the design pattern.

16. The computer-readable medium of claim 15, wherein the instructions configured to cause the computer system to align the measured image are further configured to cause the computer system to determine the offset based on a cross correlation of the measured image and the predicted measured image.

17. The computer-readable medium of claim 15, wherein the instructions configured to cause the computer system to align the measured image are further configured to cause the computer system to determine the offset based on a normalized cross correlation of the measured image and the predicted measured image in a frequency domain.

18. The computer-readable medium of claim 15, wherein the instructions configured to cause the computer system to obtain the predicted measured image from the machine learning model are further configured to cause the computer system to:
   obtain a plurality of image pairs, wherein each image pair includes a) a training target image associated with the design pattern, and b) a training measured image that is obtained from an image capture device and aligned with the training target image, and
   train the machine learning model by using the plurality of image pairs as training data.

19. The computer-readable medium of claim 15, wherein the instructions are further configured to cause the computer system to obtain the target image from Graphic Database Systems (GDS) polygons associated with the design pattern.

20. The computer-readable medium of claim 15, wherein the instructions are further configured to cause the computer system to perform a second alignment of the measured image with the predicted measured image by alignment of a first contour associated with the measured image with a second contour associated with the predicted measured image.

* * * * *